(12) United States Patent
Zhou et al.

(10) Patent No.: US 12,242,033 B2
(45) Date of Patent: Mar. 4, 2025

(54) OPTICAL IMAGING LENS ASSEMBLY

(71) Applicant: ZHEJIANG SUNNY OPTICS CO., LTD., Zhejiang (CN)

(72) Inventors: Yu Zhou, Zhejiang (CN); Yu Tang, Zhejiang (CN); Fujian Dai, Zhejiang (CN); Liefeng Zhao, Zhejiang (CN)

(73) Assignee: ZHEJIANG SUNNY OPTICS CO., LTD., Ningbo (CN)

( * ) Notice: Subject to any disclaimer, the term of this patent is extended or adjusted under 35 U.S.C. 154(b) by 684 days.

(21) Appl. No.: 17/509,079

(22) Filed: Oct. 25, 2021

(65) Prior Publication Data
US 2022/0137367 A1 May 5, 2022

(51) Int. Cl.
*G02B 13/00* (2006.01)
*G02B 9/64* (2006.01)
*G02B 27/00* (2006.01)

(52) U.S. Cl.
CPC ............ *G02B 13/0045* (2013.01); *G02B 9/64* (2013.01); *G02B 27/0025* (2013.01)

(58) Field of Classification Search
CPC .............................. G02B 9/64; G02B 13/0045
USPC ......................................... 359/708, 749, 754
See application file for complete search history.

(56) References Cited

U.S. PATENT DOCUMENTS

| | | | |
|---|---|---|---|
| 2021/0396959 A1* | 12/2021 | Tseng | G02B 9/64 |
| 2022/0075143 A1* | 3/2022 | Tian | G02B 13/0045 |
| 2022/0075145 A1* | 3/2022 | Li | G02B 13/0045 |
| 2022/0075146 A1* | 3/2022 | Hu | G02B 13/0045 |
| 2022/0196977 A1* | 6/2022 | Lai | G02B 13/0045 |
| 2022/0196980 A1* | 6/2022 | Lai | G02B 13/0045 |
| 2022/0236540 A1* | 7/2022 | Chen | G02B 9/64 |
| 2022/0283408 A1* | 9/2022 | Tseng | G02B 9/64 |

OTHER PUBLICATIONS

Gross et al. "Handbook of Optical Systems vol. 3: Aberration Theory and Correction of Optical Systems" Weinheim Germany, WILEY-VCH Verlag GmbH & Co. KGaA, pp. 377-379 (Year: 2007).*

* cited by examiner

*Primary Examiner* — Cara E Rakowski
(74) *Attorney, Agent, or Firm* — Grogan, Jucatlo & Vandedeeden, LLP

(57) ABSTRACT

The disclosure provides an optical imaging lens assembly, which sequentially includes, from an object side to an image side along an optical axis: a first lens with a positive refractive power; a second lens with a negative refractive power; a third lens with a positive refractive power, an object-side surface thereof being a convex surface; a fourth lens with a refractive power; a fifth lens with a refractive power, an object-side surface thereof being a concave surface, while an image-side surface being a convex surface; a sixth lens with a refractive power; a seventh lens with a refractive power; an eighth lens with a refractive power; and a ninth lens with a refractive power. ImgH is a half of a diagonal length of an effective pixel region on an imaging surface of the optical imaging lens assembly, and ImgH meets 6.5 mm≤ImgH≤7.5 mm.

19 Claims, 25 Drawing Sheets longitudinal aberration curve longitudinal aberration curve

OPTICAL IMAGING LENS ASSEMBLY

TECHNICAL FIELD

The disclosure relates to the field of optical elements, and particularly to an optical imaging lens assembly including nine lenses.

BACKGROUND

In recent years, with the rapid development of smart phones, lens pixels of mobile phones with rear camera functions have been continuously upgraded. Pixels of mobile phone lenses have been rapidly improved from more than a hundred thousand in the past to tens of millions and even hundreds of millions based on requirements made by mobile phone manufacturers to optical imaging lens assemblies. In the future development of smart phones, pixels of optical imaging lens assemblies will continue to be improved, and the pixel resolution will be improved therewith. Therefore, high pixel will become a main development trend of the industry in the field of mobile phone lenses in the future.

Therefore, how to achieve all the characteristics of high pixel, large image surface, large field of view, high image quality, and the like of a mobile phone lens is a problem urgent to be solved in the design of optical imaging lens assemblies at present.

SUMMARY

Some embodiments of the disclosure provide an optical imaging lens assembly, e.g., an optical imaging lens assembly with a large image surface, high pixel, a large field of view, and high image quality, applicable to a portable electronic product and capable of at least overcoming or partially overcoming at least one shortcoming in a conventional art.

An aspect of the disclosure provides an optical imaging lens assembly, which may sequentially include, from an object side to an image side along an optical axis: a first lens with a refractive power; a second lens with a negative refractive power; a third lens with a positive refractive power, an object-side surface thereof being a convex surface; a fourth lens with a refractive power; a fifth lens with a refractive power, an object-side surface thereof being a concave surface, while an image-side surface being a convex surface; a sixth lens with a refractive power; a seventh lens with a refractive power; an eighth lens with a refractive power; and a ninth lens with a refractive power, wherein there may be an air space between every two adjacent lenses in the first lens to the ninth lens; and ImgH is a half of a diagonal length of an effective pixel region on an imaging surface of the optical imaging lens assembly, and ImgH may meet 6.5 mm≤ImgH≤7.5 mm.

In an implementation mode, an effective focal length f1 of the first lens and an effective focal length f8 of the eighth lens may meet 1.0<f8/f1<2.0.

In an implementation mode, an Abbe number V2 of the second lens may meet V2≤20.

In an implementation mode, an effective focal length f2 of the second lens and an effective focal length f9 of the ninth lens may meet 2.0<f2/f9<4.0.

In an implementation mode, an effective focal length f3 of the third lens, a curvature radius R5 of the object-side surface of the third lens and a curvature radius R6 of an image-side surface of the third lens may meet 2.0<f3/(R5+R6)<4.5.

In an implementation mode, a curvature radius R2 of an image-side surface of the first lens and a curvature radius R3 of an object-side surface of the second lens may meet 1.0<R2/R3<2.0.

In an implementation mode, a curvature radius R1 of an object-side surface of the first lens and a curvature radius R4 of an image-side surface of the second lens may meet 1.5<R4/R1<2.0.

In an implementation mode, a curvature radius R10 of the image-side surface of the fifth lens and a curvature radius R12 of an image-side surface of the sixth lens may meet −2.0<R12/R10<−0.5.

In an implementation mode, a curvature radius R9 of the object-side surface of the fifth lens and a curvature radius R15 of an object-side surface of the eighth lens may meet −3.5<R9/R15<−1.5.

In an implementation mode, a curvature radius R17 of an object-side surface of the ninth lens and a curvature radius R18 of an image-side surface of the ninth lens may meet −3.5<R18/R17<−1.0.

In an implementation mode, a center thickness CT6 of the sixth lens on the optical axis and a center thickness CT7 of the seventh lens on the optical axis may meet 0.5<CT7/CT6<1.5.

In an implementation mode, an air space T34 of the third lens and the fourth lens on the optical axis and an air space T45 of the fourth lens and the fifth lens on the optical axis may meet 1.5<T34/T45<3.5.

In an implementation mode, a center thickness CT8 of the eighth lens on the optical axis, a center thickness CT9 of the ninth lens on the optical axis and an air space T89 of the eighth lens and the ninth lens on the optical axis may meet 1.0<(CT8+CT9)/T89<1.5.

In an implementation mode, a center thickness CT7 of the seventh lens on the optical axis and an air space T78 of the seventh lens and the eighth lens on the optical axis may meet 1.0<T78/CT7<2.0.

In an implementation mode, an air space T56 of the fifth lens and the sixth lens on the optical axis and an air space T67 of the sixth lens and the seventh lens on the optical axis may meet 1.0<T67/T56<4.0.

Another aspect of the disclosure provides an optical imaging lens assembly, which may sequentially include, from an object side to an image side along an optical axis: a first lens with a refractive power; a second lens with a negative refractive power; a third lens with a positive refractive power, an object-side surface thereof being a convex surface; a fourth lens with a refractive power; a fifth lens with a refractive power, an object-side surface thereof being a concave surface, while an image-side surface being a convex surface; a sixth lens with a refractive power; a seventh lens with a refractive power; an eighth lens with a refractive power; and a ninth lens with a refractive power, wherein there may be an air space between every two adjacent lenses in the first lens to the ninth lens; and an effective focal length f2 of the second lens and an effective focal length f9 of the ninth lens may meet 2.0<f2/f9<4.0.

In an implementation mode, an effective focal length f1 of the first lens and an effective focal length f8 of the eighth lens may meet 1.0<f8/f1<2.0.

In an implementation mode, an Abbe number V2 of the second lens may meet V2≤20.

In an implementation mode, ImgH is a half of a diagonal length of an effective pixel region on an imaging surface of the optical imaging lens assembly, and ImgH may meet 6.5 mm≤ImgH≤7.5 mm.

In an implementation mode, an effective focal length f3 of the third lens, a curvature radius R5 of the object-side surface of the third lens and a curvature radius R6 of an image-side surface of the third lens may meet 2.0<f3/(R5+R6)<4.5.

In an implementation mode, a curvature radius R2 of an image-side surface of the first lens and a curvature radius R3 of an object-side surface of the second lens may meet 1.0<R2/R3<2.0.

In an implementation mode, a curvature radius R1 of an object-side surface of the first lens and a curvature radius R4 of an image-side surface of the second lens may meet 1.5<R4/R1<2.0.

In an implementation mode, a curvature radius R10 of the image-side surface of the fifth lens and a curvature radius R12 of an image-side surface of the sixth lens may meet −2.0<R12/R10<−0.5.

In an implementation mode, a curvature radius R9 of the object-side surface of the fifth lens and a curvature radius R15 of an object-side surface of the eighth lens may meet −3.5<R9/R15<−1.5.

In an implementation mode, a curvature radius R17 of an object-side surface of the ninth lens and a curvature radius R18 of an image-side surface of the ninth lens may meet −3.5<R18/R17<−1.0.

In an implementation mode, a center thickness CT6 of the sixth lens on the optical axis and a center thickness CT7 of the seventh lens on the optical axis may meet 0.5<CT7/CT6<1.5.

In an implementation mode, an air space T34 of the third lens and the fourth lens on the optical axis and an air space T45 of the fourth lens and the fifth lens on the optical axis may meet 1.5<T34/T45<3.5.

In an implementation mode, a center thickness CT8 of the eighth lens on the optical axis, a center thickness CT9 of the ninth lens on the optical axis and an air space T89 of the eighth lens and the ninth lens on the optical axis may meet 1.0<(CT8+CT9)/T89<1.5.

In an implementation mode, a center thickness CT7 of the seventh lens on the optical axis and an air space T78 of the seventh lens and the eighth lens on the optical axis may meet 1.0<T78/CT7<2.0.

In an implementation mode, an air space T56 of the fifth lens and the sixth lens on the optical axis and an air space T67 of the sixth lens and the seventh lens on the optical axis may meet 1.0<T67/T56<4.0.

The optical imaging lens assembly provided in the disclosure adopts multiple lenses, e.g., the first lens to the ninth lens, and the refractive power, surface types, and curvature radii of each lens, the center thickness of each lens, and the air spaces between adjacent lenses are configured reasonably to achieve at least one beneficial effect of large image surface, high pixel, high image quality, large field of view, and the like of the optical imaging lens assembly.

BRIEF DESCRIPTION OF THE DRAWINGS

Detailed descriptions are made to unrestrictive implementation modes below in combination with the drawings to make the other characteristics, purposes and advantages of the disclosure more apparent. In the drawings.

DETAILED DESCRIPTION OF THE EMBODIMENTS

Figure 1:
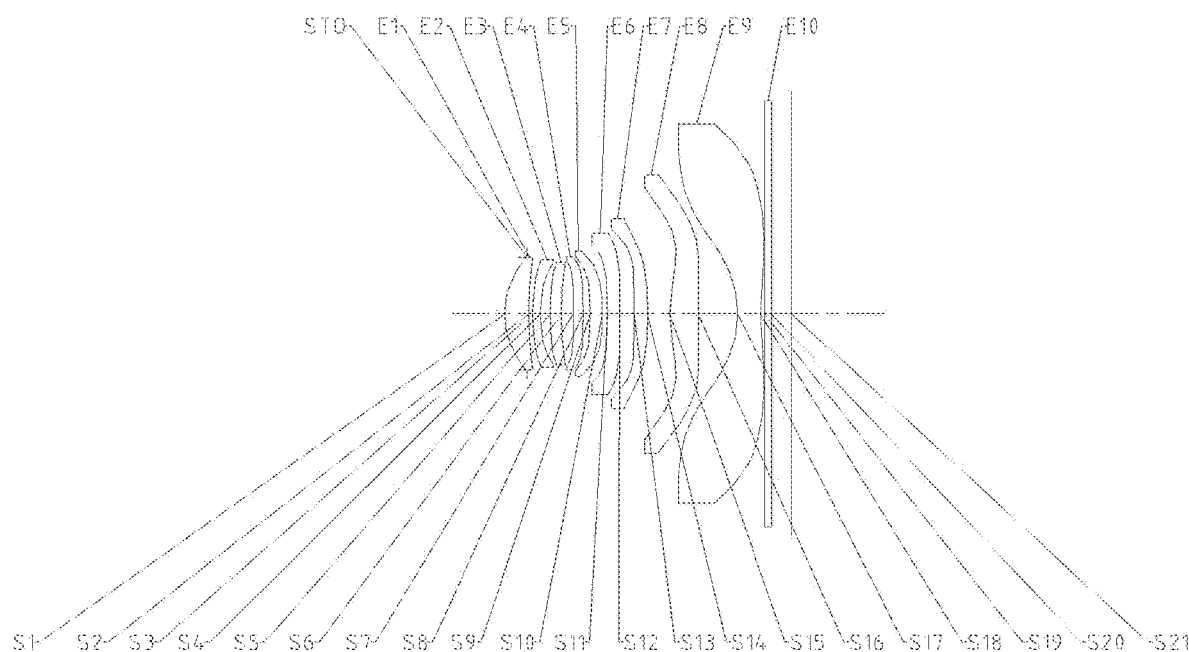
FIG. 1 shows a structure diagram of an optical imaging lens assembly according to embodiment 1 of the disclosure.

For understanding the disclosure better, more detailed descriptions will be made to each aspect of the disclosure with reference to the drawings. It is to be understood that these detailed descriptions are only descriptions about the exemplary implementation modes of the disclosure and not intended to limit the scope of the disclosure in any manner. In the whole specification, the same reference sign numbers represent the same components. Expression "and/or" includes any or all combinations of one or more in associated items that are listed.

It should be noted that, in this description, the expressions of first, second, third, and the like are only used to distinguish one feature from another feature, and do not represent any limitation to the feature. Thus, a first lens discussed below could also be referred to as a second lens or a third lens without departing from the teachings of the disclosure.

In the drawings, the thickness, size and shape of the lens have been slightly exaggerated for ease illustration. In particular, a spherical shape or aspheric shape shown in the drawings is shown by some embodiments. That is, the spherical shape or the aspheric shape is not limited to the spherical shape or aspheric shape shown in the drawings. The drawings are by way of example only and not strictly to scale.

Herein, a paraxial region refers to a region nearby an optical axis. If a lens surface is a convex surface and a position of the convex surface is not defined, it indicates that the lens surface is a convex surface at least in the paraxial region; and if a lens surface is a concave surface and a position of the concave surface is not defined, it indicates that the lens surface is a concave surface at least in the paraxial region. A surface, closest to a shot object, of each lens is called an object-side surface of the lens, and a surface, closest to an imaging surface, of each lens is called an image-side surface of the lens.

It should also be understood that terms "include", "including", "have", "contain", and/or "containing", used in the specification, represent existence of a stated characteristic, component and/or part but do not exclude existence or addition of one or more other characteristics, components and parts and/or combinations thereof. In addition, expressions like "at least one in . . . " may appear after a list of listed characteristics not to modify an individual component in the list but to modify the listed characteristics. Moreover, when the implementation modes of the disclosure are described, "may" is used to represent "one or more implementation modes of the disclosure". Furthermore, term "exemplary" refers to an example or exemplary description.

Unless otherwise defined, all terms (including technical terms and scientific terms) used in the disclosure have the same meanings usually understood by those of ordinary skill in the art of the disclosure. It is also to be understood that the terms (for example, terms defined in a common dictionary) should be explained to have meanings consistent with the meanings in the context of a related art and may not be explained with ideal or excessively formal meanings, unless clearly defined like this in the disclosure.

It is to be noted that the embodiments in the disclosure and characteristics in the embodiments may be combined without conflicts. The disclosure will be described below with reference to the drawings and in combination with the embodiments in detail.

The features, principles, and other aspects of the disclosure will be described below in detail.

An optical imaging lens assembly according to an exemplary implementation mode of the disclosure may include, for example, nine lenses with refractive power, i.e., a first lens, a second lens, a third lens, a fourth lens, a fifth lens, a sixth lens, a seventh lens, an eighth lens, and a ninth lens. The nine lenses are sequentially arranged from an object side to an image side along an optical axis. In the first lens to the ninth lens, there may be an air space between every two adjacent lenses.

In the exemplary implementation mode, the first lens may have positive refractive power or negative refractive power; the second lens has a negative refractive power; the third lens may have positive refractive power, and an object-side surface thereof may be a convex surface; the fourth lens has a positive refractive power or negative refractive power; the fifth lens has a positive refractive power or negative refractive power, an object-side surface thereof may be a concave surface, while an image-side surface may be a convex surface; the sixth lens has a positive refractive power or negative refractive power; the seventh lens has a positive refractive power or negative refractive power; the eighth lens has a positive refractive power or negative refractive power; and the ninth lens has a positive refractive power or negative refractive power. A focal length of the second lens and focal lengths and surface types of the third lens and the fifth lens are configured reasonably, so that high machinability of an optical imaging system may be ensured, and the optical imaging lens assembly may have a large field of view.

In the exemplary implementation mode, an object-side surface of the first lens may be a convex surface, while an image-side surface may be a concave surface.

In the exemplary implementation mode, an object-side surface of the second lens may be a convex surface, while an image-side surface may be a concave surface.

In the exemplary implementation mode, an image-side surface of the third lens may be a concave surface.

In the exemplary implementation mode, an image-side surface of the sixth lens may be a concave surface.

In the exemplary implementation mode, an object-side surface of the eighth lens may be a convex surface, while an image-side surface may be a concave surface.

In the exemplary implementation mode, an object-side surface of the ninth lens may be a concave surface, while an image-side surface may be a concave surface.

In the exemplary implementation mode, ImgH is a half of a diagonal length of an effective pixel region on an imaging surface of the optical imaging lens assembly, and ImgH may meet 6.5 mm≤ImgH≤7.5 mm. A numerical value of a half of the diagonal length of the effective pixel region on the imaging surface of the optical imaging lens assembly is set in a reasonable range to help to achieve a larger imaging surface of the optical imaging lens assembly.

In the exemplary implementation mode, an effective focal length f1 of the first lens and an effective focal length f8 of the eighth lens may meet 1.0<f8/f1<2.0, A ratio of the effective focal lengths of the first lens and the eighth lens may be controlled in a reasonable numerical range to effectively reduce the optical sensitivity of the first lens and the eighth lens and facilitate the batch production of the optical imaging lens assembly.

In the exemplary implementation mode, an Abbe number V2 of the second lens may meet V2≤20. A numerical value of the Abbe number of the second lens is set in a reasonable range to help to balance an aberration of the optical imaging lens assembly.

In the exemplary implementation mode, an effective focal length f2 of the second lens and an effective focal length f9 of the ninth lens may meet 2.0<f2/f9<4.0. A ratio of the effective focal lengths of the second lens and the ninth lens is controlled in a reasonable numerical range to help to enlarge the field of view of the optical imaging lens assembly.

In the exemplary implementation mode, an effective focal length f3 of the third lens, a curvature radius R5 of the object-side surface of the third lens and a curvature radius R6 of an image-side surface of the third lens may meet $2.0<f3/(R5+R6)<4.5$. A relationship between the effective focal length of the third lens, the curvature radius of the object-side surface, and the curvature radius of the image-side surface may be controlled reasonably to reduce a magnitude of an optical distortion of the optical imaging lens assembly and ensure relatively high imaging quality of the optical imaging lens assembly.

In the exemplary implementation mode, a curvature radius R2 of an image-side surface of the first lens and a curvature radius R3 of an object-side surface of the second lens may meet $1.0<R2/R3<2.0$. A ratio of the curvature radii of the image-side surface of the first lens and the object-side surface of the second lens is controlled in a reasonable numerical range to help to reduce an included angle of a chief ray entering the optical imaging system with the optical axis when emitted to the imaging surface and improve illuminance of the imaging surface.

In the exemplary implementation mode, a curvature radius R1 of an object-side surface of the first lens and a curvature radius R4 of an image-side surface of the second lens may meet $1.5<R4/R1<2.0$. A ratio of the curvature radii of the object-side surface of the first lens and the image-side surface of the second lens may be controlled in a reasonable numerical range to effectively reduce the optical sensitivity of the first lens and the second lens and facilitate the batch production of the optical imaging lens assembly.

In the exemplary implementation mode, a curvature radius R10 of the image-side surface of the fifth lens and a curvature radius R12 of an image-side surface of the sixth lens may meet $-2.0<R12/R10<-0.5$. A ratio of the curvature radii of the image-side surfaces of the fifth lens and the sixth lens is controlled in a reasonable numerical range to help to control an incidence angle of a ray on the imaging surface in an off-axis field of view of the optical imaging system and improve the matching degrees of the optical imaging lens assembly with a photosensitive element and a band-pass optical filter.

In the exemplary implementation mode, a curvature radius R9 of the object-side surface of the fifth lens and a curvature radius R15 of an object-side surface of the eighth lens may meet $-3.5<R9/R15<-1.5$, e.g., $-3.5<R9/R15<-2.0$. A ratio of the curvature radii of the object-side surfaces of the fifth lens and the eighth lens may be controlled in a reasonable numerical range to effectively balance an on-axis aberration of the optical imaging lens assembly.

In the exemplary implementation mode, a curvature radius R17 of an object-side surface of the ninth lens and a curvature radius R18 of an image-side surface of the ninth lens may meet $-3.5<R18/R17<-1.0$. A ratio of the curvature radii of the object-side surface and image-side surface of the ninth lens may be controlled in a reasonable numerical range to effectively balance the on-axis aberration of the optical imaging lens assembly.

In the exemplary implementation mode, a center thickness CT6 of the sixth lens on the optical axis and a center thickness CT7 of the seventh lens on the optical axis may meet $0.5<CT7/CT6<1.5$, e.g., $0.7<CT7/CT6<1.2$. A relationship between the center thicknesses of the sixth lens and the seventh lens on the optical axis may be controlled reasonably to ensure high machinability of the optical imaging system.

In the exemplary implementation mode, an air space T34 of the third lens and the fourth lens on the optical axis and an air space T45 of the fourth lens and the fifth lens on the optical axis may meet $1.5<T34/T45<3.5$, e.g., $2.0<T34/T45<3.3$. A relationship between the air space of the third lens and the fourth lens on the optical axis and the air space of the fourth lens and the fifth lens on the optical axis is controlled reasonably to help to balance field curvatures generated by previous lenses and next lenses respectively in the optical imaging system to distribute a field curvature of the optical imaging lens assembly in a reasonable numerical range.

In the exemplary implementation mode, a center thickness CT8 of the eighth lens on the optical axis, a center thickness CT9 of the ninth lens on the optical axis and an air space T89 of the eighth lens and the ninth lens on the optical axis may meet $1.0<(CT8+CT9)/T89<1.5$. A relationship between the center thickness of the eighth lens on the optical axis, the center thickness of the ninth lens on the optical axis, and the air space of the eighth lens and the ninth lens on the optical axis is controlled reasonably to facilitate the injection molding of the ninth lens, improve the machinability of the optical imaging lens assembly, and meanwhile, ensure relatively high imaging quality of the optical imaging lens assembly.

In the exemplary implementation mode, a center thickness CT7 of the seventh lens on the optical axis and an air space T78 of the seventh lens and the eighth lens on the optical axis may meet $1.0<T78/CT7<2.0$. A ratio of the center thickness of the seventh lens on the optical axis to the air space of the seventh lens and the eighth lens on the optical axis may be controlled in a reasonable numerical range to effectively adjust a chief ray angle of the optical imaging lens assembly, improve the relative brightness of the optical imaging lens assembly and improve the resolution of the imaging surface.

In the exemplary implementation mode, an air space T56 of the fifth lens and the sixth lens on the optical axis and an air space T67 of the sixth lens and the seventh lens on the optical axis may meet $1.0<T67/T56<4.0$. A ratio of the air space of the fifth lens and the sixth lens on the optical axis and the air space of the sixth lens and the seventh lens on the optical axis is controlled in a reasonable numerical range to help to improve the assembling stability of each lens in the optical imaging lens assembly and the consistency of the optical performance of optical imaging lens assemblies produced in batches.

In the exemplary implementation mode, the optical imaging lens assembly may further include a diaphragm. The diaphragm may be arranged at a proper position as required. For example, the diaphragm may be arranged between the object side and the first lens. Optionally, the optical imaging lens assembly may further include an optical filter configured to correct the chromatic aberration and/or protective glass configured to protect a photosensitive element on the imaging surface.

The disclosure discloses an optical imaging lens assembly with the characteristics of large image surface, high pixel, high imaging quality, large field of view, and the like. The optical imaging lens assembly according to the implementation mode of the disclosure may adopt multiple lenses, for example, the abovementioned nine lenses. The refractive power and surface types of each lens, the center thickness of each lens, on-axis distances between the lenses, and the like may be reasonably configured to effectively converge incident light, reduce the total track length of the imaging lens assembly, improve the machinability of the imaging lens assembly and ensure that the optical imaging lens assembly is more favorable for production and machining.

In the exemplary implementation mode, at least one of mirror surfaces of each lens is an aspheric mirror surface, namely at least one mirror surface in the object-side surface of the first lens to the image-side surface of the sixth lens is an aspheric mirror surface. An aspheric lens has a characteristic that a curvature keeps changing from a center of the lens to a periphery of the lens.

Unlike a spherical lens with a constant curvature from a center of the lens to a periphery of the lens, the aspheric lens has a better curvature radius characteristic and the advantages of improving distortions and improving astigmatic aberrations. With the adoption of the aspheric lens, astigmatic aberrations during imaging may be eliminated as much as possible, thereby improving the imaging quality. Optionally, at least one of the object-side surface and image-side surface of each lens in the first lens, the second lens, the third lens, the fourth lens, the fifth lens, the sixth lens, the seventh lens, the eighth lens, and the ninth lens is an aspheric mirror surface. Optionally, both the object-side surface and image-side surface of each lens in the first lens, the second lens, the third lens, the fourth lens, the fifth lens, the sixth lens, the seventh lens, the eighth lens, and the ninth lens are aspheric mirror surfaces.

However, those skilled in the art should know that the number of the lenses forming the optical imaging lens assembly may be changed without departing from the technical solutions claimed in the disclosure to achieve each result and advantage described in the specification. For example, although descriptions are made in the implementation with nine lenses as an example, the optical imaging lens assembly is not limited to nine lenses. If necessary, the optical imaging lens assembly may further include another number of lenses.

Specific embodiments applied to the optical imaging lens assembly of the abovementioned implementation mode will further be described below with reference to the drawings.

Embodiment 1

An optical imaging lens assembly according to embodiment 1 of the disclosure will be described below with reference to FIG. 1 to FIG. 2D. FIG. 1 shows a structure diagram of an optical imaging lens assembly according to embodiment 1 of the disclosure.

As shown in FIG. 1, the optical imaging lens assembly sequentially includes, from an object side to an image side along an optical axis, a diaphragm STO, a first lens E1, a second lens E2, a third lens E3, a fourth lens E4, a fifth lens E5, a sixth lens E6, a seventh lens E7, an eighth lens E8, a ninth lens E9, an optical filter E10, and an imaging surface S21.

The first lens E1 has a positive refractive power, an object-side surface S1 thereof is a convex surface, while an image-side surface S2 is a concave surface. The second lens E2 has a negative refractive power, an object-side surface S3 thereof is a convex surface, while an image-side surface S4 is a concave surface. The third lens E3 has a positive refractive power, an object-side surface S5 thereof is a convex surface, while an image-side surface S6 is a concave surface. The fourth lens E4 has a positive refractive power, an object-side surface S7 thereof is a convex surface, while an image-side surface S8 is a concave surface. The fifth lens E5 has a positive refractive power, an object-side surface S9 thereof is a concave surface, while an image-side surface S10 is a convex surface. The sixth lens E6 has a negative refractive power, an object-side surface S11 thereof is a convex surface, while an image-side surface S12 is a concave surface. The seventh lens E7 has a positive refractive power, an object-side surface S13 thereof is a convex surface, while an image-side surface S14 is a convex surface. The eighth lens E8 has a positive refractive power, an object-side surface S15 thereof is a convex surface, while an image-side surface S16 is a concave surface. The ninth lens E9 has a negative refractive power, an object-side surface S17 thereof is a concave surface, while an image-side surface S18 is a concave surface. The optical filter E10 has an object-side surface S19 and an image-side surface S20. Light from an object sequentially penetrates through each of the surfaces S1 to S20 and is finally imaged on the imaging surface S21.

Table 1 is a basic parameter table of the optical imaging lens assembly of embodiment 1, and units of the curvature radius, the thickness/distance and the focal length are all millimeter (mm).

TABLE 1

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.7341 | | | | |
| S1 | Aspheric | 3.0809 | 0.7726 | 1.55 | 56.1 | 7.37 | −0.0342 |
| S2 | Aspheric | 11.9439 | 0.1360 | | | | −2.9754 |
| S3 | Aspheric | 8.1332 | 0.2500 | 1.68 | 19.2 | −18.70 | 1.2494 |
| S4 | Aspheric | 4.8975 | 0.3194 | | | | 0.0554 |
| S5 | Aspheric | 9.3288 | 0.3653 | 1.55 | 56.1 | 67.22 | 12.5989 |
| S6 | Aspheric | 12.3311 | 0.3890 | | | | −33.4783 |
| S7 | Aspheric | 50.4344 | 0.3250 | 1.65 | 23.5 | 99.91 | 0.0000 |
| S8 | Aspheric | 230.0120 | 0.2354 | | | | 0.0000 |
| S9 | Aspheric | −11.1690 | 0.3957 | 1.55 | 56.1 | 53.28 | 0.0000 |
| S10 | Aspheric | −8.1737 | 0.1630 | | | | 0.0000 |
| S11 | Aspheric | 216.7782 | 0.3991 | 1.68 | 19.2 | −26.05 | 0.0000 |
| S12 | Aspheric | 16.3518 | 0.4601 | | | | 0.0000 |
| S13 | Aspheric | 120.3802 | 0.4499 | 1.57 | 37.3 | 35.32 | 0.0000 |
| S14 | Aspheric | −24.2098 | 0.7187 | | | | 0.0000 |
| S15 | Aspheric | 5.6415 | 0.9291 | 1.55 | 56.1 | 11.10 | −1.1342 |
| S16 | Aspheric | 75.8060 | 1.2866 | | | | 0.0000 |
| S17 | Aspheric | −3.9607 | 0.7653 | 1.55 | 56.1 | −5.18 | −1.3236 |
| S18 | Aspheric | 10.6146 | 0.1495 | | | | 0.0000 |
| S19 | Spherical | Infinite | 0.2100 | 1.52 | 64.2 | | |

TABLE 1-continued

| Surface number | Surface type | Curvature radius | Thickness/ distance | Material Refractive index | Abbe number | Focal length | Conic coefficient |
|---|---|---|---|---|---|---|---|
| S20 | Spherical | Infinite | 0.6424 | | | | |
| S21 | Spherical | Infinite | | | | | |

In the embodiment, a total effective focal length f of the optical imaging lens assembly is 7.83 mm, TTL is a distance from the object-side surface S1 of the first lens E1 to the imaging surface S21 on the optical axis, TTL is 9.36 mm, ImgH is a half of a diagonal length of an effective pixel region on the imaging surface S21, ImgH is 7.50 mm, Fno is a relative F number (i.e., aperture value) of the optical imaging lens assembly, Fno is 1.98, Semi-FOV is a half of a maximum field of view of the optical imaging lens assembly, and Semi-FOV is 42.9°.

In embodiment 1, both the object-side surface and image-side surface of any lens in the first lens E1 to the ninth lens E9 are aspheric surfaces, and a surface type x of each aspheric lens may be defined through, but not limited to, the following aspheric surface formula:

$$x = \frac{ch^2}{1 + \sqrt{1 - (k+1)c^2h^2}} + \sum A_i h^i, \quad (1)$$

wherein x is a distance vector height from a vertex of the aspheric surface when the aspheric surface is at a height of h along the optical axis direction; c is a paraxial curvature of the aspheric surface, c=1/R (namely, the paraxial curvature c is a reciprocal of the curvature radius R in Table 1); k is a conic coefficient; and Ai is a correction coefficient of the i-th order of the aspheric surface. Table 2 shows high-order coefficients $A_4$, $A_6$, $A_8$, $A_{10}$, $A_{12}$, $A_{14}$, $A_{16}$, $A_{18}$ and $A_{20}$ applied to the aspheric mirror surfaces S1-S18 in embodiment 1.

Figure 2A:
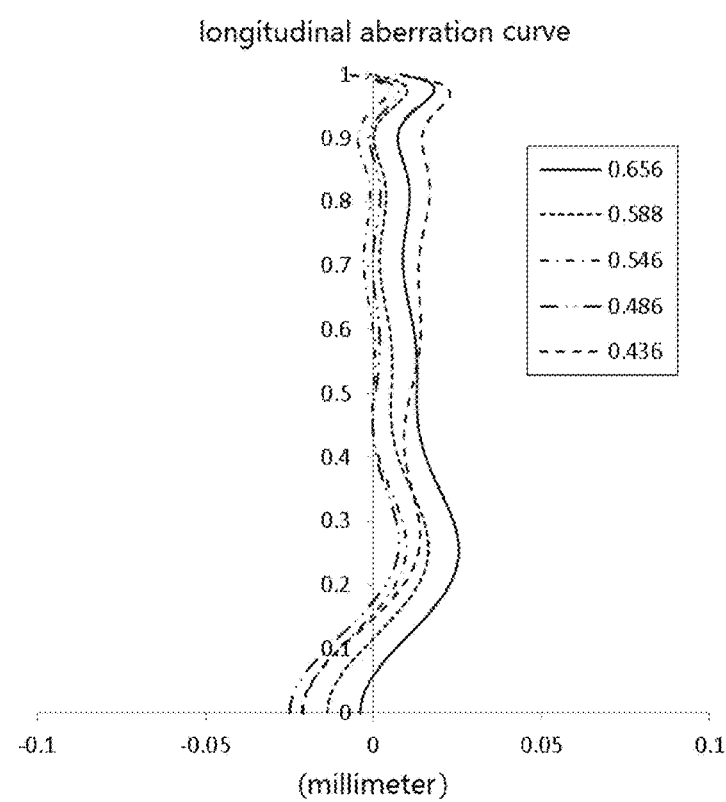
FIG. 2A to FIG. 2D show a longitudinal aberration curve, an astigmatism curve, a distortion curve, and a lateral color curve of an optical imaging lens assembly according to embodiment 1 respectively.
Figure 2B:
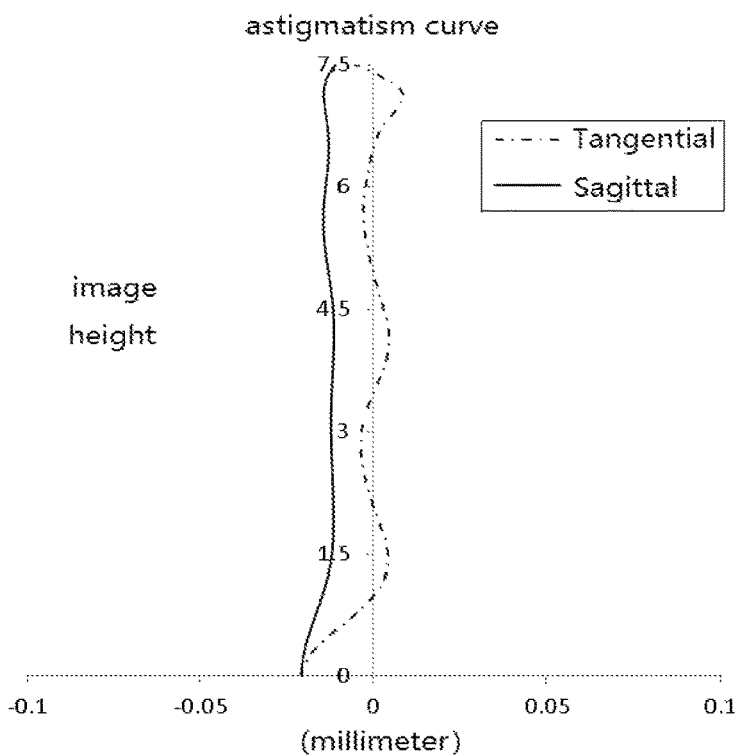
Figure 2C:
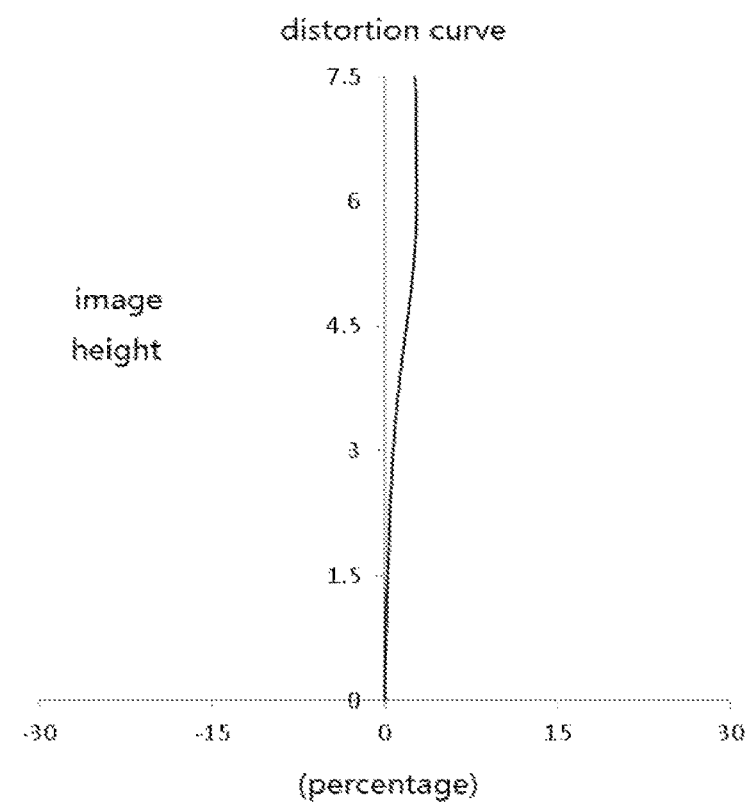
Figure 2D:
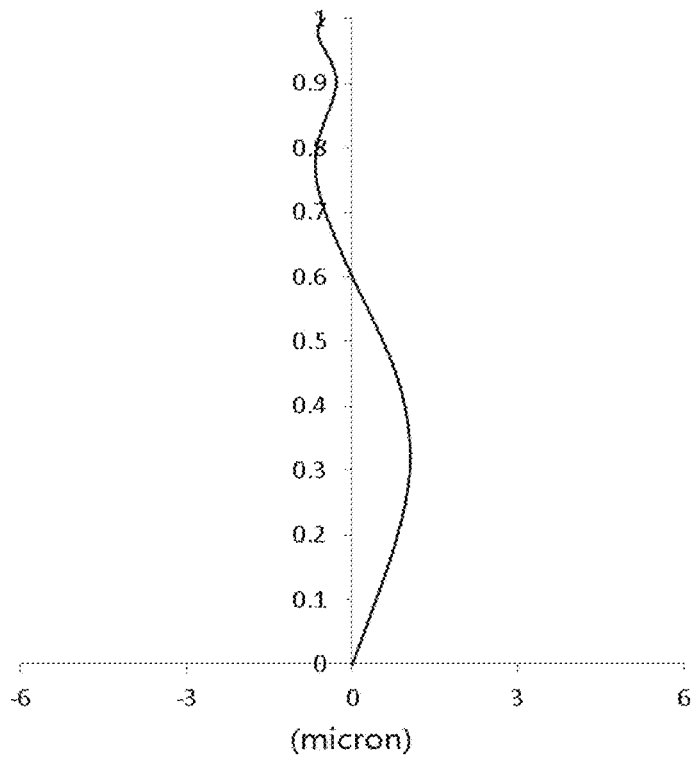

FIG. 2A shows a longitudinal aberration curve of the optical imaging lens assembly according to embodiment 1 to represent deviation of a convergence focal point after light with different wavelengths passes through the lens assembly. FIG. 2B shows an astigmatism curve of the optical imaging lens assembly according to embodiment 1 to represent a tangential image surface curvature and a sagittal image surface curvature. FIG. 20 shows a distortion curve of the optical imaging lens assembly according to embodiment 1 to represent distortion values corresponding to different image heights. FIG. 2D shows a lateral color curve of the optical imaging lens assembly according to embodiment 1 to represent deviation of different image heights on the imaging surface after the light passes through the lens assembly. According to FIG. 2A to FIG. 2D, it can be seen that the optical imaging lens assembly provided in embodiment 1 may achieve high imaging quality.

Embodiment 2

Figure 3:
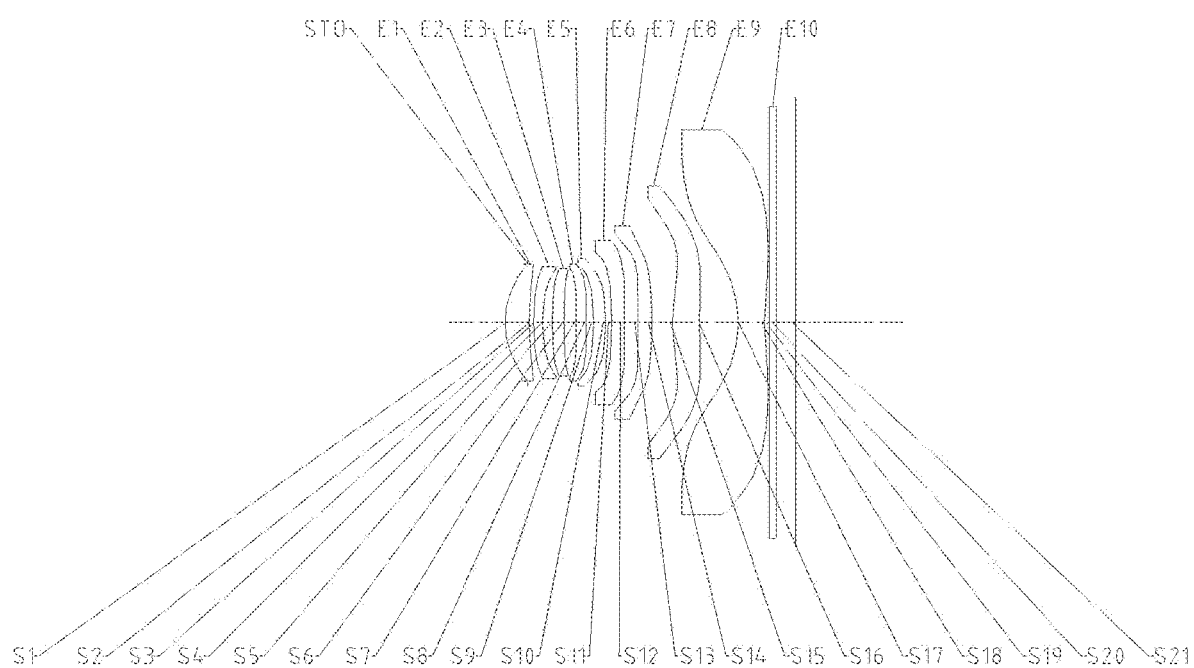
FIG. 3 shows a structure diagram of an optical imaging lens assembly according to embodiment 2 of the disclosure.

An optical imaging lens assembly according to embodiment 2 of the disclosure will be described below with reference to FIG. 3 to FIG. 4D. FIG. 3 shows a structure diagram of an optical imaging lens assembly according to embodiment 2 of the disclosure.

As shown in FIG. 3, the optical imaging lens assembly sequentially includes, from an object side to an image side along an optical axis, a diaphragm STO, a first lens E1, a second lens E2, a third lens E3, a fourth lens E4, a fifth lens E5, a sixth lens E6, a seventh lens E7, an eighth lens E8, a ninth lens E9, an optical filter E10, and an imaging surface S21.

The first lens E1 has a positive refractive power, an object-side surface S1 thereof is a convex surface, while an image-side surface S2 is a concave surface. The second lens E2 has a negative refractive power, an object-side surface S3 thereof is a convex surface, while an image-side surface S4 is a concave surface. The third lens E3 has a positive refractive power, an object-side surface S5 thereof is a convex surface, while an image-side surface S6 is a concave surface. The fourth lens E4 has a positive refractive power,

TABLE 2

| Surface number | A4 | A6 | A8 | A10 | A12 | A14 | A16 | A18 | A20 |
|---|---|---|---|---|---|---|---|---|---|
| S1 | −1.4380E−04 | 1.1782E−03 | −1.8790E−03 | 1.6253E−03 | −8.8715E−04 | 3.0030E−04 | −6.2114E−05 | 7.2140E−06 | −3.6903E−07 |
| S2 | −1.3156E−03 | −2.2118E−03 | 5.3087E−03 | −5.3012E−03 | 3.0485E−03 | −1.0688E−03 | 2.2456E−04 | −2.5999E−05 | 1.2706E−06 |
| S3 | −9.2354E−04 | 1.6921E−03 | 2.5019E−03 | −3.6978E−03 | 2.5982E−03 | −1.0746E−03 | 2.6648E−04 | −3.7063E−05 | 2.2449E−06 |
| S4 | 3.2811E−03 | −1.2948E−03 | 8.1455E−03 | −1.0239E−02 | 7.4255E−03 | −3.2941E−03 | 8.9036E−04 | −1.3540E−04 | 8.8815E−06 |
| S5 | −6.2030E−03 | 2.2734E−03 | −3.4312E−03 | 3.9915E−03 | −2.6000E−03 | 1.0373E−03 | −2.3012E−04 | 2.5286E−05 | −9.9751E−07 |
| S6 | −2.5187E−03 | −2.5238E−03 | 4.5290E−03 | −4.8510E−03 | 3.4928E−03 | −1.5872E−03 | 4.5183E−04 | −7.2053E−05 | 4.9054E−06 |
| S7 | −9.3445E−03 | −1.1123E−02 | 1.5354E−02 | −1.5959E−02 | 1.0766E−02 | −4.6956E−03 | 1.2626E−03 | −1.8931E−04 | 1.2005E−05 |
| S8 | −2.9963E−03 | −2.1976E−02 | 2.5384E−02 | −2.1691E−02 | 1.2277E−02 | −4.5088E−03 | 1.0295E−03 | −1.3323E−04 | 7.5010E−06 |
| S9 | 1.0745E−02 | −2.6584E−02 | 1.4117E−02 | −3.6523E−03 | −1.5182E−03 | 1.6693E−03 | −5.9691E−04 | 9.9465E−05 | −6.4182E−06 |
| S10 | 1.6067E−02 | −3.6642E−02 | 2.8002E−02 | −1.4832E−02 | 4.9323E−03 | −9.5804E−04 | 9.1719E−05 | −1.6016E−06 | −2.3914E−07 |
| S11 | −1.1134E−02 | −1.7467E−02 | 1.8628E−02 | −9.8659E−03 | 3.1370E−03 | −6.1561E−04 | 7.1461E−05 | −4.3397E−06 | 9.6200E−08 |
| S12 | −1.8306E−02 | −3.9942E−03 | 6.0510E−03 | −2.9039E−03 | 8.0043E−04 | −1.3715E−04 | 1.4387E−05 | −8.4718E−07 | 2.1501E−08 |
| S13 | −1.1343E−03 | −4.2890E−03 | 1.8937E−03 | −5.2974E−04 | 6.7158E−05 | −4.2187E−07 | −8.3749E−07 | 8.4441E−08 | −2.5991E−09 |
| S14 | −8.0246E−03 | −1.0938E−03 | 1.1807E−03 | −4.1804E−04 | 7.1827E−05 | −6.2725E−06 | 2.5362E−07 | −2.2444E−09 | −8.4001E−11 |
| S15 | −7.7427E−03 | −1.5454E−03 | 5.1781E−04 | −9.6994E−05 | 1.1033E−05 | −7.5419E−07 | 3.0368E−08 | −6.6430E−10 | 6.0902E−12 |
| S16 | 6.3549E−03 | −3.3563E−03 | 5.8214E−04 | −6.7757E−05 | 5.3905E−06 | −2.7741E−07 | 8.6951E−09 | −1.5017E−10 | 1.0952E−12 |
| S17 | 9.1198E−05 | −1.0046E−03 | 2.1352E−04 | −1.8091E−05 | 8.5406E−07 | −2.4505E−08 | 4.2756E−10 | −4.2002E−12 | 1.7938E−14 |
| S18 | −6.9235E−03 | 3.8190E−04 | −3.2389E−06 | −1.1763E−06 | 8.9709E−08 | −3.3637E−09 | 7.1883E−11 | −8.2725E−13 | 3.9576E−15 | an object-side surface S7 thereof is a convex surface, while an image-side surface S8 is a concave surface. The fifth lens E5 has a positive refractive power, an object-side surface S9 thereof is a concave surface, while an image-side surface S10 is a convex surface. The sixth lens E6 has a negative refractive power, an object-side surface S11 thereof is a convex surface, while an image-side surface S12 is a concave surface. The seventh lens E7 has a positive refractive power, an object-side surface S13 thereof is a convex surface, while an image-side surface S14 is a convex surface. The eighth lens E8 has a positive refractive power, an object-side surface S15 thereof is a convex surface, while an image-side surface S16 is a concave surface. The ninth lens E9 has a negative refractive power, an object-side surface S17 thereof is a concave surface, while an image-side surface S18 is a concave surface. The optical filter E10 has an object-side surface S19 and an image-side surface S20.

Light from an object sequentially penetrates through each of the surfaces S1 to S20 and is finally imaged on the imaging surface S21.

In the embodiment, a total effective focal length f of the optical imaging lens assembly is 8.01 mm, TTL is a distance from the object-side surface S1 of the first lens E1 to the imaging surface S21 on the optical axis, TTL is 9.48 mm, ImgH is a half of a diagonal length of an effective pixel region on the imaging surface S21 ImgH is 7.50 mm, Fno is a relative F number (i.e., aperture value) of the optical imaging lens assembly, Fno is 1.98, Semi-FOV is a half of a maximum field of view of the optical imaging lens assembly, and Semi-FOV is 42.3°.

Table 3 is a basic parameter table of the optical imaging lens assembly of embodiment 2, and units of the curvature radius, the thickness/distance and the focal length are all millimeter (mm).

TABLE 3

| Surface number | Surface type | Curvature radius | Thickness/ distance | Material Refractive index | Material Abbe number | Focal length | Conic coefficient |
|---|---|---|---|---|---|---|---|
| OBJ | Spherical | Infinite | Infinite | | | | |
| STO | Spherical | Infinite | −0.7341 | | | | |
| S1 | Aspheric | 3.0769 | 0.7876 | 1.55 | 56.1 | 7.24 | −0.0375 |
| S2 | Aspheric | 12.5653 | 0.1406 | | | | −3.3692 |
| S3 | Aspheric | 8.7186 | 0.2725 | 1.68 | 19.2 | −18.33 | 1.3041 |
| S4 | Aspheric | 5.0634 | 0.3321 | | | | 0.0363 |
| S5 | Aspheric | 9.6257 | 0.3774 | 1.55 | 56.1 | 73.14 | 12.4528 |
| S6 | Aspheric | 12.5034 | 0.4043 | | | | −34.1464 |
| S7 | Aspheric | 43.9000 | 0.3256 | 1.65 | 23.5 | 99.91 | 0.0000 |
| S8 | Aspheric | 136.8141 | 0.2440 | | | | 0.0000 |
| S9 | Aspheric | −11.1474 | 0.3897 | 1.55 | 56.1 | 61.58 | 0.0000 |
| S10 | Aspheric | −8.4772 | 0.1930 | | | | 0.0000 |
| S11 | Aspheric | 500.0000 | 0.4247 | 1.68 | 19.2 | −26.42 | 0.0000 |
| S12 | Aspheric | 17.3237 | 0.4422 | | | | 0.0000 |
| S13 | Aspheric | 72.8923 | 0.4479 | 1.57 | 37.3 | 37.86 | 0.0000 |
| S14 | Aspheric | −30.6808 | 0.6598 | | | | 0.0000 |
| S15 | Aspheric | 5.8299 | 0.8972 | 1.55 | 56.1 | 11.22 | 0.0000 |
| S16 | Aspheric | 111.1035 | 1.2590 | | | | 0.0000 |
| S17 | Aspheric | −4.1826 | 0.8658 | 1.55 | 56.1 | −5.29 | −1.3092 |
| S18 | Aspheric | 10.0766 | 0.1651 | | | | 0.0000 |
| S19 | Spherical | Infinite | 0.2100 | 1.52 | 64.2 | | |
| S20 | Spherical | Infinite | 0.6424 | | | | |
| S21 | Spherical | Infinite | | | | | |

In embodiment 2, both the object-side surface and image-side surface of any lens in the first lens E1 to the ninth lens E9 are aspheric surfaces. Table 4 shows high-order coefficients $A_4$, $A_6$, $A_8$, $A_{10}$, $A_{12}$, $A_{14}$, $A_{16}$, $A_{18}$ and $A_{20}$ applied to the aspheric mirror surfaces S1-S18 in embodiment 2.

TABLE 4

| Surface number | A4 | A6 | A8 | A10 | A12 | A14 | A16 | A18 | A20 |
|---|---|---|---|---|---|---|---|---|---|
| S1 | −1.8407E−04 | 1.2052E−03 | −2.0666E−03 | 1.9265E−03 | −1.1259E−03 | 4.0836E−04 | −9.0524E−05 | 1.1245E−05 | −6.0692E−07 |
| S2 | −1.9388E−03 | −9.3462E−04 | 3.8517E−03 | −4.1649E−03 | 2.4537E−03 | −8.7255E−04 | 1.8627E−04 | −2.2018E−05 | 1.1039E−06 |
| S3 | −1.6408E−03 | 3.4604E−03 | 6.5157E−04 | −2.2587E−03 | 1.7040E−03 | −6.8580E−04 | 1.6052E−04 | −2.0842E−05 | 1.1738E−06 |
| S4 | 2.3283E−03 | 1.1349E−03 | 4.6784E−03 | −6.6649E−03 | 4.8570E−03 | −2.0948E−03 | 5.4572E−04 | −7.9775E−05 | 5.0013E−06 |
| S5 | −6.7306E−03 | 2.1926E−03 | −2.0870E−03 | 2.1728E−03 | −1.2857E−03 | 4.6694E−04 | −8.4654E−05 | 5.3962E−06 | 1.1546E−07 |
| S6 | −3.3896E−03 | −8.4210E−04 | 2.0985E−03 | −2.2539E−03 | 1.7267E−03 | −8.3992E−04 | 2.6004E−04 | −4.4784E−05 | 3.2575E−06 |
| S7 | −9.9572E−03 | −8.8845E−03 | 1.0565E−02 | −9.6306E−03 | 5.6374E−03 | −2.1219E−03 | 4.8381E−04 | −5.9277E−05 | 2.8216E−06 |
| S8 | −4.0804E−03 | −1.7654E−02 | 1.7528E−02 | −1.3456E−02 | 6.8971E−03 | −2.2954E−03 | 4.7232E−04 | −5.4789E−05 | 2.7702E−06 |
| S9 | 1.0754E−02 | −2.4538E−02 | 1.1412E−02 | −2.1996E−03 | −1.7703E−03 | 1.5733E−03 | −5.3738E−04 | 8.7620E−05 | −5.5726E−06 |
| S10 | 1.4008E−02 | −3.1345E−02 | 2.2850E−02 | −1.2650E−02 | 4.7274E−03 | −1.1270E−03 | 1.6207E−04 | −1.2689E−05 | 4.1413E−07 |
| S11 | −1.3775E−02 | −1.0617E−02 | 1.1541E−02 | −5.9656E−03 | 1.8806E−03 | −3.7429E−04 | 4.4856E−05 | −2.8609E−06 | 6.8099E−08 |
| S12 | −2.0089E−02 | −6.6063E−04 | 2.9543E−03 | −1.3596E−03 | 3.4971E−04 | −5.7393E−05 | 5.9478E−06 | −3.5626E−07 | 9.4411E−09 |
| S13 | −2.9186E−03 | −1.9648E−03 | 5.8939E−04 | −1.6750E−04 | 1.8912E−05 | 1.1408E−06 | −4.9491E−07 | 4.4061E−08 | −1.2548E−09 |
| S14 | −9.4658E−03 | 1.0483E−03 | 1.5378E−04 | −1.6728E−04 | 3.9081E−05 | −4.3128E−06 | 2.5684E−07 | −8.2518E−09 | 1.1946E−10 |
| S15 | −1.0178E−02 | −7.5212E−04 | 2.0731E−04 | −1.7744E−05 | −1.8006E−06 | 5.7928E−07 | −5.9319E−08 | 3.2159E−09 | −9.8601E−11 |

TABLE 4-continued

| Surface number | A4 | A6 | A8 | A10 | A12 | A14 | A16 | A18 | A20 |
|---|---|---|---|---|---|---|---|---|---|
| S16 | 5.8075E−03 | −3.3447E−03 | 5.5954E−04 | −5.7713E−05 | 3.7309E−06 | −1.3653E−07 | 2.0935E−09 | 1.2508E−11 | −5.5326E−13 |
| S17 | 7.0835E−04 | −1.3768E−03 | 2.8901E−04 | −2.6066E−05 | 1.3508E−06 | −4.3478E−08 | 8.6557E−10 | −9.8214E−12 | 4.8771E−14 |
| S18 | −6.5730E−03 | 2.5656E−04 | 1.3143E−05 | −2.4079E−06 | 1.4686E−07 | −5.0043E−09 | 1.0022E−10 | −1.0977E−12 | 5.0563E−15 |

Figure 4A:
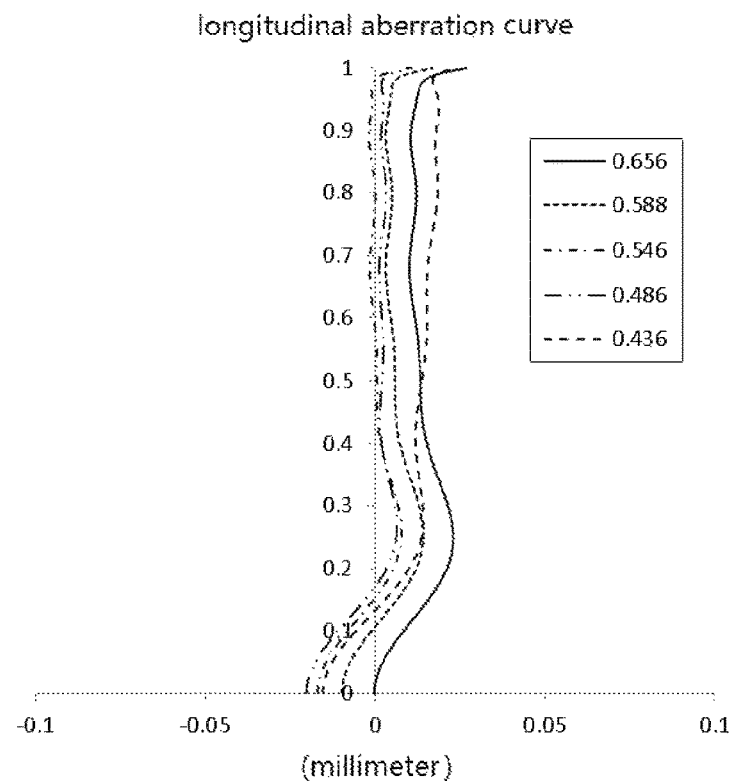
FIG. 4A to FIG. 4D show a longitudinal aberration curve, an astigmatism curve, a distortion curve, and a lateral color curve of an optical imaging lens assembly according to embodiment 2 respectively.
Figure 4B:
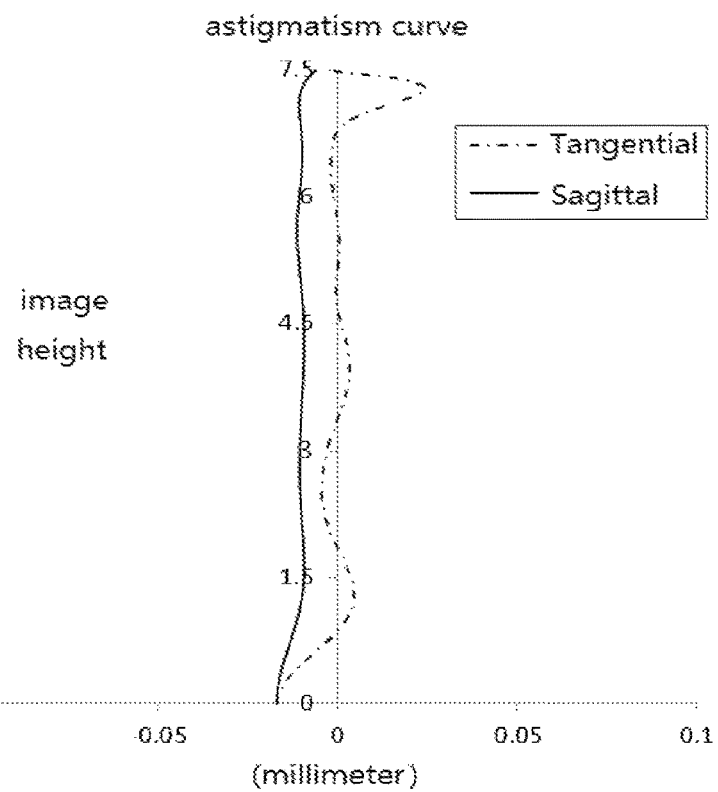
Figure 4C:
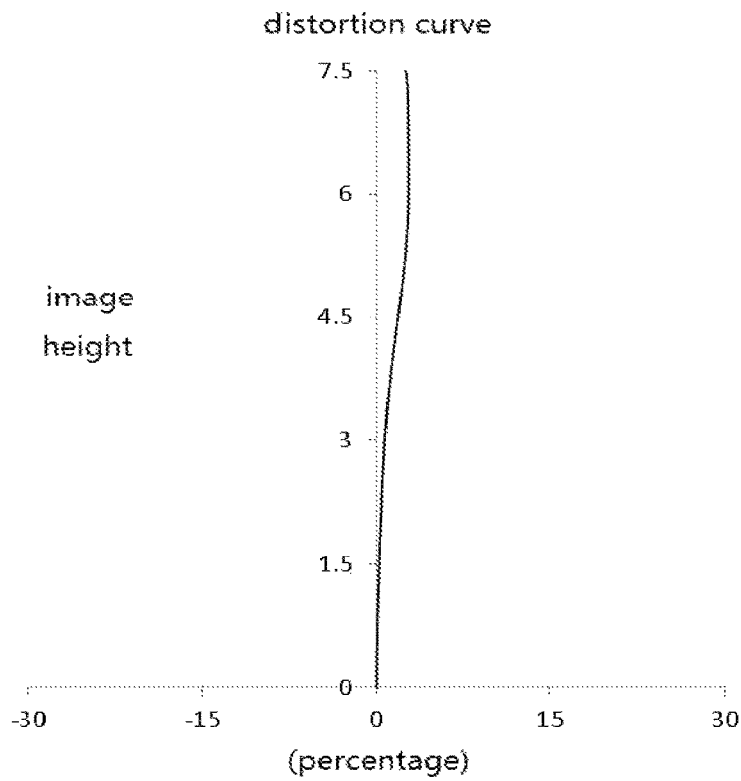
Figure 4D:
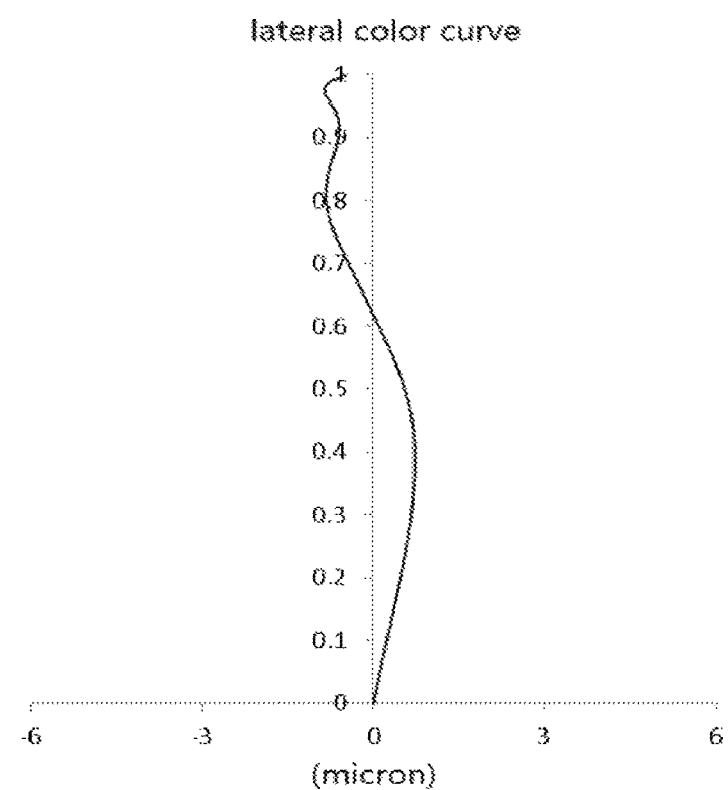

FIG. 4A shows a longitudinal aberration curve of the optical imaging lens assembly according to embodiment 2 to represent deviation of a convergence focal point after light with different wavelengths passes through the lens assembly. FIG. 4B shows an astigmatism curve of the optical imaging lens assembly according to embodiment 2 to represent a tangential image surface curvature and a sagittal image surface curvature. FIG. 4C shows a distortion curve of the optical imaging lens assembly according to embodiment 2 to represent distortion values corresponding to different image heights. FIG. 4D shows a lateral color curve of the optical imaging lens assembly according to embodiment 2 to represent deviation of different image heights on the imaging surface after the light passes through the lens assembly. According to FIG. 4A to FIG. 4D, it can be seen that the optical imaging lens assembly provided in embodiment 2 may achieve high imaging quality.

Embodiment 3

Figure 5:
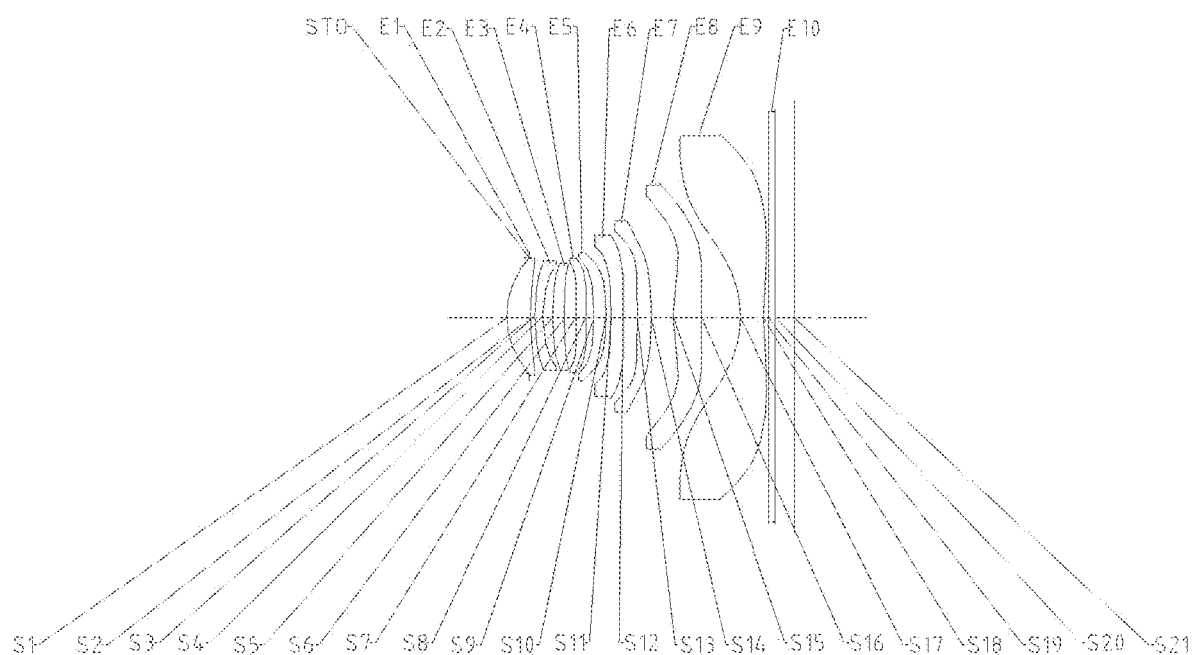
FIG. 5 shows a structure diagram of an optical imaging lens assembly according to embodiment 3 of the disclosure.

An optical imaging lens assembly according to embodiment 3 of the disclosure will be described below with reference to FIG. 5 to FIG. 6D. FIG. 5 shows a structure diagram of an optical imaging lens assembly according to embodiment 3 of the disclosure.

As shown in FIG. 5, the optical imaging lens assembly sequentially includes, from an object side to an image side along an optical axis, a diaphragm STO, a first lens E1, a second lens E2, a third lens E3, a fourth lens E4, a fifth lens E5, a sixth lens E6, a seventh lens E7, an eighth lens E8, a ninth lens E9, an optical filter E10, and an imaging surface S21.

The first lens E1 has a positive refractive power, an object-side surface S1 thereof is a convex surface, while an image-side surface S2 is a concave surface. The second lens E2 has a negative refractive power, an object-side surface S3 thereof is a convex surface, while an image-side surface S4 is a concave surface. The third lens E3 has a positive refractive power, an object-side surface S5 thereof is a convex surface, while an image-side surface S6 is a concave surface. The fourth lens E4 has a positive refractive power, an object-side surface S7 thereof is a convex surface, while an image-side surface S8 is a concave surface. The fifth lens E5 has a positive refractive power, an object-side surface S9 thereof is a concave surface, while an image-side surface S10 is a convex surface. The sixth lens E6 has a negative refractive power, an object-side surface S11 thereof is a concave surface, while an image-side surface S12 is a concave surface. The seventh lens E7 has a positive refractive power, an object-side surface S13 thereof is a convex surface, while an image-side surface S14 is a convex surface. The eighth lens E8 has a positive refractive power, an object-side surface S15 thereof is a convex surface, while an image-side surface S16 is a concave surface. The ninth lens E9 has a negative refractive power, an object-side surface S17 thereof is a concave surface, while an image-side surface S18 is a concave surface. The optical filter E10 has an object-side surface S19 and an image-side surface S20. Light from an object sequentially penetrates through each of the surfaces S1 to S20 and is finally imaged on the imaging surface S21.

In the embodiment, a total effective focal length f of the optical imaging lens assembly is 7.93 mm, TTL is a distance from the object-side surface S1 of the first lens E1 to the imaging surface S21 on the optical axis, TTL is 9.40 mm, ImgH is a half of a diagonal length of an effective pixel region on the imaging surface S21, ImgH is 7.50 mm, Fno is a relative F number (i.e., aperture value) of the optical imaging lens assembly, Fno is 1.98, Semi-FOV is a half of a maximum field of view of the optical imaging lens assembly, and Semi-FOV is 43.0°.

Table 5 is a basic parameter table of the optical imaging lens assembly of embodiment 3, and units of the curvature radius, the thickness/distance and the focal length are all millimeter (mm).

TABLE 5

| Surface number | Surface type | Curvature radius | Thickness/ distance | Material | | Focal length | Conic coefficient |
| | | | | Refractive index | Abbe number | | |
|---|---|---|---|---|---|---|---|
| OBJ | Spherical | Infinite | Infinite | | | | |
| STO | Spherical | Infinite | −0.7341 | | | | |
| S1 | Aspheric | 3.0724 | 0.7780 | 1.55 | 56.1 | 7.39 | −0.0356 |
| S2 | Aspheric | 11.6862 | 0.1371 | | | | −2.8839 |
| S3 | Aspheric | 8.0785 | 0.2567 | 1.68 | 19.2 | −18.75 | 1.2734 |
| S4 | Aspheric | 4.8805 | 0.3264 | | | | 0.0508 |
| S5 | Aspheric | 9.2805 | 0.3696 | 1.55 | 56.1 | 64.15 | 12.5705 |
| S6 | Aspheric | 12.4441 | 0.4015 | | | | −32.3814 |
| S7 | Aspheric | 54.6411 | 0.3249 | 1.65 | 23.5 | 99.91 | 0.0000 |
| S8 | Aspheric | 355.0260 | 0.2420 | | | | 0.0000 |
| S9 | Aspheric | −12.1169 | 0.4023 | 1.55 | 56.1 | 53.95 | 0.0000 |
| S10 | Aspheric | −8.6886 | 0.1649 | | | | 0.0000 |
| S11 | Aspheric | −552.1556 | 0.3892 | 1.68 | 19.2 | −25.83 | 0.0000 |
| S12 | Aspheric | 18.1338 | 0.4604 | | | | 0.0000 |
| S13 | Aspheric | 106.3910 | 0.4565 | 1.57 | 37.3 | 32.88 | 0.0000 |

TABLE 5-continued

| Surface number | Surface type | Curvature radius | Thickness/ distance | Material Refractive index | Abbe number | Focal length | Conic coefficient |
|---|---|---|---|---|---|---|---|
| S14 | Aspheric | −22.7733 | 0.7094 | | | | 0.0000 |
| S15 | Aspheric | 6.2241 | 0.9187 | 1.55 | 56.1 | 11.57 | 0.0000 |
| S16 | Aspheric | 384.6979 | 1.2786 | | | | 0.0000 |
| S17 | Aspheric | −3.9459 | 0.7672 | 1.55 | 56.1 | −5.22 | −1.3058 |
| S18 | Aspheric | 10.9829 | 0.1620 | | | | 0.0000 |
| S19 | Spherical | Infinite | 0.2100 | 1.52 | 64.2 | | |
| S20 | Spherical | Infinite | 0.6424 | | | | |
| S21 | Spherical | Infinite | | | | | |

In embodiment 3, both the object-side surface and image-side surface of any lens in the first lens E1 to the ninth lens E9 are aspheric surfaces. Table 6 shows high-order coefficients $A_4, A_6, A_8, A_{10}, A_{12}, A_{14}, A_{16}, A_{18}$ and $A_{20}$ applied to the aspheric mirror surfaces S1-S18 in embodiment 3.

TABLE 6

| Surface number | A4 | A6 | A8 | A10 | A12 | A14 | A16 | A18 | A20 |
|---|---|---|---|---|---|---|---|---|---|
| S1 | 3.5924E−04 | −2.9894E−04 | 2.7283E−04 | −2.3542E−04 | 1.1138E−04 | −3.5184E−05 | 6.4634E−06 | −5.8462E−07 | 9.9180E−09 |
| S2 | −1.9256E−03 | −3.9397E−04 | 2.6647E−03 | −2.9982E−03 | 1.8096E−03 | −6.5923E−04 | 1.4434E−04 | −1.7557E−05 | 9.1014E−07 |
| S3 | −1.4688E−03 | 3.0933E−03 | 6.5721E−04 | −2.0287E−03 | 1.5692E−03 | −6.6264E−04 | 1.6442E−04 | −2.2773E−05 | 1.3740E−06 |
| S4 | 2.3310E−03 | 1.5300E−03 | 3.4352E−03 | −5.2436E−03 | 4.0506E−03 | −1.8539E−03 | 5.1272E−04 | −7.9363E−05 | 5.2463E−06 |
| S5 | −5.9914E−03 | 1.0551E−03 | −9.8659E−04 | 1.3718E−03 | −9.0372E−04 | 3.6405E−04 | −7.4558E−05 | 6.8705E−06 | −2.0164E−07 |
| S6 | −2.9915E−03 | −7.7202E−04 | 1.0642E−03 | −7.9908E−04 | 5.9796E−04 | −2.9411E−04 | 9.7575E−05 | −1.7544E−05 | 1.3037E−06 |
| S7 | −8.9373E−03 | −1.1386E−02 | 1.4798E−02 | −1.4339E−02 | 8.9509E−03 | −3.6058E−03 | 8.9739E−04 | −1.2495E−04 | 7.3488E−06 |
| S8 | −3.5431E−03 | −1.9415E−02 | 2.0485E−02 | −1.6408E−02 | 8.7610E−03 | −3.0516E−03 | 6.6509E−04 | −8.3021E−05 | 4.5767E−06 |
| S9 | 9.3846E−03 | −2.2900E−02 | 9.1396E−03 | 4.3027E−04 | −3.5634E−03 | 2.2913E−03 | −7.0767E−04 | 1.0988E−04 | −6.8052E−06 |
| S10 | 1.4903E−02 | −3.2634E−02 | 2.2957E−02 | −1.1718E−02 | 3.9645E−03 | −8.4350E−04 | 1.0384E−04 | −6.1706E−06 | 1.0089E−07 |
| S11 | −1.2716E−02 | −1.2054E−02 | 1.1733E−02 | −5.4047E−03 | 1.4707E−03 | −2.4210E−04 | 2.1946E−05 | −7.6474E−07 | −1.2389E−08 |
| S12 | −1.9862E−02 | −4.0599E−04 | 2.5200E−03 | −1.0321E−03 | 2.1739E−04 | −2.6971E−05 | 1.9474E−06 | −7.4942E−08 | 1.2146E−09 |
| S13 | −3.0731E−03 | −1.4904E−03 | 1.0775E−04 | 4.4512E−05 | −2.8192E−05 | 6.4203E−06 | −7.2671E−07 | 3.9743E−08 | −7.5582E−10 |
| S14 | −9.2685E−03 | 1.4673E−03 | −5.1484E−04 | 1.4704E−04 | −3.6538E−05 | 6.1533E−06 | −5.8210E−07 | 2.7848E−08 | −5.2405E−10 |
| S15 | −9.8123E−03 | −8.6443E−05 | −1.7011E−04 | 7.2523E−05 | −1.4257E−05 | 1.7019E−06 | −1.3075E−07 | 6.5379E−09 | −2.0582E−10 |
| S16 | 4.5717E−03 | −2.3386E−03 | 1.9391E−04 | 5.3757E−06 | −2.6580E−06 | 2.5709E−07 | −1.2429E−08 | 3.0755E−10 | −3.0909E−12 |
| S17 | 3.8283E−05 | −1.0164E−03 | 2.1446E−04 | −1.8162E−05 | 8.6544E−07 | −2.5431E−08 | 4.6334E−10 | −4.8630E−12 | 2.2717E−14 |
| S18 | −6.0772E−03 | 1.4370E−04 | 3.0757E−05 | −4.0293E−06 | 2.3519E−07 | −7.9396E−09 | 1.5877E−10 | −1.7413E−12 | 8.0514E−15 |

Figure 6A:
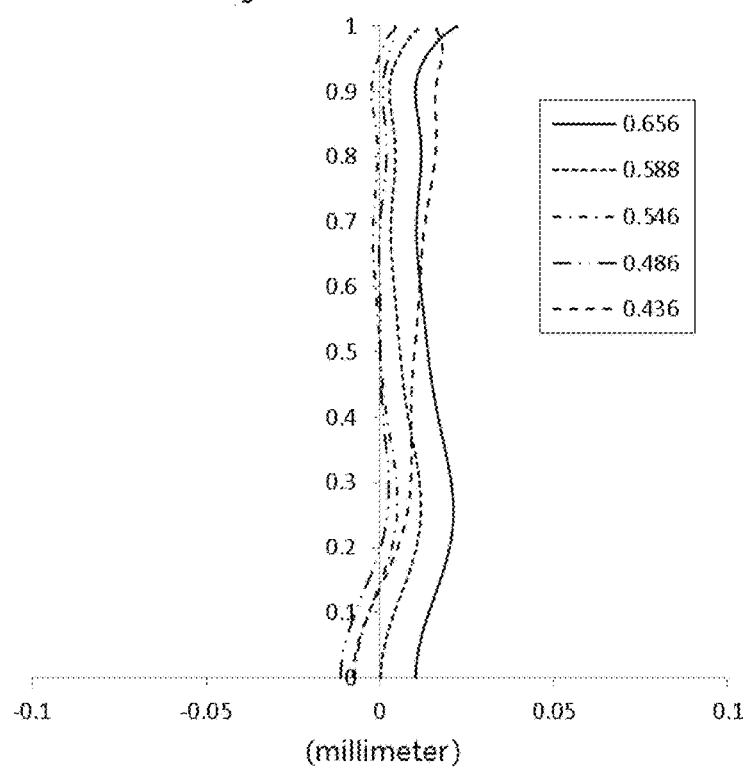
FIG. 6A to FIG. 6D show a longitudinal aberration curve, an astigmatism curve, a distortion curve, and a lateral color curve of an optical imaging lens assembly according to embodiment 3 respectively.
Figure 6B:
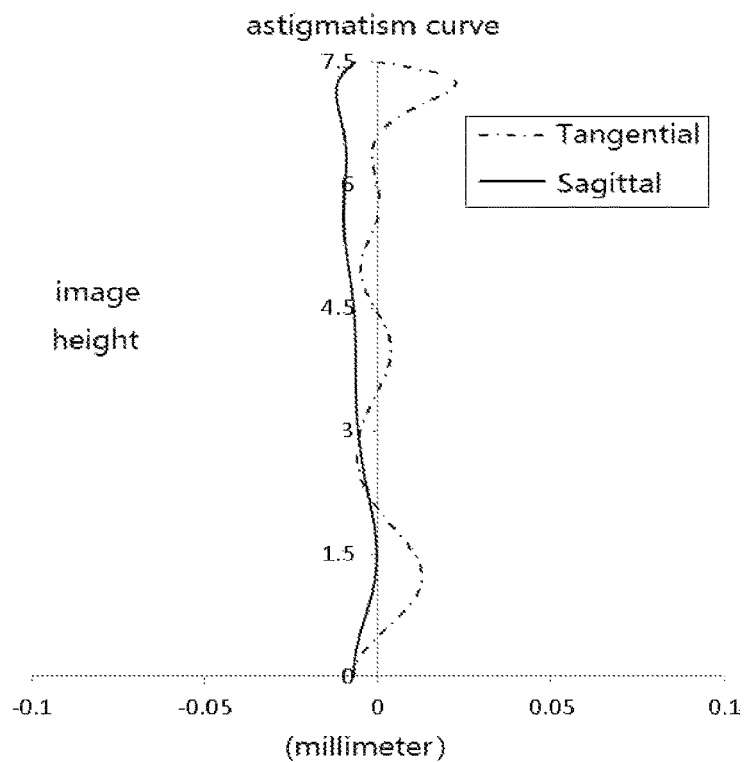
Figure 6C:
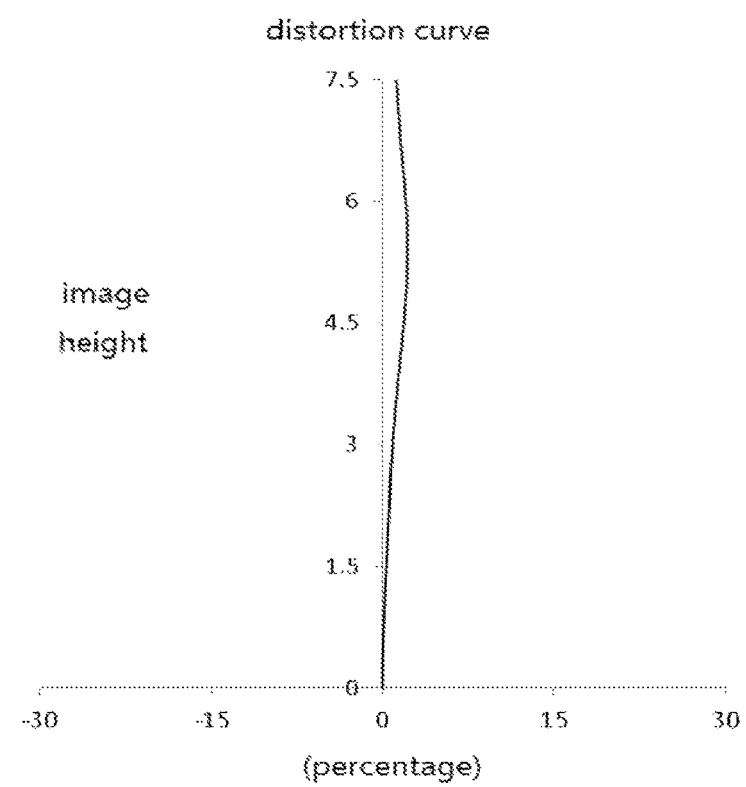
Figure 6D:
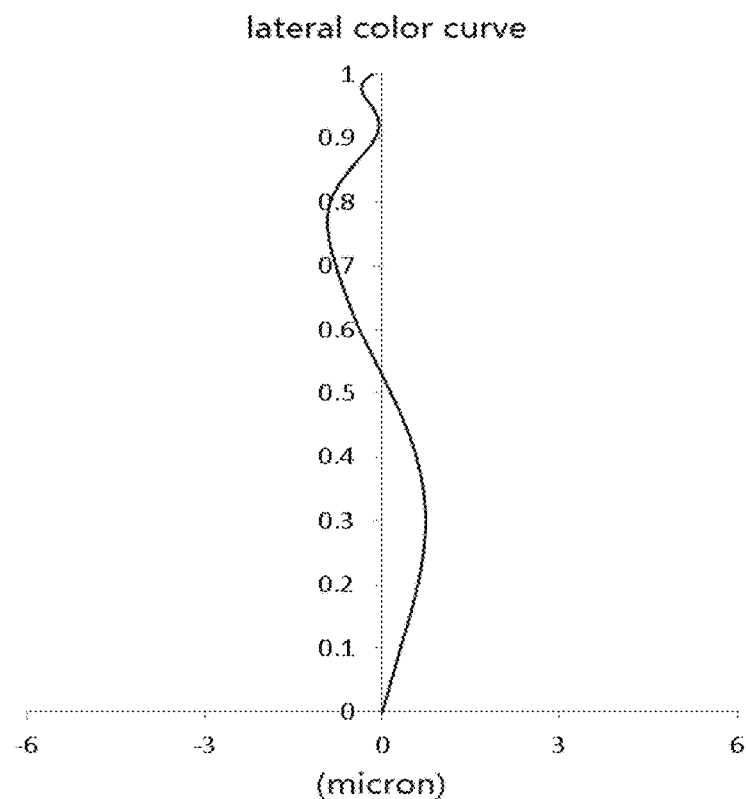

FIG. 6A shows a longitudinal aberration curve of the optical imaging lens assembly according to embodiment 3 to represent deviation of a convergence focal point after light with different wavelengths passes through the lens assembly. FIG. 6B shows an astigmatism curve of the optical imaging lens assembly according to embodiment 3 to represent a tangential image surface curvature and a sagittal image surface curvature. FIG. 6C shows a distortion curve of the optical imaging lens assembly according to embodiment 3 to represent distortion values corresponding to different image heights. FIG. 6D shows a lateral color curve of the optical imaging lens assembly according to embodiment 3 to represent deviation of different image heights on the imaging surface after the light passes through the lens assembly. According to FIG. 6A to FIG. 6D, it can be seen that the optical imaging lens assembly provided in embodiment 3 may achieve high imaging quality.

Embodiment 4

Figure 7:
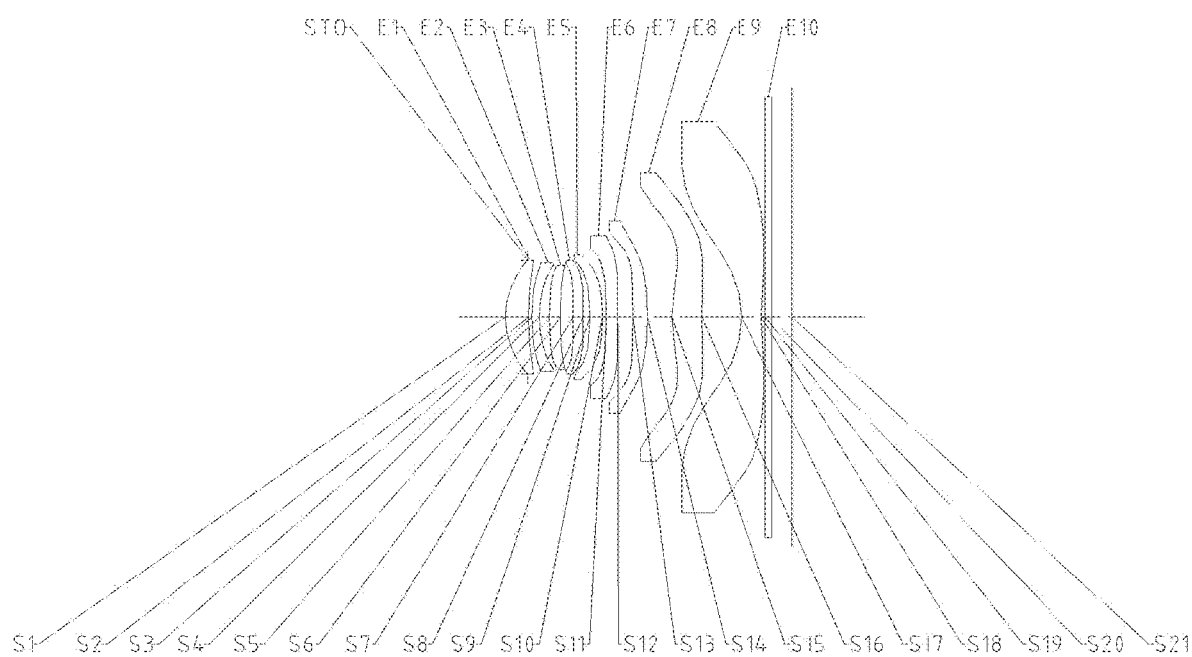
FIG. 7 shows a structure diagram of an optical imaging lens assembly according to embodiment 4 of the disclosure.

An optical imaging lens assembly according to embodiment 4 of the disclosure will be described below with reference to FIG. 7 to FIG. 8D. FIG. 7 shows a structure diagram of an optical imaging lens assembly according to embodiment 4 of the disclosure.

As shown in FIG. 7, the optical imaging lens assembly sequentially includes, from an object side to an image side along an optical axis, a diaphragm STO, a first lens E1, a second lens E2, a third lens E3, a fourth lens E4, a fifth lens E5, a sixth lens E6, a seventh lens E7, an eighth lens E8, a ninth lens E9, an optical filter E10, and an imaging surface S21.

The first lens E1 has a positive refractive power, an object-side surface S1 thereof is a convex surface, while an image-side surface S2 is a concave surface. The second lens E2 has a negative refractive power, an object-side surface S3 thereof is a convex surface, while an image-side surface S4 is a concave surface. The third lens E3 has a positive refractive power, an object-side surface S5 thereof is a convex surface, while an image-side surface S6 is a concave surface. The fourth lens E4 has a positive refractive power, an object-side surface S7 thereof is a convex surface, while an image-side surface S8 is a convex surface. The fifth lens E5 has a positive refractive power, an object-side surface S9 thereof is a concave surface, while an image-side surface S10 is a convex surface. The sixth lens E6 has a negative refractive power, an object-side surface S11 thereof is a convex surface, while an image-side surface S12 is a concave surface. The seventh lens E7 has a positive refractive power, an object-side surface S13 thereof is a convex surface, while an image-side surface S14 is a convex surface. The eighth lens E8 has a positive refractive power, an object-side surface S15 thereof is a convex surface, while an image-side surface S16 is a concave surface. The ninth lens E9 has a negative refractive power, an object-side surface S17 thereof is a concave surface, while an image-side surface S18 is a concave surface. The optical filter E10 has an object-side surface S19 and an image-side surface S20. Light from an object sequentially penetrates through each of the surfaces S1 to S20 and is finally imaged on the imaging surface S21.

In the embodiment, a total effective focal length f of the optical imaging lens assembly is 7.77 mm, TTL is a distance from the object-side surface S1 of the first lens E1 to the imaging surface S21 on the optical axis, TTL is 9.34 mm, ImgH is a half of a diagonal length of an effective pixel region on the imaging surface S21, ImgH is 7.20 mm, Fno is a relative F number (i.e., aperture value) of the optical imaging lens assembly, Fno is 1.98, Semi-FOV is a half of a maximum field of view of the optical imaging lens assembly, and Semi-FOV is 41.9°.

Table 7 is a basic parameter table of the optical imaging lens of embodiment 4, and units of the curvature radius, the thickness/distance and the focal length are all millimeter (mm).

TABLE 7

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.7341 | | | | |
| S1 | Aspheric | 3.0718 | 0.7577 | 1.55 | 56.1 | 7.49 | −0.0316 |
| S2 | Aspheric | 11.2361 | 0.1052 | | | | −2.4456 |
| S3 | Aspheric | 7.7598 | 0.2500 | 1.68 | 19.2 | −19.39 | 1.2095 |
| S4 | Aspheric | 4.8202 | 0.3150 | | | | 0.0622 |
| S5 | Aspheric | 9.2076 | 0.3627 | 1.55 | 56.1 | 62.40 | 12.6994 |
| S6 | Aspheric | 12.4379 | 0.4127 | | | | −30.3747 |
| S7 | Aspheric | 74.1038 | 0.3272 | 1.65 | 23.5 | 99.91 | 0.0000 |
| S8 | Aspheric | −500.0000 | 0.2299 | | | | 0.0000 |
| S9 | Aspheric | −10.7281 | 0.4018 | 1.55 | 56.1 | 50.12 | 0.0000 |
| S10 | Aspheric | −7.8106 | 0.1338 | | | | 0.0000 |
| S11 | Aspheric | 500.0000 | 0.3650 | 1.68 | 19.2 | −25.29 | 0.0000 |
| S12 | Aspheric | 16.6104 | 0.4890 | | | | 0.0000 |
| S13 | Aspheric | 224.2802 | 0.4760 | 1.57 | 37.3 | 27.96 | 0.0000 |
| S14 | Aspheric | −17.1828 | 0.8019 | | | | 0.0000 |
| S15 | Aspheric | 5.8946 | 0.9705 | 1.55 | 56.1 | 12.56 | −1.1487 |
| S16 | Aspheric | 39.2474 | 1.3012 | | | | 0.0000 |
| S17 | Aspheric | −3.8326 | 0.6572 | 1.55 | 56.1 | −5.22 | −1.3356 |
| S18 | Aspheric | 11.8380 | 0.1306 | | | | 0.0000 |
| S19 | Spherical | Infinite | 0.2100 | 1.52 | 64.2 | | |
| S20 | Spherical | Infinite | 0.6424 | | | | |
| S21 | Spherical | Infinite | | | | | |

In embodiment 4, both the object-side surface and image-side surface of any lens in the first lens E1 to the ninth lens E9 are aspheric surfaces. Table 8 shows high-order coefficients $A_4, A_6, A_8, A_{10}, A_{12}, A_{14}, A_{16}, A_{18}$ and $A_{20}$ applied to the aspheric mirror surfaces S1-S18 in embodiment 4.

TABLE 8

| Surface number | A4 | A6 | A8 | A10 | A12 | A14 | A16 | A18 | A20 |
|---|---|---|---|---|---|---|---|---|---|
| S1 | −5.9094E−04 | 2.9653E−03 | −4.9051E−03 | 4.6199E−03 | −2.6999E−03 | 9.7896E−04 | −2.1561E−04 | 2.6434E−05 | −1.3917E−06 |
| S2 | −9.1567E−04 | −4.1920E−03 | 9.6386E−03 | −1.0186E−02 | 6.2577E−03 | −2.3550E−03 | 5.3552E−04 | −6.7694E−05 | 3.6510E−06 |
| S3 | −7.1516E−04 | 8.5682E−05 | 6.5828E−03 | −8.8742E−03 | 6.3024E−03 | −2.6628E−03 | 6.7438E−04 | −9.5043E−05 | 5.7466E−06 |
| S4 | 3.9012E−03 | −3.9053E−03 | 1.3934E−02 | −1.7490E−02 | 1.2836E−02 | −5.7785E−03 | 1.5820E−03 | −2.4230E−04 | 1.5886E−05 |
| S5 | −6.6363E−03 | 2.8209E−03 | −2.9886E−03 | 2.2917E−03 | −6.9395E−04 | −8.4575E−05 | 1.3650E−04 | −3.7331E−05 | 3.3701E−06 |
| S6 | −2.6222E−03 | −3.0770E−03 | 6.7096E−03 | −7.8172E−03 | 5.7816E−03 | −2.6616E−03 | 7.5299E−04 | −1.1870E−04 | 8.0228E−06 |
| S7 | −9.1558E−03 | −1.1051E−02 | 1.5335E−02 | −1.6162E−02 | 1.1049E−02 | −4.8568E−03 | 1.3081E−03 | −1.9566E−04 | 1.2351E−05 |
| S8 | −1.8302E−03 | −2.4425E−02 | 2.8802E−02 | −2.4481E−02 | 1.3587E−02 | −4.8473E−03 | 1.0687E−03 | −1.3294E−04 | 7.1762E−06 |
| S9 | 1.1249E−02 | −2.9398E−02 | 1.8193E−02 | −6.3351E−03 | −6.1674E−04 | 1.5147E−03 | −5.8323E−04 | 9.8232E−05 | −6.2820E−06 |
| S10 | 1.9911E−02 | −4.9015E−02 | 4.3425E−02 | −2.5339E−02 | 9.3672E−03 | −2.1768E−03 | 3.0886E−04 | −2.4705E−05 | 8.7652E−07 |
| S11 | −7.8660E−03 | −2.6518E−02 | 2.8351E−02 | −1.5612E−02 | 5.2020E−03 | −1.0838E−03 | 1.3767E−04 | −9.7291E−06 | 2.9037E−07 |
| S12 | −1.8126E−02 | −4.0804E−03 | 6.1972E−03 | −2.9755E−03 | 8.1381E−04 | −1.3769E−04 | 1.4255E−05 | −8.3113E−07 | 2.1017E−08 |
| S13 | −3.6787E−03 | −7.6198E−04 | −3.2076E−04 | 1.9360E−04 | −7.0375E−05 | 1.5794E−05 | −2.0525E−06 | 1.3987E−07 | −3.8019E−09 |
| S14 | −9.3166E−03 | 1.3205E−03 | −2.0003E−04 | −5.1623E−05 | 2.0468E−05 | −2.5313E−06 | 1.4459E−07 | −3.5367E−09 | 1.8081E−11 |
| S15 | −8.6417E−03 | −5.6077E−04 | 1.7649E−04 | −3.8042E−05 | 5.0693E−06 | −3.8701E−07 | 1.6871E−08 | −3.9238E−10 | 3.7821E−12 |
| S16 | 4.2506E−03 | −2.5166E−03 | 3.7948E−04 | −4.1623E−05 | 3.4773E−06 | −1.9678E−07 | 6.8324E−09 | −1.3023E−10 | 1.0431E−12 |
| S17 | 1.3863E−03 | −1.4930E−03 | 2.8883E−04 | −2.4198E−05 | 1.1421E−06 | −3.2681E−08 | 5.6459E−10 | −5.4333E−12 | 2.2404E−14 |
| S18 | −6.0792E−03 | 2.0150E−04 | 1.4781E−05 | −1.9033E−06 | 8.8463E−08 | −2.2260E−09 | 3.1590E−11 | −2.2996E−13 | 6.1669E−16 |

Figure 8A:
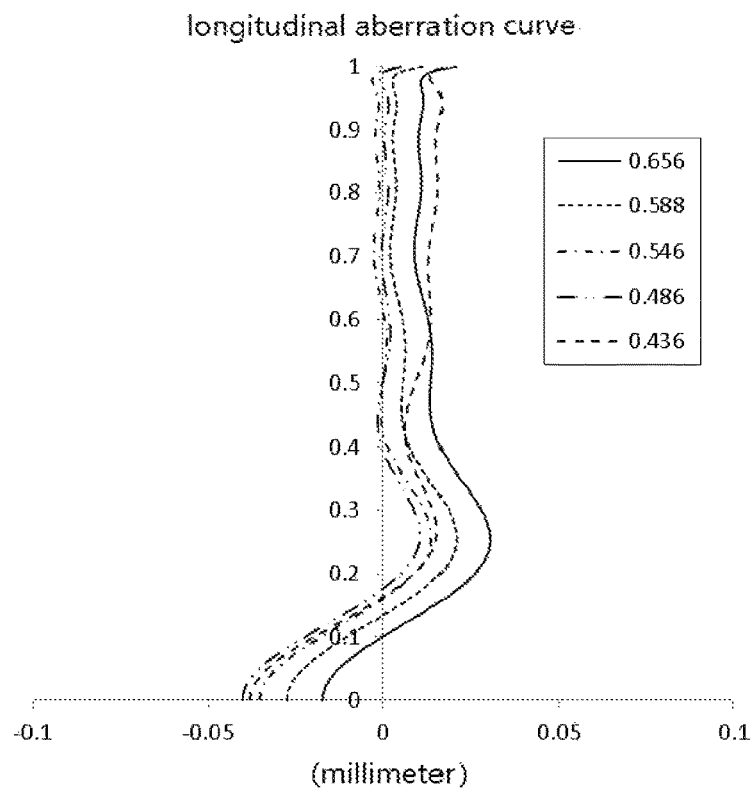
FIG. 8A to FIG. 8D show a longitudinal aberration curve, an astigmatism curve, a distortion curve, and a lateral color curve of an optical imaging lens assembly according to embodiment 4 respectively.
Figure 8B:
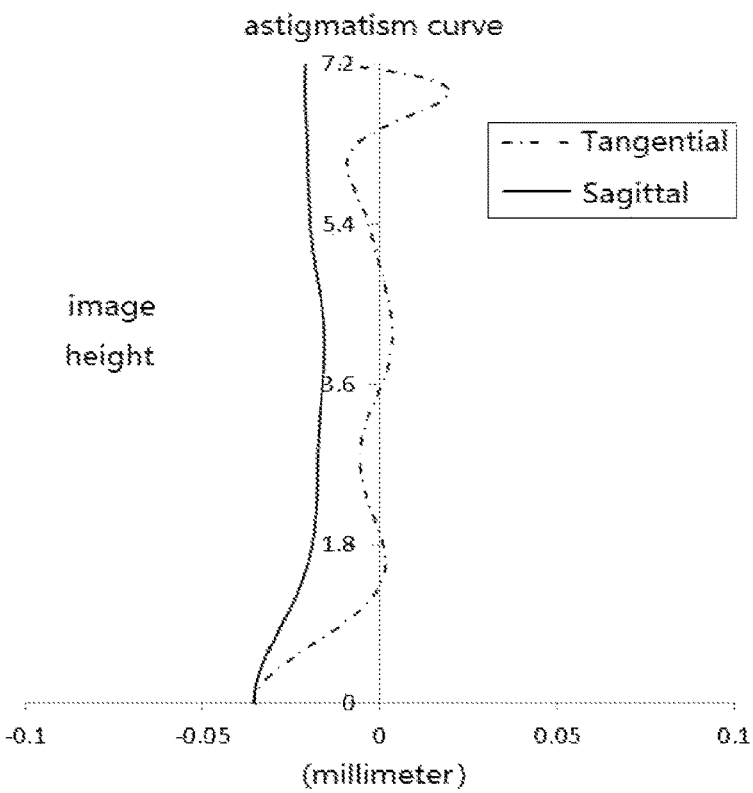
Figure 8C:
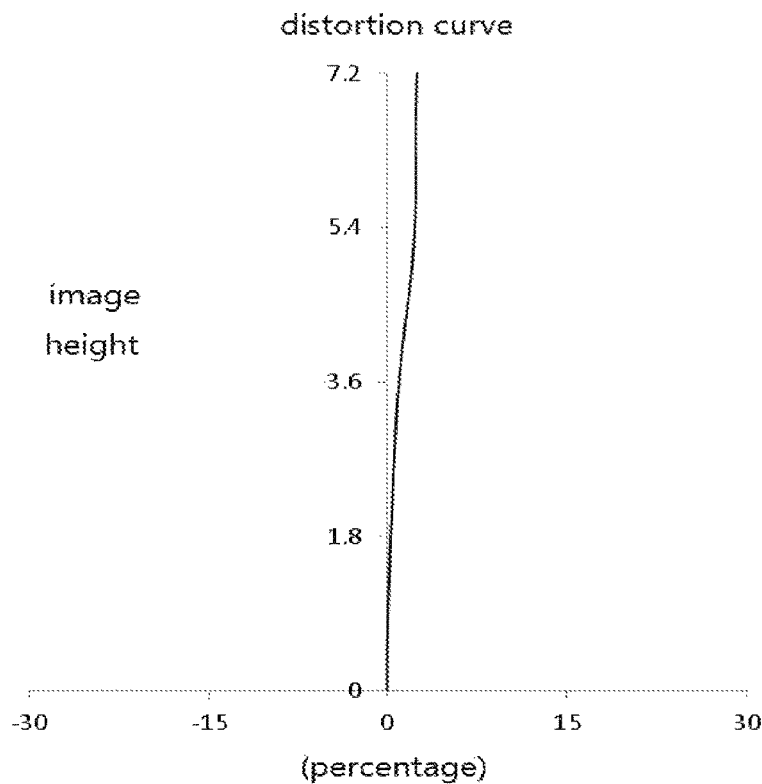
Figure 8D:
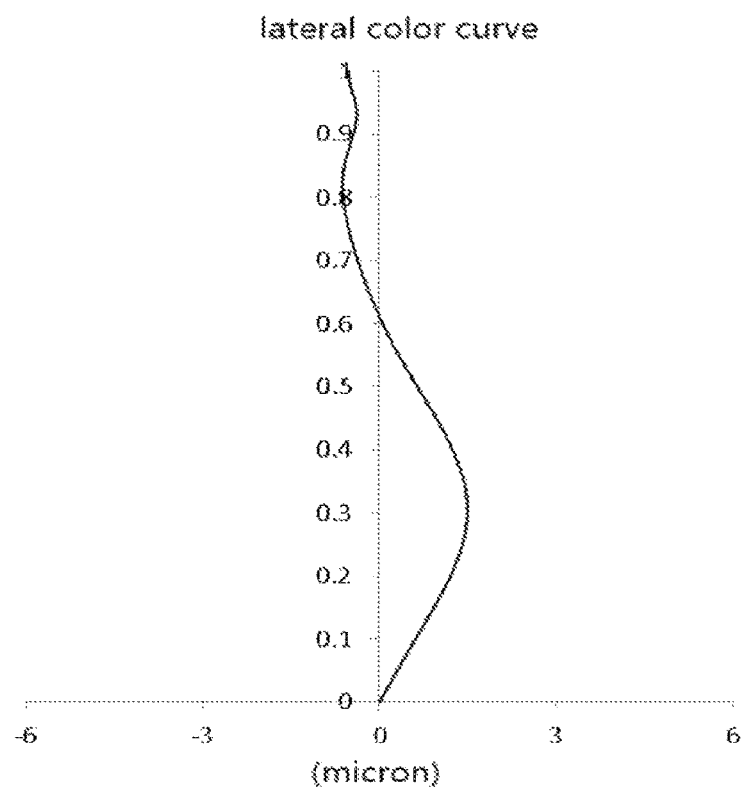

FIG. 8A shows a longitudinal aberration curve of the optical imaging lens assembly according to embodiment 4 to represent deviation of a convergence focal point after light with different wavelengths passes through the lens assembly. FIG. 8B shows an astigmatism curve of the optical imaging lens assembly according to embodiment 4 to represent a tangential image surface curvature and a sagittal image surface curvature. FIG. 8D shows a distortion curve of the optical imaging lens assembly according to embodiment 4 to represent distortion values corresponding to different image heights. FIG. 8D shows a lateral color curve of the optical imaging lens assembly according to embodiment 4 to represent deviation of different image heights on the imaging surface after the light passes through the lens assembly. According to FIG. 8A to FIG. 8D, it can be seen that the optical imaging lens assembly provided in embodiment 4 may achieve high imaging quality.

Embodiment 5

Figure 9:
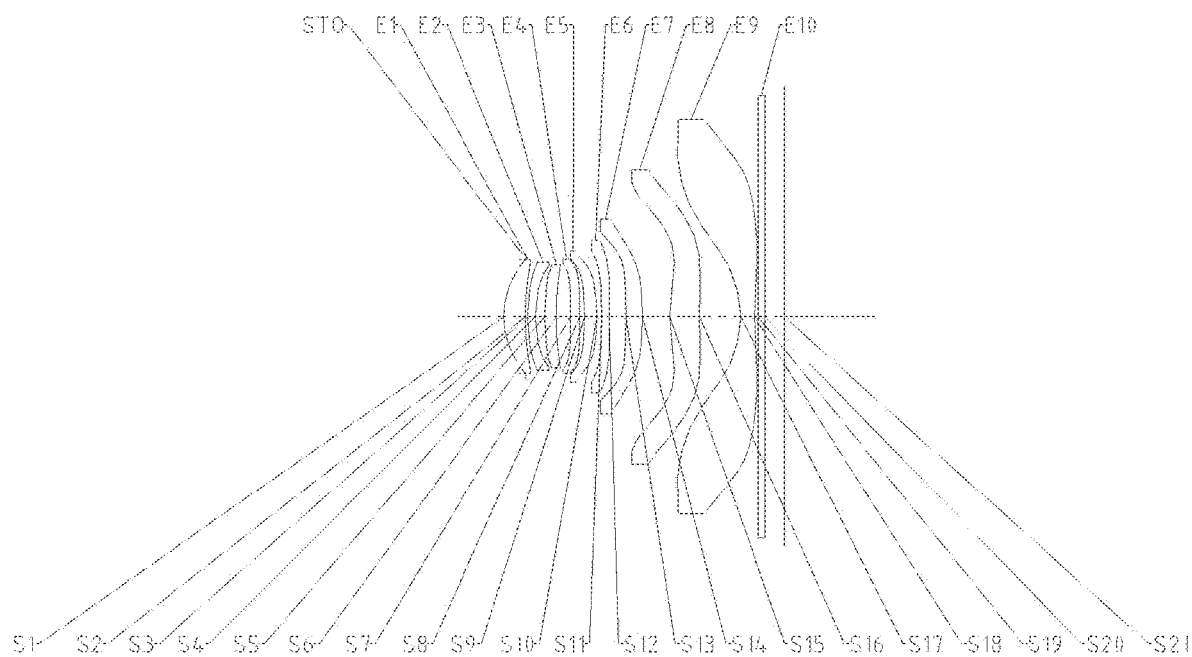
FIG. 9 shows a structure diagram of an optical imaging lens assembly according to embodiment 5 of the disclosure.

An optical imaging lens assembly according to embodiment 5 of the disclosure will be described below with reference to FIG. 9 to FIG. 10D. FIG. 9 shows a structure diagram of an optical imaging lens assembly according to embodiment 5 of the disclosure.

As shown in FIG. 9, the optical imaging lens assembly sequentially includes, from an object side to an image side along an optical axis, a diaphragm STO, a first lens E1, a second lens E2, a third lens E3, a fourth lens E4, a fifth lens E5, a sixth lens E6, a seventh lens E7, an eighth lens E8, a ninth lens E9, an optical filter E10, and an imaging surface S21.

The first lens E1 has a positive refractive power, an object-side surface S1 thereof is a convex surface, while an image-side surface S2 is a concave surface. The second lens E2 has a negative refractive power, an object-side surface S3 thereof is a convex surface, while an image-side surface S4 is a concave surface. The third lens E3 has a positive refractive power, an object-side surface S5 thereof is a convex surface, while an image-side surface S6 is a concave surface. The fourth lens E4 has a positive refractive power, an object-side surface S7 thereof is a concave surface, while an image-side surface S8 is a convex surface. The fifth lens E5 has a positive refractive power, an object-side surface S9 thereof is a concave surface, while an image-side surface S10 is a convex surface. The sixth lens E6 has a negative refractive power, an object-side surface S11 thereof is a convex surface, while an image-side surface S12 is a concave surface. The seventh lens E7 has a positive refractive power, an object-side surface S13 thereof is a concave surface, while an image-side surface S14 is a convex surface. The eighth lens E8 has a positive refractive power, an object-side surface S15 thereof is a convex surface, while an image-side surface S16 is a concave surface. The ninth lens E9 has a negative refractive power, an object-side surface S17 thereof is a concave surface, while an image-side surface S18 is a concave surface. The optical filter E10 has an object-side surface S19 and an image-side surface S20. Light from an object sequentially penetrates through each of the surfaces S1 to S20 and is finally imaged on the imaging surface S21.

In the embodiment, a total effective focal length f of the optical imaging lens assembly is 7.66 mm, TTL is a distance from the object-side surface S1 of the first lens E1 to the imaging surface S21 on the optical axis, TTL is 9.17 mm, ImgH is a half of a diagonal length of an effective pixel region on the imaging surface S21, ImgH is 7.20 mm, Fno is a relative F number (i.e., aperture value) of the optical imaging lens assembly, Fno is 1.98, Semi-FOV is a half of a maximum field of view of the optical imaging lens assembly, and Semi-FOV is 42.3°.

Table 9 is a basic parameter table of the optical imaging lens of embodiment 5, and units of the curvature radius, the thickness/distance and the focal length are all millimeter (mm).

TABLE 9

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.7341 | | | | |
| S1 | Aspheric | 3.0301 | 0.7064 | 1.55 | 56.1 | 7.73 | −0.0254 |
| S2 | Aspheric | 9.8457 | 0.0767 | | | | −0.8785 |
| S3 | Aspheric | 7.1255 | 0.2500 | 1.68 | 19.2 | −20.20 | 1.0723 |
| S4 | Aspheric | 4.6244 | 0.3069 | | | | 0.0656 |
| S5 | Aspheric | 8.6573 | 0.3772 | 1.55 | 56.1 | 45.58 | 13.0866 |
| S6 | Aspheric | 13.0649 | 0.4693 | | | | −23.6529 |
| S7 | Aspheric | −124.0553 | 0.3045 | 1.65 | 23.5 | 738.93 | 0.0000 |
| S8 | Aspheric | −98.5636 | 0.1500 | | | | 0.0000 |
| S9 | Aspheric | −15.2772 | 0.3918 | 1.55 | 56.1 | 41.78 | 0.0000 |
| S10 | Aspheric | −9.2358 | 0.1585 | | | | 0.0000 |
| S11 | Aspheric | 105.9922 | 0.2500 | 1.68 | 19.2 | −30.20 | 0.0000 |
| S12 | Aspheric | 17.1757 | 0.5424 | | | | 0.0000 |
| S13 | Aspheric | −124.9794 | 0.5423 | 1.57 | 37.3 | 25.03 | 0.0000 |
| S14 | Aspheric | −12.8519 | 0.8875 | | | | 0.0000 |
| S15 | Aspheric | 6.7297 | 0.9684 | 1.55 | 56.1 | 14.28 | −0.9513 |
| S16 | Aspheric | 46.3560 | 1.3407 | | | | 0.0000 |
| S17 | Aspheric | −3.7789 | 0.4669 | 1.55 | 56.1 | −5.22 | −1.3230 |
| S18 | Aspheric | 12.1757 | 0.1252 | | | | 0.0000 |
| S19 | Spherical | Infinite | 0.2100 | 1.52 | 64.2 | | |
| S20 | Spherical | Infinite | 0.6424 | | | | |
| S21 | Spherical | Infinite | | | | | |

In embodiment 5, both the object-side surface and image-side surface of any lens in the first lens E1 to the ninth lens E9 are aspheric surfaces. Table 10 shows high-order coefficients $A_4$, $A_6$, $A_8$, $A_{10}$, $A_{12}$, $A_{14}$, $A_{16}$, $A_{18}$ and $A_{20}$ applied to the aspheric mirror surfaces S1-S18 in embodiment 5.

thereof is a convex surface, while an image-side surface S4 is a concave surface. The third lens E3 has a positive refractive power, an object-side surface S5 thereof is a convex surface, while an image-side surface S6 is a concave surface. The fourth lens E4 has a positive refractive power,

TABLE 10

| Surface number | A4 | A6 | A8 | A10 | A12 | A14 | A16 | A18 | A20 |
|---|---|---|---|---|---|---|---|---|---|
| S1 | −5.0977E−04 | 3.3460E−03 | −5.6779E−03 | 5.4908E−03 | −3.2718E−03 | 1.2026E−03 | −2.6718E−04 | 3.2911E−05 | −1.7353E−06 |
| S2 | −8.1891E−04 | −4.0983E−03 | 9.6235E−03 | −1.0388E−02 | 6.5357E−03 | −2.5238E−03 | 5.9075E−04 | −7.7162E−05 | 4.3172E−06 |
| S3 | −4.8092E−04 | −7.1325E−04 | 6.9279E−03 | −8.6804E−03 | 5.9977E−03 | −2.4984E−03 | 6.3026E−04 | −8.9451E−05 | 5.5054E−06 |
| S4 | 3.4123E−03 | −9.6238E−04 | 6.4171E−03 | −7.8883E−03 | 5.6712E−03 | −2.5127E−03 | 6.9236E−04 | −1.0979E−04 | 7.6035E−06 |
| S5 | −5.7469E−03 | 2.0778E−03 | −2.2070E−03 | 1.2149E−03 | 3.1454E−04 | −6.7468E−04 | 3.4634E−04 | −7.8165E−05 | 6.6727E−06 |
| S6 | −1.4088E−03 | −5.5277E−03 | 1.1205E−02 | −1.3287E−02 | 9.9071E−03 | −4.6116E−03 | 1.3180E−03 | −2.1029E−04 | 1.4385E−05 |
| S7 | −5.6161E−03 | −2.0760E−02 | 3.0479E−02 | −3.1303E−02 | 2.0735E−02 | −8.8389E−03 | 2.3222E−03 | −3.4022E−04 | 2.1097E−05 |
| S8 | 8.0012E−03 | −4.6417E−02 | 5.7121E−02 | −4.6625E−02 | 2.4416E−02 | −8.1541E−03 | 1.6759E−03 | −1.9350E−04 | 9.6453E−06 |
| S9 | 1.7882E−02 | −5.0867E−02 | 4.4952E−02 | −2.4021E−02 | 5.7305E−03 | 5.1342E−04 | −6.2913E−04 | 1.3409E−04 | −9.5937E−06 |
| S10 | 1.8486E−02 | −5.2720E−02 | 4.9838E−02 | −2.9930E−02 | 1.1044E−02 | −2.4707E−03 | 3.2004E−04 | −2.1521E−05 | 5.6936E−07 |
| S11 | −5.2277E−03 | −3.1627E−02 | 3.3570E−02 | −1.8796E−02 | 6.3770E−03 | −1.3427E−03 | 1.7013E−04 | −1.1738E−05 | 3.2970E−07 |
| S12 | −1.5672E−02 | −9.2119E−03 | 1.0761E−02 | −5.4204E−03 | 1.6361E−03 | −3.1163E−04 | 3.6642E−05 | −2.4288E−06 | 6.9449E−08 |
| S13 | −4.8966E−03 | 4.4171E−05 | −1.4130E−03 | 7.3125E−04 | −2.4437E−04 | 5.4942E−05 | −7.6204E−06 | 5.7356E−07 | −1.7624E−08 |
| S14 | −8.7728E−03 | 1.3388E−03 | −5.7816E−04 | 9.4839E−05 | −1.2320E−05 | 3.0152E−06 | −4.7677E−07 | 3.4278E−08 | −9.1193E−10 |
| S15 | −9.3271E−03 | −8.9727E−05 | 5.9839E−06 | −1.4903E−05 | 3.8738E−06 | −4.0188E−07 | 2.1157E−08 | −5.6337E−10 | 6.0363E−12 |
| S16 | 1.8338E−03 | −1.6697E−03 | 1.8959E−04 | −1.8507E−05 | 1.9096E−06 | −1.3723E−07 | 5.6485E−09 | −1.2070E−10 | 1.0447E−12 |
| S17 | 1.3431E−03 | −1.4511E−03 | 2.7814E−04 | −2.3054E−05 | 1.0751E−06 | −3.0364E−08 | 5.1727E−10 | −4.9053E−12 | 1.9922E−14 |
| S18 | −6.0711E−03 | 1.9383E−04 | 1.8214E−05 | −2.3139E−06 | 1.1122E−07 | −2.9103E−09 | 4.3070E−11 | −3.3019E−13 | 9.6613E−16 |

Figure 10A:
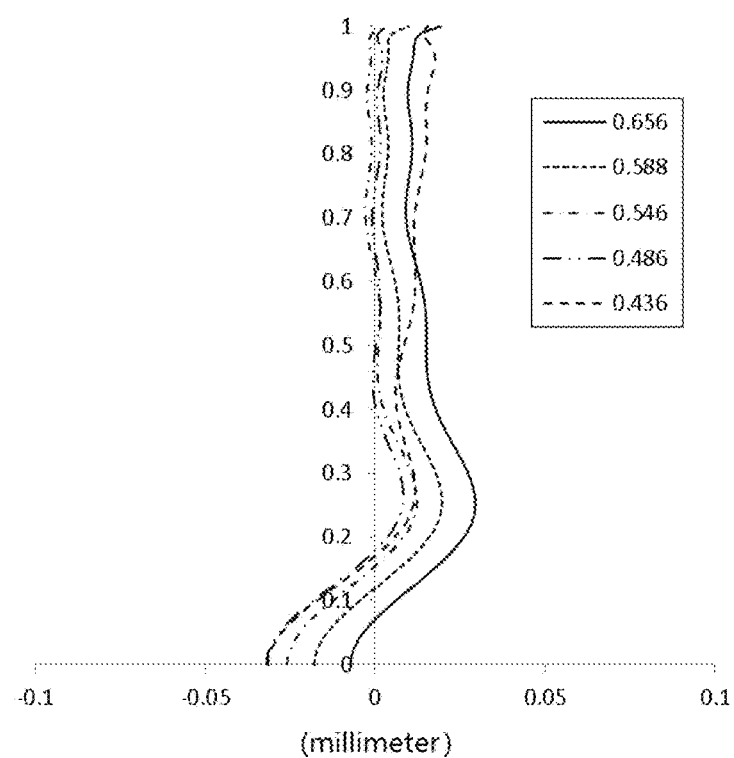
FIG. 10A to FIG. 10D show a longitudinal aberration curve, an astigmatism curve, a distortion curve, and a lateral color curve of an optical imaging lens assembly according to embodiment 5 respectively.
Figure 10B:
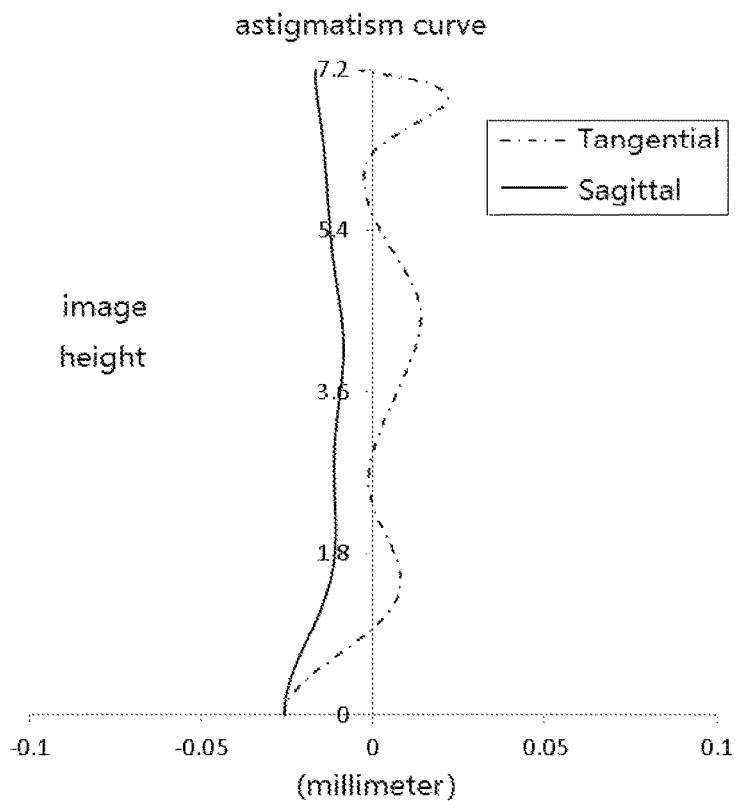
Figure 10C:
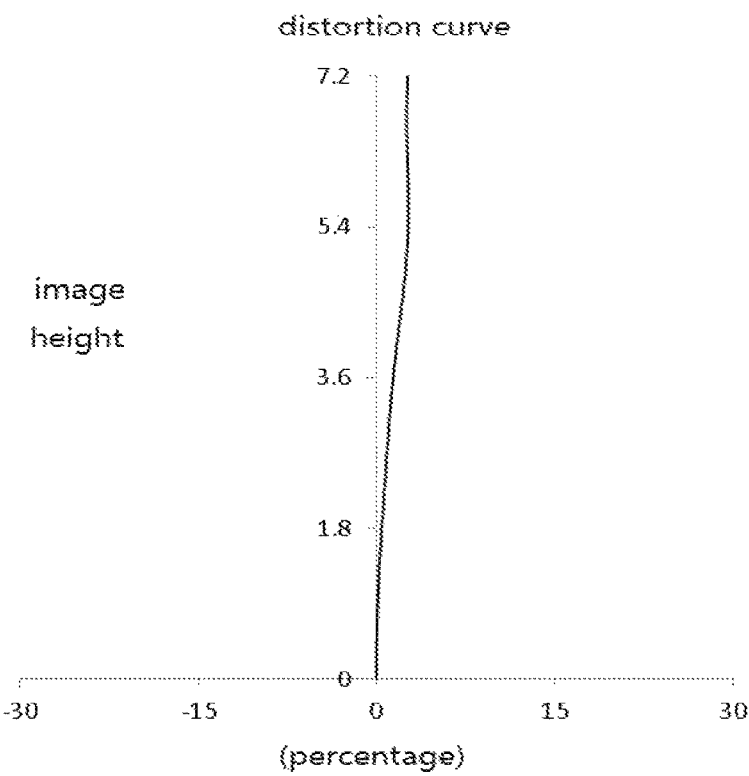
Figure 10D:
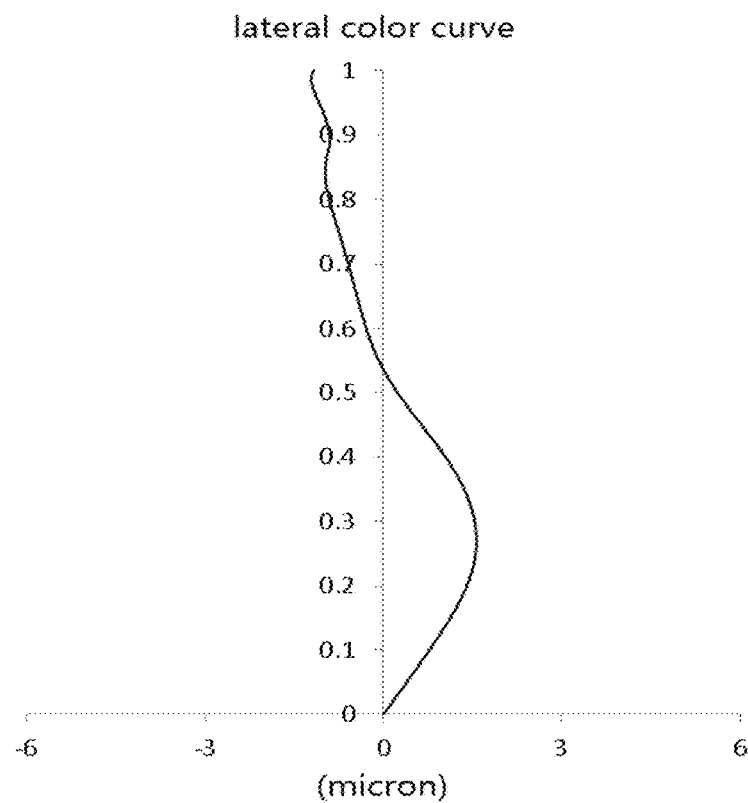

FIG. 10A shows a longitudinal aberration curve of the optical imaging lens assembly according to embodiment 5 to represent deviation of a convergence focal point after light with different wavelengths passes through the lens assembly. FIG. 10B shows an astigmatism curve of the optical imaging lens assembly according to embodiment 5 to represent a tangential image surface curvature and a sagittal image surface curvature. FIG. 10C shows a distortion curve of the optical imaging lens assembly according to embodiment 5 to represent distortion values corresponding to different image heights. FIG. 10D shows a lateral color curve of the optical imaging lens assembly according to embodiment 5 to represent deviation of different image heights on the imaging surface after the light passes through the lens assembly. According to FIG. 10A to FIG. 10D, it can be seen that the optical imaging lens assembly provided in embodiment 5 may achieve high imaging quality.

Embodiment 6

Figure 11:
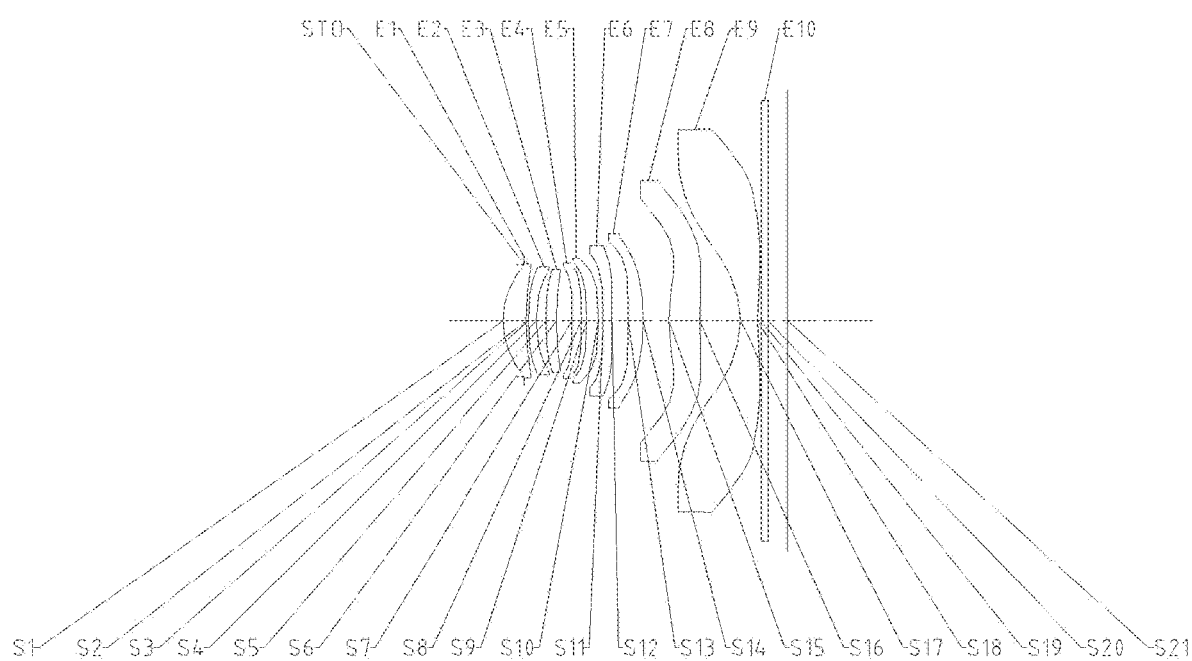
FIG. 11 shows a structure diagram of an optical imaging lens assembly according to embodiment 6 of the disclosure.

An optical imaging lens assembly according to embodiment 6 of the disclosure will be described below with reference to FIG. 11 to FIG. 12D. FIG. 11 shows a structure diagram of an optical imaging lens assembly according to embodiment 6 of the disclosure.

As shown in FIG. 11, the optical imaging lens assembly sequentially includes, from an object side to an image side along an optical axis, a diaphragm STO, a first lens E1, a second lens E2, a third lens E3, a fourth lens E4, a fifth lens E5, a sixth lens E6, a seventh lens E7, an eighth lens E8, a ninth lens E9, an optical filter E10, and an imaging surface S21.

The first lens E1 has a positive refractive power, an object-side surface S1 thereof is a convex surface, while an image-side surface S2 is a concave surface. The second lens E2 has a negative refractive power, an object-side surface S3 an object-side surface S7 thereof is a concave surface, while an image-side surface S8 is a convex surface. The fifth lens E5 has a positive refractive power, an object-side surface S9 thereof is a concave surface, while an image-side surface S10 is a convex surface. The sixth lens E6 has a negative refractive power, an object-side surface S11 thereof is a convex surface, while an image-side surface S12 is a concave surface. The seventh lens E7 has a positive refractive power, an object-side surface S13 thereof is a convex surface, while an image-side surface S14 is a convex surface. The eighth lens E8 has a positive refractive power, an object-side surface S15 thereof is a convex surface, while an image-side surface S16 is a concave surface. The ninth lens E9 has a negative refractive power, an object-side surface S17 thereof is a concave surface, while an image-side surface S18 is a concave surface. The optical filter E10 has an object-side surface S19 and an image-side surface S20. Light from an object sequentially penetrates through each of the surfaces S1 to S20 and is finally imaged on the imaging surface S21.

In the embodiment, a total effective focal length f of the optical imaging lens assembly is 7.72 mm, TTL is a distance from the object-side surface S1 of the first lens E1 to the imaging surface S21 on the optical axis, TTL is 9.29 mm, ImgH is a half of a diagonal length of an effective pixel region on the imaging surface S21, ImgH is 7.40 mm, Fno is a relative F number (i.e., aperture value) of the optical imaging lens assembly, Fno is 1.98, Semi-FOV is a half of a maximum field of view of the optical imaging lens assembly, and Semi-FOV is 42.9°.

Table 11 is a basic parameter table of the optical imaging lens of embodiment 6, and units of the curvature radius, the thickness/distance and the focal length are all millimeter (mm).

TABLE 11

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.7341 | | | | |
| S1 | Aspheric | 3.0704 | 0.7430 | 1.55 | 56.1 | 7.66 | −0.0258 |
| S2 | Aspheric | 10.5515 | 0.0792 | | | | −1.6875 |
| S3 | Aspheric | 7.4833 | 0.2500 | 1.68 | 19.2 | −20.25 | 1.2578 |
| S4 | Aspheric | 4.7814 | 0.3177 | | | | 0.0868 |
| S5 | Aspheric | 9.0725 | 0.3554 | 1.55 | 56.1 | 52.75 | 12.7180 |
| S6 | Aspheric | 13.0556 | 0.4902 | | | | −26.9250 |
| S7 | Aspheric | −135.7325 | 0.3118 | 1.65 | 23.5 | 999.11 | 0.0000 |
| S8 | Aspheric | −112.2522 | 0.1717 | | | | 0.0000 |
| S9 | Aspheric | −19.1264 | 0.3879 | 1.55 | 56.1 | 42.66 | 0.0000 |
| S10 | Aspheric | −10.5821 | 0.1453 | | | | 0.0000 |
| S11 | Aspheric | 328.6515 | 0.2979 | 1.68 | 19.2 | −28.35 | 0.0000 |
| S12 | Aspheric | 18.1930 | 0.5204 | | | | 0.0000 |
| S13 | Aspheric | 847.0069 | 0.4764 | 1.57 | 37.3 | 27.31 | 0.0000 |
| S14 | Aspheric | −15.8889 | 0.8377 | | | | 0.0000 |
| S15 | Aspheric | 6.1035 | 1.0232 | 1.55 | 56.1 | 12.82 | −1.1422 |
| S16 | Aspheric | 44.6153 | 1.3173 | | | | 0.0000 |
| S17 | Aspheric | −3.7989 | 0.5831 | 1.55 | 56.1 | −5.23 | −1.3305 |
| S18 | Aspheric | 12.1900 | 0.1246 | | | | 0.0000 |
| S19 | Spherical | Infinite | 0.2100 | 1.52 | 64.2 | | |
| S20 | Spherical | Infinite | 0.6424 | | | | |
| S21 | Spherical | Infinite | | | | | |

In embodiment 6, both the object-side surface and image-side surface of any lens in the first lens E1 to the ninth lens E9 are aspheric surfaces. Table 12 shows high-order coefficients $A_4$, $A_6$, $A_8$, $A_{10}$, $A_{12}$, $A_{14}$, $A_{16}$, $A_{18}$ and $A_{20}$ applied to the aspheric mirror surfaces S1-S18 in embodiment 6.

TABLE 12

| Surface number | A4 | A6 | A8 | A10 | A12 | A14 | A16 | A18 | A20 |
|---|---|---|---|---|---|---|---|---|---|
| S1 | −3.6919E−04 | 2.5635E−03 | −4.2204E−03 | 3.9392E−03 | −2.2784E−03 | 8.1301E−04 | −1.7531E−04 | 2.0927E−05 | −1.0685E−06 |
| S2 | −1.0665E−03 | −4.0356E−03 | 9.7030E−03 | −1.0285E−02 | 6.2669E−03 | −2.3245E−03 | 5.1899E−04 | −6.4319E−05 | 3.4040E−06 |
| S3 | −5.0723E−04 | −9.8132E−04 | 8.3399E−03 | −1.0490E−02 | 7.2115E−03 | −2.9707E−03 | 7.3429E−04 | −1.0106E−04 | 5.9798E−06 |
| S4 | 4.0097E−03 | −3.6672E−03 | 1.2599E−02 | −1.5379E−02 | 1.1063E−02 | −4.8787E−03 | 1.3080E−03 | −1.9661E−04 | 1.2691E−05 |
| S5 | −6.3407E−03 | 2.6097E−03 | −3.1017E−03 | 2.4962E−03 | −8.4040E−04 | −1.6210E−05 | 1.1850E−04 | −3.5357E−05 | 3.3507E−06 |
| S6 | −2.2210E−03 | −3.6424E−03 | 7.6517E−03 | −8.9901E−03 | 6.6818E−03 | −3.0866E−03 | 8.7681E−04 | −1.3944E−04 | 9.5520E−06 |
| S7 | −8.7282E−03 | −1.2520E−02 | 1.8180E−02 | −1.9166E−02 | 1.2947E−02 | −5.5888E−03 | 1.4746E−03 | −2.1563E−04 | 1.3252E−05 |
| S8 | 1.2616E−03 | −3.4117E−02 | 4.2505E−02 | −3.6243E−02 | 2.0102E−02 | −7.1494E−03 | 1.5651E−03 | −1.9199E−04 | 1.0109E−05 |
| S9 | 1.5893E−02 | −4.6317E−02 | 4.3513E−02 | −2.8670E−02 | 1.2053E−02 | −3.0839E−03 | 4.4026E−04 | −2.8420E−05 | 3.6638E−07 |
| S10 | 2.2172E−02 | −5.5596E−02 | 5.0722E−02 | −2.9912E−02 | 1.1258E−02 | −2.7115E−03 | 4.0746E−04 | −3.5270E−05 | 1.3737E−06 |
| S11 | −4.1806E−03 | −3.3215E−02 | 3.2679E−02 | −1.6820E−02 | 5.2222E−03 | −1.0034E−03 | 1.1563E−04 | −7.2240E−06 | 1.8139E−07 |
| S12 | −1.5113E−02 | −9.5081E−03 | 1.0032E−02 | −4.5291E−03 | 1.2074E−03 | −2.0054E−04 | 2.0364E−05 | −1.1608E−06 | 2.8633E−08 |
| S13 | −3.2859E−03 | −1.7583E−03 | 1.0403E−05 | 1.3349E−04 | −6.5567E−05 | 1.6276E−05 | −2.2075E−06 | 1.5319E−07 | −4.1766E−09 |
| S14 | −9.0825E−03 | 4.3186E−04 | 2.4919E−05 | −6.9844E−05 | 1.6541E−05 | −1.0677E−06 | −4.8495E−08 | 8.2013E−09 | −2.5626E−10 |
| S15 | −8.0032E−03 | −6.8925E−04 | 1.5554E−04 | −3.1059E−05 | 4.3918E−06 | −3.5965E−07 | 1.6682E−08 | −4.0913E−10 | 4.1274E−12 |
| S16 | 4.4688E−03 | −2.3510E−03 | 3.0702E−04 | −2.9514E−05 | 2.3744E−06 | −1.3654E−07 | 4.8470E−09 | −9.3658E−11 | 7.5327E−13 |
| S17 | 1.3297E−03 | −1.4430E−03 | 2.7661E−04 | −2.2902E−05 | 1.0664E−06 | −3.0068E−08 | 5.1128E−10 | −4.8387E−12 | 1.9609E−14 |
| S18 | −5.9733E−03 | 1.5288E−04 | 2.2393E−05 | −2.4836E−06 | 1.1383E−07 | −2.9006E−09 | 4.2394E−11 | −3.2544E−13 | 9.7264E−16 |

Figure 12A:
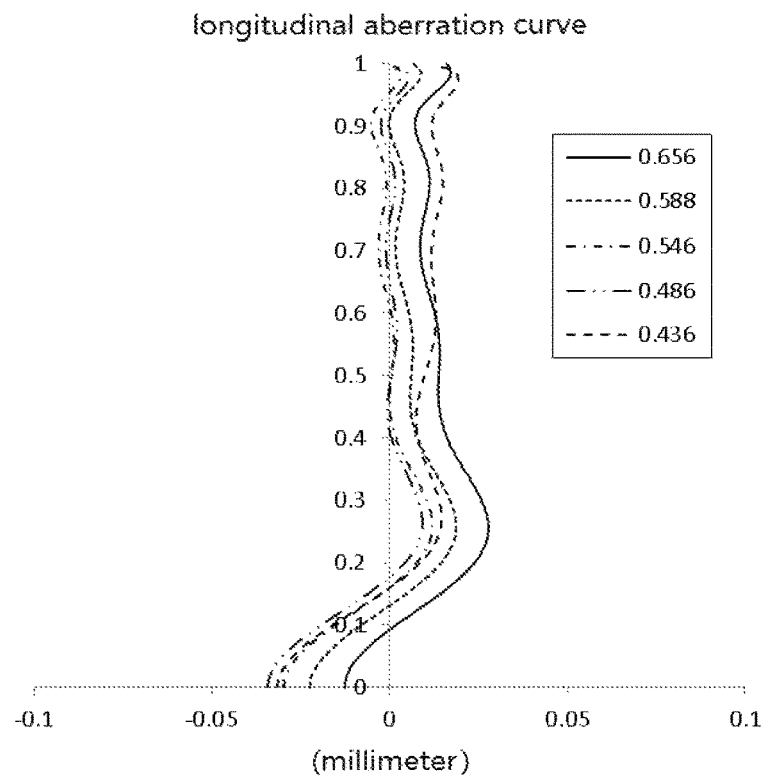
FIG. 12A to FIG. 12D show a longitudinal aberration curve, an astigmatism curve, a distortion curve, and a lateral color curve of an optical imaging lens assembly according to embodiment 6 respectively.
Figure 12B:
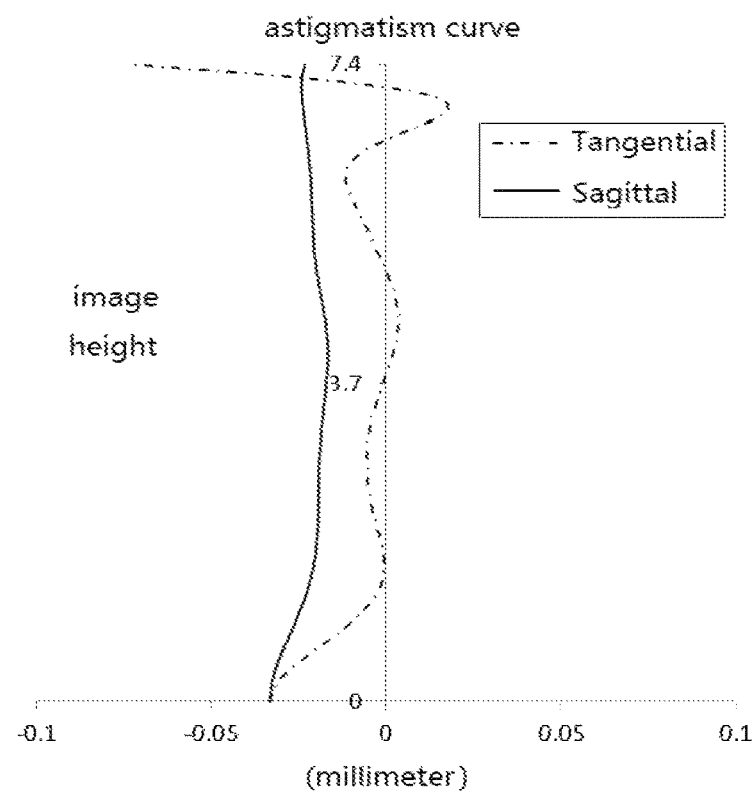
Figure 12C:
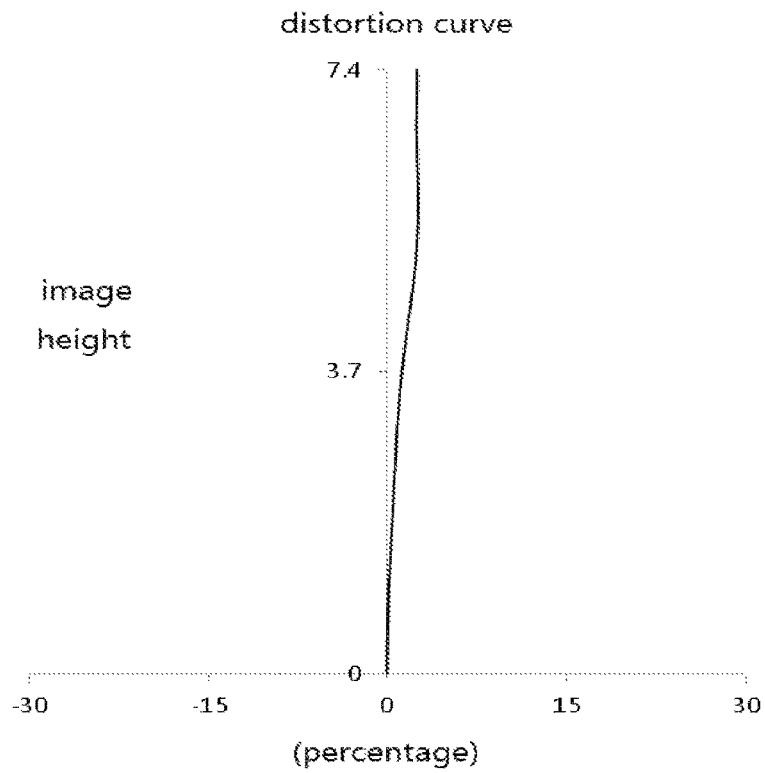
Figure 12D:
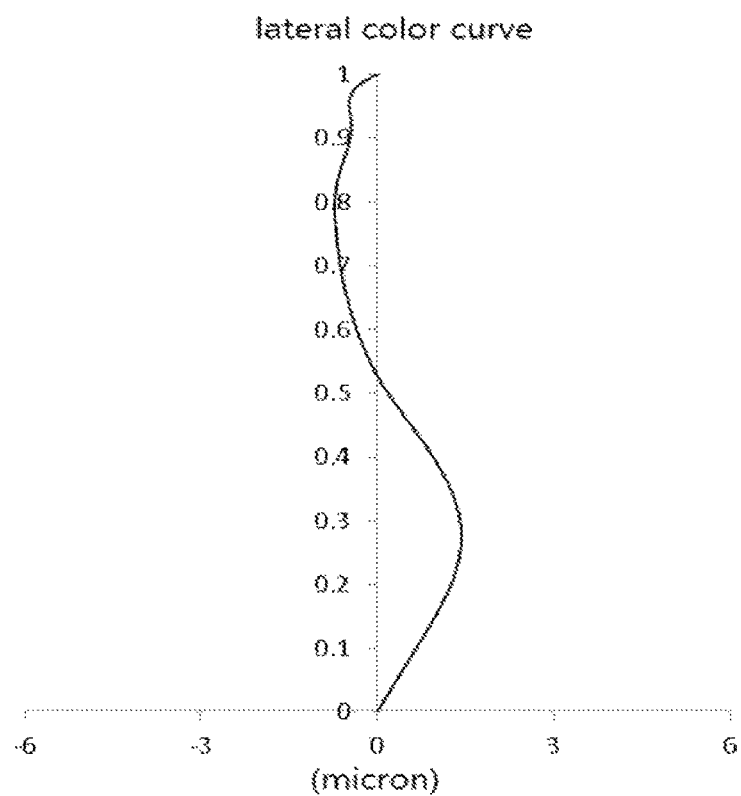

FIG. 12A shows a longitudinal aberration curve of the optical imaging lens assembly according to embodiment 6 to represent deviation of a convergence focal point after light with different wavelengths passes through the lens assembly. FIG. 12B shows an astigmatism curve of the optical imaging lens assembly according to embodiment 6 to represent a tangential image surface curvature and a sagittal image surface curvature. FIG. 12C shows a distortion curve of the optical imaging lens assembly according to embodiment 6 to represent distortion values corresponding to different image heights. FIG. 12D shows a lateral color curve of the optical imaging lens assembly according to embodiment 6 to represent deviation of different image heights on the imaging surface after the light passes through the lens assembly. According to FIG. 12A to FIG. 12D, it can be seen that the optical imaging lens assembly provided in embodiment 6 may achieve high imaging quality.

Embodiment 7

Figure 13:
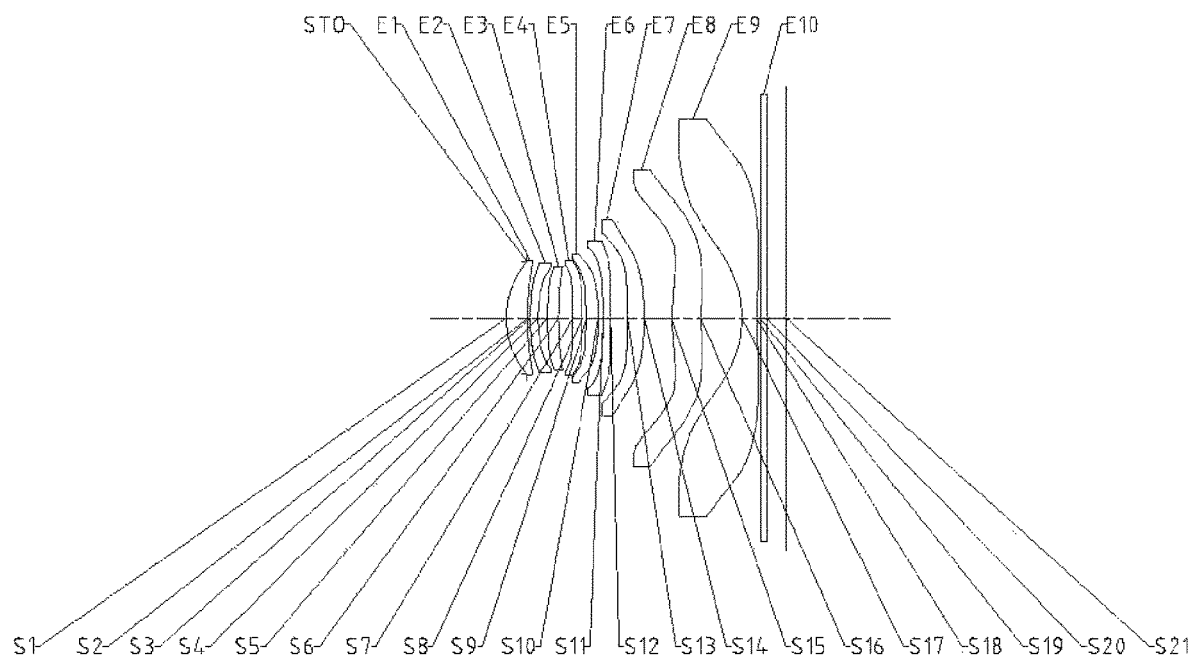
FIG. 13 shows a structure diagram of an optical imaging lens assembly according to embodiment 7 of the disclosure.

An optical imaging lens assembly according to embodiment 7 of the disclosure will be described below with reference to FIG. 13 to FIG. 14D. FIG. 13 shows a structure diagram of an optical imaging lens assembly according to embodiment 7 of the disclosure.

As shown in FIG. 13, the optical imaging lens assembly sequentially includes, from an object side to an image side along an optical axis, a diaphragm STO, a first lens E1, a second lens E2, a third lens E3, a fourth lens E4, a fifth lens E5, a sixth lens E6, a seventh lens E7, an eighth lens E8, a ninth lens E9, an optical filter E10, and an imaging surface S21.

The first lens E1 has a positive refractive power, an object-side surface S1 thereof is a convex surface, while an image-side surface S2 is a concave surface. The second lens E2 has a negative refractive power, an object-side surface S3 thereof is a convex surface, while an image-side surface S4 is a concave surface. The third lens E3 has a positive refractive power, an object-side surface S5 thereof is a convex surface, while an image-side surface S6 is a concave surface. The fourth lens E4 has a positive refractive power, an object-side surface S7 thereof is a concave surface, while an image-side surface S8 is a convex surface. The fifth lens E5 has a positive refractive power, an object-side surface S9 thereof is a concave surface, while an image-side surface S10 is a convex surface. The sixth lens E6 has a negative refractive power, an object-side surface S11 thereof is a convex surface, while an image-side surface S12 is a concave surface. The seventh lens E7 has a positive refractive power, an object-side surface S13 thereof is a concave surface, while an image-side surface S14 is a convex surface. The eighth lens E8 has a positive refractive power, an object-side surface S15 thereof is a convex surface, while an image-side surface S16 is a concave surface. The ninth lens E9 has a negative refractive power, an object-side surface S17 thereof is a concave surface, while an image-side surface S18 is a concave surface. The optical filter E10 has an object-side surface S19 and an image-side surface S20. Light from an object sequentially penetrates through each of the surfaces S1 to S20 and is finally imaged on the imaging surface S21.

In the embodiment, a total effective focal length f of the optical imaging lens assembly is 7.66 mm, TTL is a distance from the object-side surface S1 of the first lens E1 to the imaging surface S21 on the optical axis, TTL is 9.17 mm, ImgH is a half of a diagonal length of an effective pixel region on the imaging surface S21, ImgH is 7.20 mm, Fno is a relative F number (i.e., aperture value) of the optical imaging lens assembly, Fno is 1.98, Semi-FOV is a half of a maximum field of view of the optical imaging lens assembly, and Semi-FOV is 45.4°.

Table 13 is a basic parameter table of the optical imaging lens of embodiment 7, and units of the curvature radius, the thickness/distance and the focal length are all millimeter (mm).

TABLE 13

| Surface number | Surface type | Curvature radius | Thickness/distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.7341 | | | | |
| S1 | Aspheric | 3.0301 | 0.7064 | 1.55 | 56.1 | 7.73 | −0.0254 |
| S2 | Aspheric | 9.8457 | 0.0767 | | | | −0.8785 |
| S3 | Aspheric | 7.1255 | 0.2500 | 1.68 | 19.2 | −20.20 | 1.0723 |
| S4 | Aspheric | 4.6244 | 0.3069 | | | | 0.0656 |
| S5 | Aspheric | 8.6573 | 0.3772 | 1.55 | 56.1 | 45.58 | 13.0866 |
| S6 | Aspheric | 13.0649 | 0.4693 | | | | −23.6529 |
| S7 | Aspheric | −124.0553 | 0.3045 | 1.65 | 23.5 | 738.93 | 0.0000 |
| S8 | Aspheric | −98.5636 | 0.1500 | | | | 0.0000 |
| S9 | Aspheric | −15.2772 | 0.3918 | 1.55 | 56.1 | 41.78 | 0.0000 |
| S10 | Aspheric | −9.2358 | 0.1585 | | | | 0.0000 |
| S11 | Aspheric | 105.9922 | 0.2500 | 1.68 | 19.2 | −30.20 | 0.0000 |
| S12 | Aspheric | 17.1757 | 0.5424 | | | | 0.0000 |
| S13 | Aspheric | −124.9794 | 0.5423 | 1.57 | 37.3 | 25.03 | 0.0000 |
| S14 | Aspheric | −12.8519 | 0.8875 | | | | 0.0000 |
| S15 | Aspheric | 6.7297 | 0.9684 | 1.55 | 56.1 | 14.28 | −0.9513 |
| S16 | Aspheric | 46.3560 | 1.3407 | | | | 0.0000 |
| S17 | Aspheric | −3.7789 | 0.4669 | 1.55 | 56.1 | −5.22 | −1.3230 |
| S18 | Aspheric | 12.1757 | 0.1252 | | | | 0.0000 |
| S19 | Spherical | Infinite | 0.2100 | 1.52 | 64.2 | | |
| S20 | Spherical | Infinite | 0.6424 | | | | |
| S21 | Spherical | Infinite | | | | | |

In embodiment 7, both the object-side surface and image-side surface of any lens in the first lens E1 to the ninth lens E9 are aspheric surfaces. Table 14 shows high-order coefficients $A_4$, $A_6$, $A_8$, $A_{10}$, $A_{12}$, $A_{14}$, $A_{16}$, $A_{18}$ and $A_{20}$ applied to the aspheric mirror surfaces S1-S18 in embodiment 7.

TABLE 14

| Surface number | A4 | A6 | A8 | A10 | A12 | A14 | A16 | A18 | A20 |
|---|---|---|---|---|---|---|---|---|---|
| S1 | −5.0977E−04 | 3.3460E−03 | −5.6779E−03 | 5.4908E−03 | −3.2718E−03 | 1.2026E−03 | −2.6718E−04 | 3.2911E−05 | −1.7353E−06 |
| S2 | −8.1891E−04 | −4.0983E−03 | 9.6235E−03 | −1.0388E−02 | 6.5357E−03 | −2.5238E−03 | 5.9075E−04 | −7.7162E−05 | 4.3172E−06 |
| S3 | −4.8092E−04 | −7.1325E−04 | 6.9279E−03 | −8.6804E−03 | 5.9977E−03 | −2.4984E−03 | 6.3026E−04 | −8.9451E−05 | 5.5054E−06 |
| S4 | 3.4123E−03 | −9.6238E−04 | 6.4171E−03 | −7.8883E−03 | 5.6712E−03 | −2.5127E−03 | 6.9236E−04 | −1.0979E−04 | 7.6035E−06 |
| S5 | −5.7469E−03 | 2.0778E−03 | −2.2070E−03 | 1.2149E−03 | 3.1454E−04 | −6.7468E−04 | 3.4634E−04 | −7.8165E−05 | 6.6727E−06 |
| S6 | −1.4088E−03 | −5.5277E−03 | 1.1205E−02 | −1.3287E−02 | 9.9071E−03 | −4.6116E−03 | 1.3180E−03 | −2.1029E−04 | 1.4385E−05 |
| S7 | −5.6161E−03 | −2.0760E−02 | 3.0479E−02 | −3.1303E−02 | 2.0735E−02 | −8.8389E−03 | 2.3222E−03 | −3.4022E−04 | 2.1097E−05 |
| S8 | 8.0012E−03 | −4.6417E−02 | 5.7121E−02 | −4.6625E−02 | 2.4416E−02 | −8.1541E−03 | 1.6759E−03 | −1.9350E−04 | 9.6453E−06 |

TABLE 14-continued

| Surface number | A4 | A6 | A8 | A10 | A12 | A14 | A16 | A18 | A20 |
|---|---|---|---|---|---|---|---|---|---|
| S9 | 1.7882E−02 | −5.0867E−02 | 4.4952E−02 | −2.4021E−02 | 5.7305E−03 | 5.1342E−04 | −6.2913E−04 | 1.3409E−04 | −9.5937E−06 |
| S10 | 1.8486E−02 | −5.2720E−02 | 4.9838E−02 | −2.9930E−02 | 1.1044E−02 | −2.4707E−03 | 3.2004E−04 | −2.1521E−05 | 5.6936E−07 |
| S11 | −5.2277E−03 | −3.1627E−02 | 3.3570E−02 | −1.8796E−02 | 6.3770E−03 | −1.3427E−03 | 1.7013E−04 | −1.1738E−05 | 3.2970E−07 |
| S12 | −1.5672E−02 | −9.2119E−03 | 1.0761E−02 | −5.4204E−03 | 1.6361E−03 | −3.1163E−04 | 3.6642E−05 | −2.4288E−06 | 6.9449E−08 |
| S13 | −4.8966E−03 | 4.4171E−05 | −1.4130E−03 | 7.3125E−04 | −2.4437E−04 | 5.4942E−05 | −7.6204E−06 | 5.7356E−07 | −1.7624E−08 |
| S14 | −8.7728E−03 | 1.3388E−03 | −5.7816E−04 | 9.4839E−05 | −1.2320E−05 | 3.0152E−06 | −4.7677E−07 | 3.4278E−08 | −9.1193E−10 |
| S15 | −9.3271E−03 | −8.9727E−05 | 5.9839E−06 | −1.4903E−05 | 3.8738E−06 | −4.0188E−07 | 2.1157E−08 | −5.6337E−10 | 6.0363E−12 |
| S16 | 1.8338E−03 | −1.6697E−03 | 1.8959E−04 | −1.8507E−05 | 1.9096E−06 | −1.3723E−07 | 5.6485E−09 | −1.2070E−10 | 1.0447E−12 |
| S17 | 1.3431E−03 | −1.4511E−03 | 2.7814E−04 | −2.3054E−05 | 1.0751E−06 | −3.0364E−08 | 5.1727E−10 | −4.9053E−12 | 1.9922E−14 |
| S18 | −6.0711E−03 | 1.9383E−04 | 1.8214E−05 | −2.3139E−06 | 1.1122E−07 | −2.9103E−09 | 4.3070E−11 | −3.3019E−13 | 9.6613E−16 |

Figure 14A:
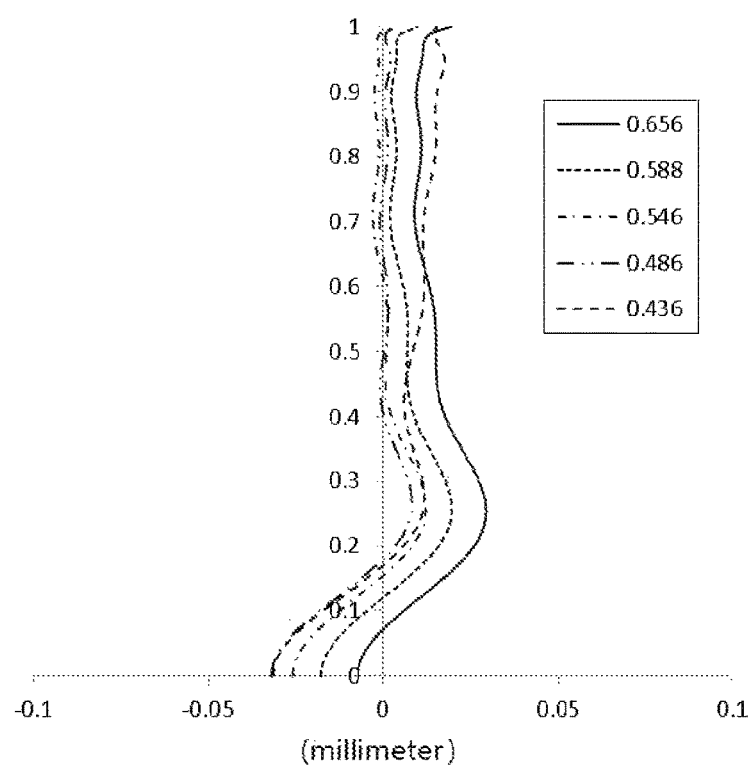
FIG. 14A to FIG. 14D show a longitudinal aberration curve, astigmatism curve, distortion curve and lateral color curve of an optical imaging lens assembly according to embodiment 7 respectively.
Figure 14B:
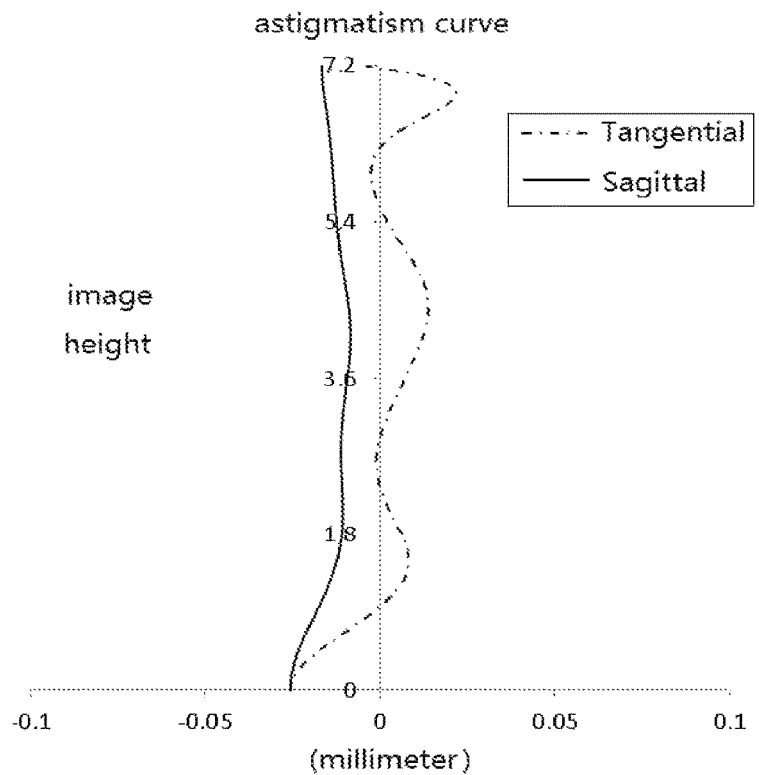
Figure 14C:
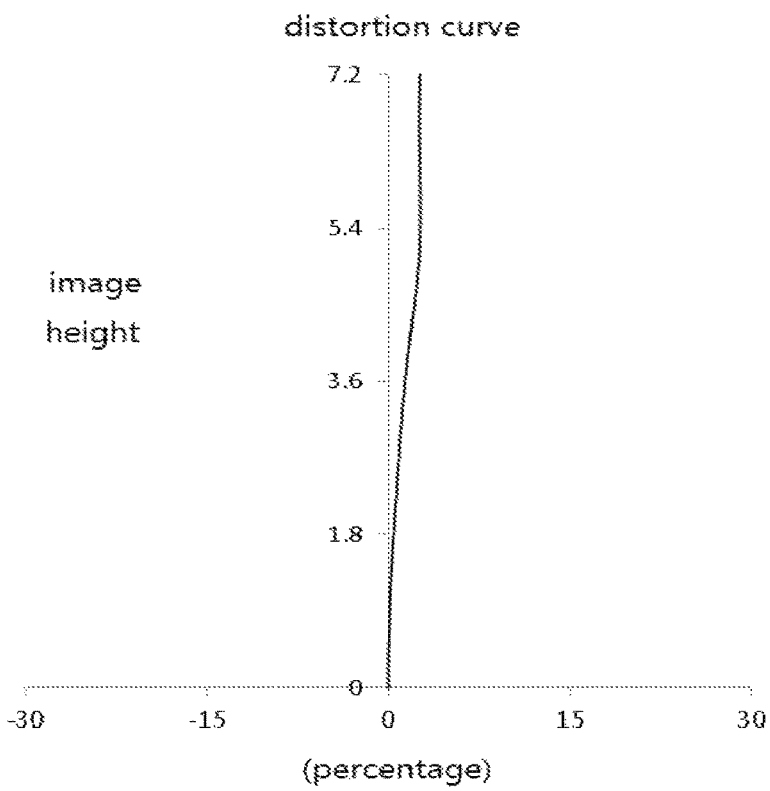
Figure 14D:
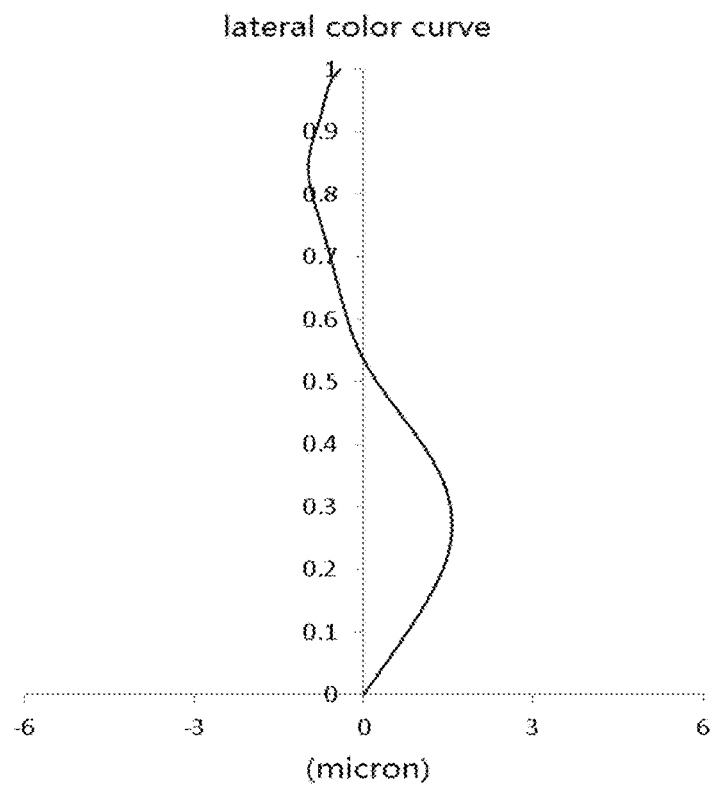

FIG. 14A shows a longitudinal aberration curve of the optical imaging lens assembly according to embodiment 7 to represent deviation of a convergence focal point after light with different wavelengths passes through the lens assembly. FIG. 14B shows an astigmatism curve of the optical imaging lens assembly according to embodiment 7 to represent a tangential image surface curvature and a sagittal image surface curvature. FIG. 14C shows a distortion curve of the optical imaging lens assembly according to embodiment 7 to represent distortion values corresponding to different image heights. FIG. 14D shows a lateral color curve of the optical imaging lens assembly according to embodiment 7 to represent deviation of different image heights on the imaging surface after the light passes through the lens assembly. According to FIG. 14A to FIG. 14D, it can be seen that the optical imaging lens assembly provided in embodiment 7 may achieve high imaging quality.

Embodiment 8

Figure 15:
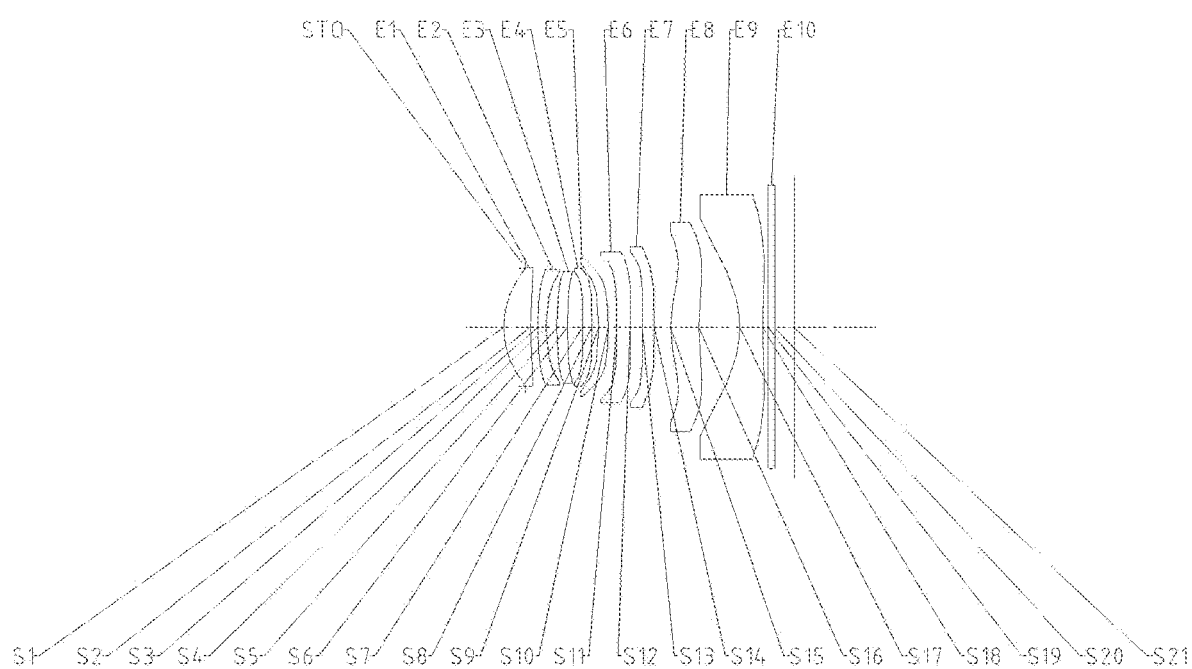
FIG. 15 shows a structure diagram of an optical imaging lens assembly according to embodiment 8 of the disclosure.

An optical imaging lens assembly according to embodiment 8 of the disclosure will be described below with reference to FIG. 15 to FIG. 16D. FIG. 15 shows a structure diagram of an optical imaging lens assembly according to embodiment 8 of the disclosure.

As shown in FIG. 15, the optical imaging lens assembly sequentially includes, from an object side to an image side along an optical axis, a diaphragm STO, a first lens E1, a second lens E2, a third lens E3, a fourth lens E4, a fifth lens E5, a sixth lens E6, a seventh lens E7, an eighth lens E8, a ninth lens E9, an optical filter E10, and an imaging surface S21.

The first lens E1 has a positive refractive power, an object-side surface S1 thereof is a convex surface, while an image-side surface S2 is a concave surface. The second lens E2 has a negative refractive power, an object-side surface S3 thereof is a convex surface, while an image-side surface S4 is a concave surface. The third lens E3 has a positive refractive power, an object-side surface S5 thereof is a convex surface, while an image-side surface S6 is a concave surface. The fourth lens E4 has a positive refractive power, an object-side surface S7 thereof is a convex surface, while an image-side surface S8 is a concave surface. The fifth lens E5 has a negative refractive power, an object-side surface S9 thereof is a concave surface, while an image-side surface S10 is a convex surface. The sixth lens E6 has a negative refractive power, an object-side surface S11 thereof is a convex surface, while an image-side surface S12 is a concave surface. The seventh lens E7 has a positive refractive power, an object-side surface S13 thereof is a convex surface, while an image-side surface S14 is a concave surface. The eighth lens E8 has a positive refractive power, an object-side surface S15 thereof is a convex surface, while an image-side surface S16 is a concave surface. The ninth lens E9 has a negative refractive power, an object-side surface S17 thereof is a concave surface, while an image-side surface S18 is a concave surface. The optical filter E10 has an object-side surface S19 and an image-side surface S20. Light from an object sequentially penetrates through each of the surfaces S1 to S20 and is finally imaged on the imaging surface S21.

In the embodiment, a total effective focal length f of the optical imaging lens assembly is 8.29 mm, TTL is a distance from the object-side surface S1 of the first lens E1 to the imaging surface S21 on the optical axis, TTL is 9.50 mm, ImgH is a half of a diagonal length of an effective pixel region on the imaging surface S21, ImgH is 6.50 mm, Fno is a relative F number (i.e., aperture value) of the optical imaging lens assembly, Fno is 1.98, Semi-FOV is a half of a maximum field of view of the optical imaging lens assembly, and Semi-FOV is 37.4°.

Table 15 is a basic parameter table of the optical imaging lens of embodiment 8, and units of the curvature radius, the thickness/distance and the focal length are all millimeter (mm).

TABLE 15

| Surface number | Surface type | Curvature radius | Thickness/ distance | Refractive index | Abbe number | Focal length | Conic coefficient |
|---|---|---|---|---|---|---|---|
| OBJ | Spherical | Infinite | Infinite | | | | |
| STO | Spherical | Infinite | −0.7341 | | | | |
| S1 | Aspheric | 3.1077 | 0.8804 | 1.55 | 56.1 | 6.65 | −0.0496 |
| S2 | Aspheric | 19.2723 | 0.2263 | | | | −2.9818 |
| S3 | Aspheric | 11.4378 | 0.2657 | 1.68 | 19.2 | −15.59 | 2.1065 |
| S4 | Aspheric | 5.4482 | 0.3580 | | | | −0.1413 |
| S5 | Aspheric | 10.6155 | 0.3483 | 1.55 | 56.1 | 100.00 | 12.7575 |
| S6 | Aspheric | 13.0219 | 0.4877 | | | | −41.1221 |

TABLE 15-continued

| Surface number | Surface type | Curvature radius | Thickness/ distance | Material Refractive index | Abbe number | Focal length | Conic coefficient |
|---|---|---|---|---|---|---|---|
| S7 | Aspheric | 46.9320 | 0.3109 | 1.65 | 23.5 | 99.91 | 0.0000 |
| S8 | Aspheric | 171.4829 | 0.2218 | | | | 0.0000 |
| S9 | Aspheric | −10.4297 | 0.3097 | 1.55 | 56.1 | −176.48 | 0.0000 |
| S10 | Aspheric | −11.8169 | 0.2812 | | | | 0.0000 |
| S11 | Aspheric | 31.1726 | 0.4366 | 1.68 | 19.2 | −44.08 | 0.0000 |
| S12 | Aspheric | 15.1891 | 0.3857 | | | | 0.0000 |
| S13 | Aspheric | 35.2372 | 0.4050 | 1.57 | 37.3 | 299.74 | 0.0000 |
| S14 | Aspheric | 44.1827 | 0.5245 | | | | 0.0000 |
| S15 | Aspheric | 4.1488 | 0.9221 | 1.55 | 56.1 | 9.83 | −1.0000 |
| S16 | Aspheric | 16.7773 | 1.3296 | | | | 0.0000 |
| S17 | Aspheric | −4.4470 | 0.7700 | 1.55 | 56.1 | −5.72 | −1.0000 |
| S18 | Aspheric | 11.1851 | 0.1841 | | | | 0.0000 |
| S19 | Spherical | Infinite | 0.2100 | 1.52 | 64.2 | | |
| S20 | Spherical | Infinite | 0.6424 | | | | |
| S21 | Spherical | Infinite | | | | | |

In embodiment 8, both the object-side surface and image-side surface of any lens in the first lens E1 to the ninth lens E9 are aspheric surfaces. Table 16 shows high-order coefficients $A_4$, $A_6$, $A_8$, $A_{10}$, $A_{12}$, $A_{14}$, $A_{16}$, $A_{18}$ and $A_{20}$ applied to the aspheric mirror surfaces S1-S18 in embodiment 8.

TABLE 16

| Surface number | A4 | A6 | A8 | A10 | A12 | A14 | A16 | A18 | A20 |
|---|---|---|---|---|---|---|---|---|---|
| S1 | 1.4988E−04 | −2.8156E−04 | 8.1369E−05 | 8.9442E−05 | −1.5550E−04 | 8.8191E−05 | −2.6003E−05 | 3.9535E−06 | −2.4966E−07 |
| S2 | −1.6368E−03 | 1.0425E−03 | −8.1092E−04 | 5.0000E−04 | −2.1860E−04 | 6.3008E−05 | −1.2030E−05 | 1.4129E−06 | −8.1747E−08 |
| S3 | 2.9757E−04 | 1.4733E−03 | 9.4717E−04 | −1.4951E−03 | 1.0409E−03 | −4.1287E−04 | 9.5143E−05 | −1.1917E−05 | 6.2946E−07 |
| S4 | 2.5373E−03 | 2.2498E−03 | −2.1662E−03 | −4.0142E−04 | 5.0627E−04 | −2.5197E−04 | 6.7520E−05 | −9.4648E−06 | 5.0699E−07 |
| S5 | −5.3556E−03 | −1.3942E−03 | 2.9749E−03 | −2.5878E−03 | 1.5290E−03 | −5.1366E−04 | 1.0214E−04 | −1.0876E−05 | 4.4378E−07 |
| S6 | −3.4812E−03 | −4.1673E−04 | 1.2109E−04 | 6.4123E−04 | −6.3024E−04 | 3.4637E−04 | −9.8919E−05 | 1.4255E−05 | −7.7983E−07 |
| S7 | −1.0110E−02 | −1.0827E−02 | 1.2299E−02 | −1.0335E−02 | 5.7031E−03 | −2.0880E−03 | 4.8343E−04 | −6.3723E−05 | 3.5759E−06 |
| S8 | 8.5987E−05 | −2.4782E−02 | 2.3585E−02 | −1.6489E−02 | 7.8650E−03 | −2.5025E−03 | 5.0466E−04 | −5.8507E−05 | 2.9917E−06 |
| S9 | 2.4783E−02 | −5.2024E−02 | 4.2176E−02 | −2.5588E−02 | 1.0620E−02 | −2.8289E−03 | 4.4895E−04 | −3.7155E−05 | 1.1664E−06 |
| S10 | 1.7469E−02 | −4.3194E−02 | 3.5747E−02 | −2.1172E−02 | 8.4692E−03 | −2.2124E−03 | 3.5973E−04 | −3.2918E−05 | 1.2919E−06 |
| S11 | −1.5448E−02 | −1.0309E−02 | 1.2748E−02 | −7.0738E−03 | 2.3436E−03 | −4.8819E−04 | 6.2035E−05 | −4.3501E−06 | 1.2608E−07 |
| S12 | −1.8760E−03 | −3.3609E−03 | 5.5931E−03 | −2.8646E−03 | 8.5003E−04 | −1.5850E−04 | 1.8234E−05 | −1.1842E−06 | 3.3293E−08 |
| S13 | −6.4583E−03 | 2.2677E−04 | 2.7219E−04 | −2.7633E−04 | 5.7379E−05 | −2.8216E−06 | −4.7158E−07 | 6.3736E−08 | −2.1026E−09 |
| S14 | −2.3505E−02 | 7.5862E−03 | −1.8179E−03 | 3.1127E−04 | −7.4341E−05 | 1.8637E−05 | −2.9431E−06 | 2.6493E−07 | −1.2661E−08 |
| S15 | −1.7717E−02 | 9.7882E−04 | −1.5994E−04 | 7.1822E−05 | −2.4173E−05 | 4.8729E−06 | −5.9372E−07 | 4.4334E−08 | −1.9872E−09 |
| S16 | 7.5233E−03 | −4.8563E−03 | 1.0680E−03 | −1.5944E−04 | 1.6350E−05 | −1.1066E−06 | 4.6826E−08 | −1.1180E−09 | 1.1474E−11 |
| S17 | −4.0096E−04 | −7.2541E−04 | 2.9478E−04 | −4.4608E−05 | 3.7170E−06 | −1.6467E−07 | 1.9433E−09 | 1.6739E−10 | −8.9853E−12 |
| S18 | −9.8730E−03 | 9.1864E−04 | −5.9035E−05 | 2.4106E−06 | −5.5120E−08 | 1.1209E−10 | 3.1939E−11 | −8.1572E−13 | 6.6139E−15 |

Figure 16A:
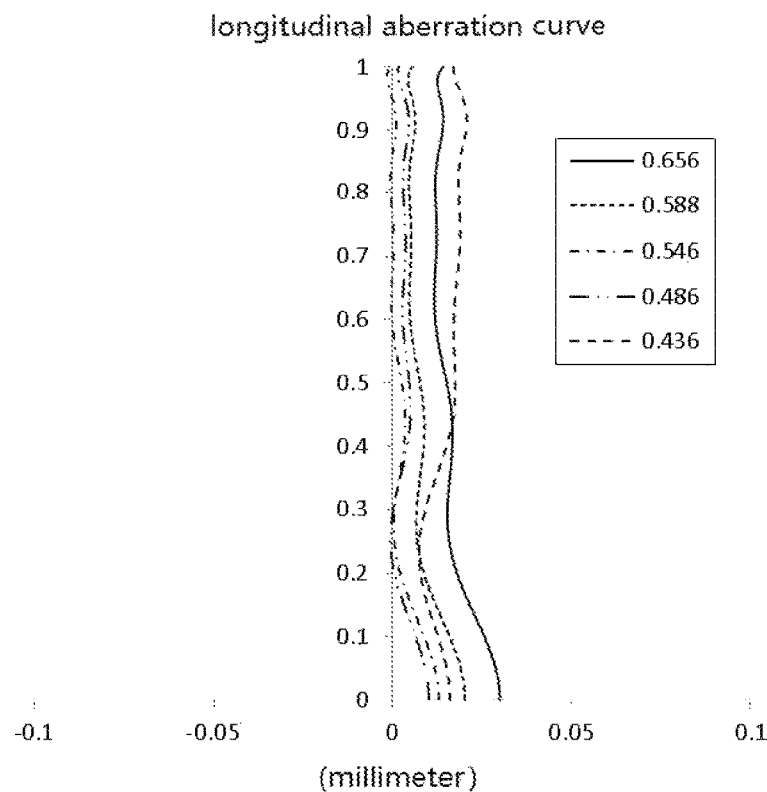
FIG. 16A to FIG. 16D illustrate an on-axis chromatic aberration curve, astigmatism curve, distortion curve and lateral chromatic aberration curve of an optical imaging lens assembly according to embodiment 8 respectively.
Figure 16B:
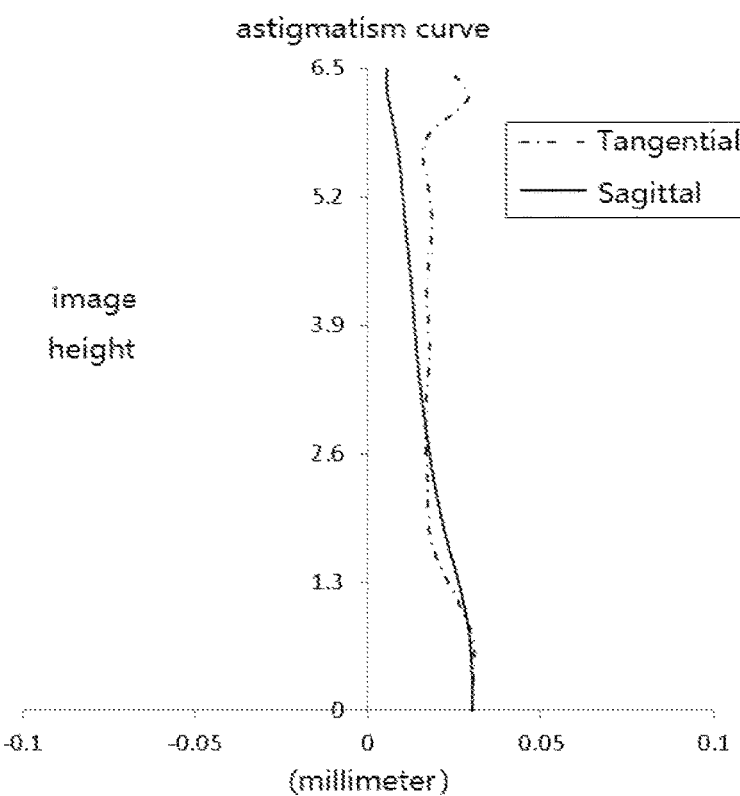
Figure 16C:
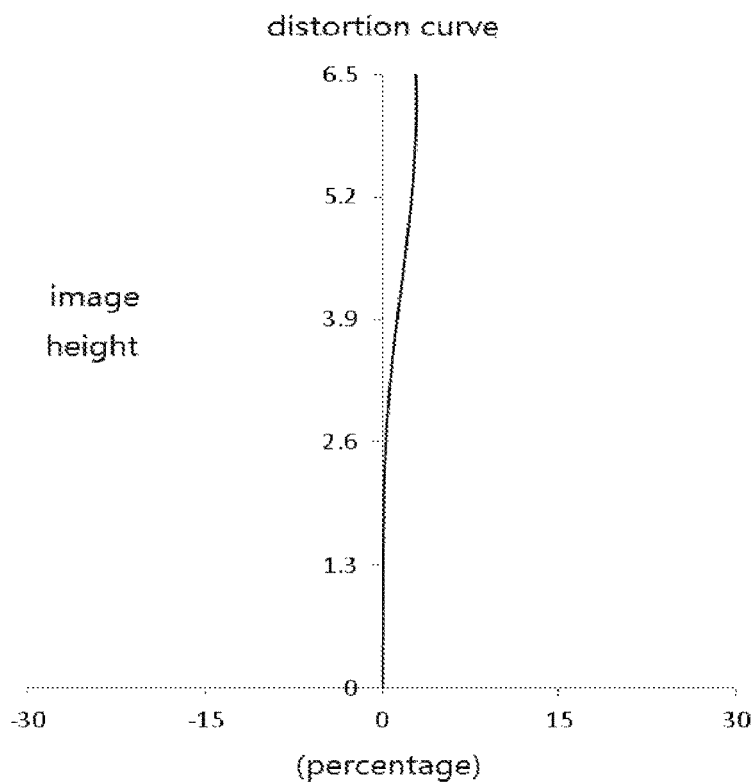
Figure 16D:
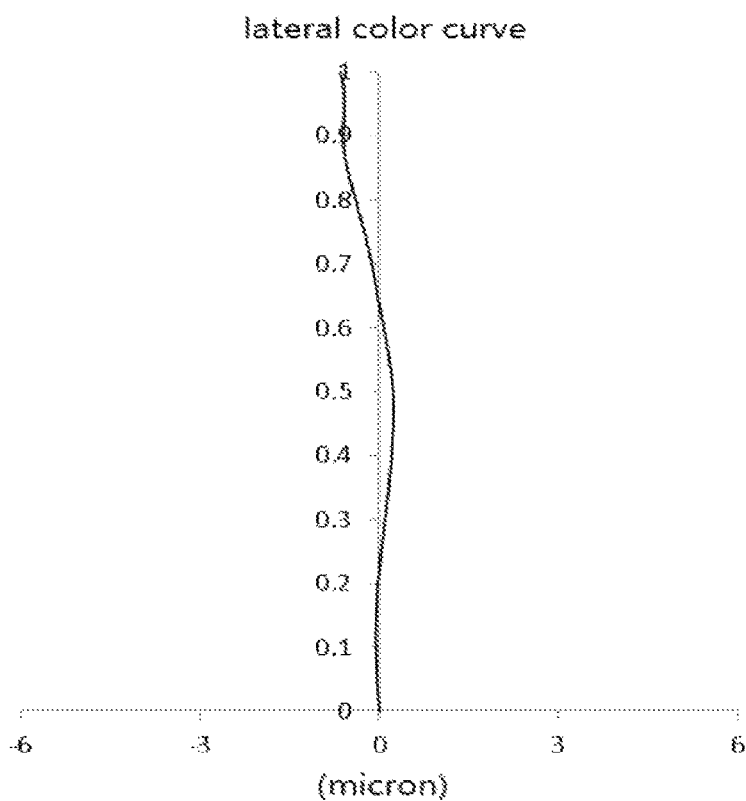

FIG. 16A shows a longitudinal aberration curve of the optical imaging lens assembly according to embodiment 8 to represent deviation of a convergence focal point after light with different wavelengths passes through the lens assembly. FIG. 16B shows an astigmatism curve of the optical imaging lens assembly according to embodiment 8 to represent a tangential image surface curvature and a sagittal image surface curvature. FIG. 16C shows a distortion curve of the optical imaging lens assembly according to embodiment 8 to represent distortion values corresponding to different image heights. FIG. 16D shows a lateral color curve of the optical imaging lens assembly according to embodiment 8 to represent deviation of different image heights on the imaging surface after the light passes through the lens assembly. According to FIG. 16A to FIG. 16D, it can be seen that the optical imaging lens assembly provided in embodiment 8 may achieve high imaging quality.

Embodiment 9

Figure 17:
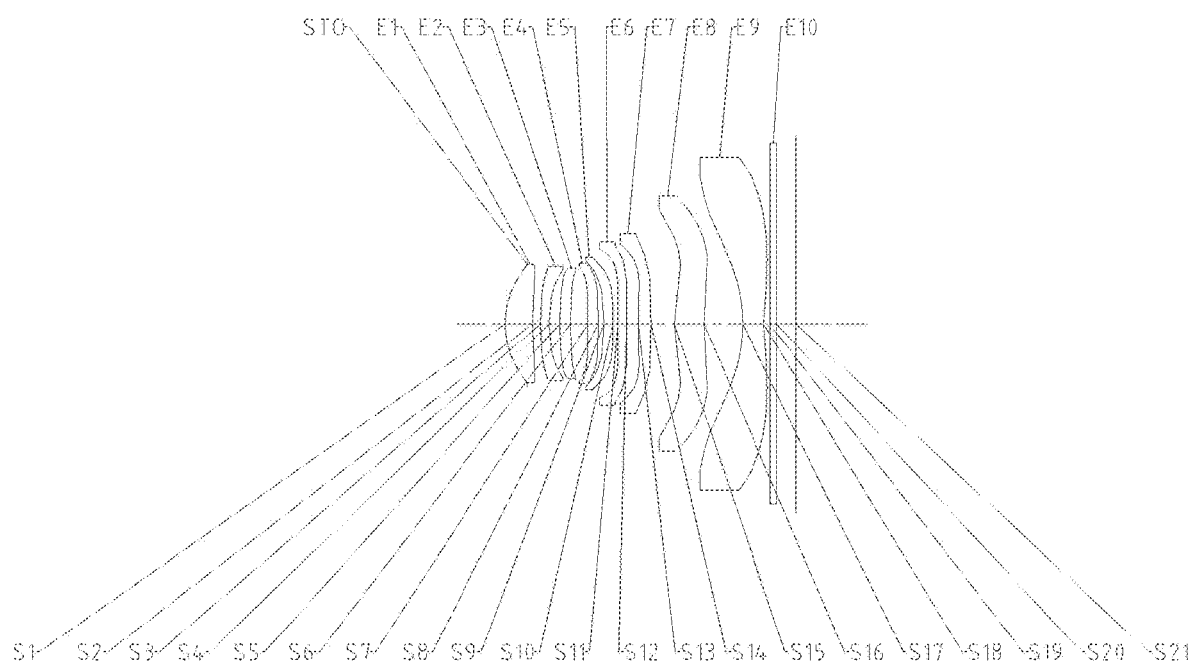
FIG. 17 shows a structure diagram of an optical imaging lens assembly according to embodiment 9 of the disclosure.

An optical imaging lens assembly according to embodiment 9 of the disclosure will be described below with reference to FIG. 17 to FIG. 18D. FIG. 17 shows a structure diagram of an optical imaging lens assembly according to embodiment 9 of the disclosure.

As shown in FIG. 17, the optical imaging lens assembly sequentially includes, from an object side to an image side along an optical axis, a diaphragm STO, a first lens E1, a second lens E2, a third lens E3, a fourth lens E4, a fifth lens E5, a sixth lens E6, a seventh lens E7, an eighth lens E8, a ninth lens E9, an optical filter E10, and an imaging surface S21.

The first lens E1 has a positive refractive power, an object-side surface S1 thereof is a convex surface, while an image-side surface S2 is a concave surface. The second lens E2 has a negative refractive power, an object-side surface S3 thereof is a convex surface, while an image-side surface S4 is a concave surface. The third lens E3 has a positive refractive power, an object-side surface S5 thereof is a convex surface, while an image-side surface S6 is a concave surface. The fourth lens E4 has a positive refractive power, an object-side surface S7 thereof is a convex surface, while an image-side surface S8 is a concave surface. The fifth lens E5 has a negative refractive power, an object-side surface S9 thereof is a concave surface, while an image-side surface S10 is a convex surface. The sixth lens E6 has a positive refractive power, an object-side surface S11 thereof is a convex surface, while an image-side surface S12 is a concave surface. The seventh lens E7 has a positive refractive power, an object-side surface S13 thereof is a convex surface, while an image-side surface S14 is a concave surface. The eighth lens E8 has a positive refractive power, an object-side surface S15 thereof is a convex surface, while an image-side surface S16 is a concave surface. The ninth lens E9 has a negative refractive power, an object-side surface S17 thereof is a concave surface, while an image-side surface S18 is a concave surface. The optical filter E10 has an object-side surface S19 and an image-side surface S20. Light from an object sequentially penetrates through each of the surfaces S1 to S20 and is finally imaged on the imaging surface S21.

In the embodiment, a total effective focal length f of the optical imaging lens assembly is 8.31 mm, TTL is a distance from the object-side surface S1 of the first lens E1 to the imaging surface S21 on the optical axis, TTL is 9.50 mm, ImgH is a half of a diagonal length of an effective pixel region on the imaging surface S21, ImgH is 6.50 mm, Fno is a relative F number (i.e., aperture value) of the optical imaging lens assembly, Fno is 1.98, Semi-FOV is a half of a maximum field of view of the optical imaging lens assembly, and Semi-FOV is 37.3°.

Table 17 is a basic parameter table of the optical imaging lens of embodiment 9, and units of the curvature radius, the thickness/distance and the focal length are all millimeter (mm).

TABLE 17

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.7341 | | | | |
| S1 | Aspheric | 3.1250 | 0.9032 | 1.55 | 56.1 | 6.54 | −0.0595 |
| S2 | Aspheric | 22.2304 | 0.2566 | | | | 0.0488 |
| S3 | Aspheric | 12.2333 | 0.2732 | 1.68 | 19.2 | −14.33 | 2.2829 |
| S4 | Aspheric | 5.3734 | 0.3503 | | | | −0.0918 |
| S5 | Aspheric | 10.3117 | 0.3478 | 1.55 | 56.1 | 100.00 | 12.5719 |
| S6 | Aspheric | 12.5585 | 0.5698 | | | | −35.0714 |
| S7 | Aspheric | 36.6505 | 0.3291 | 1.65 | 23.5 | 99.91 | 0.0000 |
| S8 | Aspheric | 84.4927 | 0.1949 | | | | 0.0000 |
| S9 | Aspheric | −10.3337 | 0.3000 | 1.55 | 56.1 | −45.02 | 0.0000 |
| S10 | Aspheric | −18.0004 | 0.1564 | | | | 0.0000 |
| S11 | Aspheric | 13.5244 | 0.2827 | 1.68 | 19.2 | 299.70 | 0.0000 |
| S12 | Aspheric | 14.3639 | 0.3866 | | | | 0.0000 |
| S13 | Aspheric | 26.3610 | 0.4062 | 1.57 | 37.3 | 99.91 | 0.0000 |
| S14 | Aspheric | 48.7119 | 0.7570 | | | | 0.0000 |
| S15 | Aspheric | 4.8413 | 0.9778 | 1.55 | 56.1 | 12.58 | 0.0000 |
| S16 | Aspheric | 15.1976 | 1.2554 | | | | 0.0000 |
| S17 | Aspheric | −5.9209 | 0.6964 | 1.55 | 56.1 | −6.22 | 0.0000 |
| S18 | Aspheric | 8.3163 | 0.2043 | | | | 0.0000 |
| S19 | Spherical | Infinite | 0.2100 | 1.52 | 64.2 | | |
| S20 | Spherical | Infinite | 0.6424 | | | | |
| S21 | Spherical | Infinite | | | | | |

In embodiment 9, both the object-side surface and image-side surface of any lens in the first lens E1 to the ninth lens E9 are aspheric surfaces. Table 18 shows high-order coefficients $A_4$, $A_6$, $A_8$, $A_{10}$, $A_{12}$, $A_{14}$, $A_{16}$, $A_{18}$ and $A_{20}$ applied to the aspheric mirror surfaces S1-S18 in embodiment 9.

TABLE 18

| Surface number | A4 | A6 | A8 | A10 | A12 | A14 | A16 | A18 | A20 |
|---|---|---|---|---|---|---|---|---|---|
| S1 | −4.3677E−04 | 1.0597E−03 | −1.8527E−03 | 1.6866E−03 | −9.5817E−04 | 3.3670E−04 | −7.2039E−05 | 8.6024E−06 | −4.4342E−07 |
| S2 | −1.3911E−03 | 5.3553E−04 | −1.3932E−04 | −2.1620E−05 | 1.8650E−05 | −9.8004E−07 | −1.9832E−06 | 5.7298E−07 | −5.2137E−08 |
| S3 | 2.0039E−04 | 2.1809E−03 | −2.0819E−04 | −3.4889E−04 | 2.8969E−04 | −1.0291E−04 | 1.9021E−05 | −1.7963E−06 | 6.9742E−08 |
| S4 | 2.4635E−03 | 2.3528E−03 | −4.9455E−04 | 2.0851E−04 | −1.5933E−04 | 1.1851E−04 | −4.1921E−05 | 6.9741E−06 | −4.7193E−07 |
| S5 | −5.9643E−03 | 9.3760E−05 | 8.1476E−04 | −5.1554E−04 | 2.8550E−04 | −7.4102E−05 | 1.6457E−05 | −3.0064E−06 | 2.4855E−07 |
| S6 | −3.7830E−03 | −2.7485E−04 | 1.0753E−03 | −1.0217E−03 | 8.2156E−04 | −3.9942E−04 | 1.2473E−04 | −2.1888E−05 | 1.6461E−06 |
| S7 | −1.0838E−02 | −9.3131E−03 | 8.8311E−03 | −6.3936E−03 | 3.1669E−03 | −1.0909E−03 | 2.4590E−04 | −3.2257E−05 | 1.8119E−06 |
| S8 | 4.0158E−03 | −2.9168E−02 | 2.5728E−02 | −1.6809E−02 | 7.6063E−03 | −2.3125E−03 | 4.4765E−04 | −4.9985E−05 | 2.4619E−06 |
| S9 | 2.9880E−02 | −5.4532E−02 | 4.2523E−02 | −2.4893E−02 | 1.0022E−02 | −2.6092E−03 | 4.1124E−04 | −3.4870E−05 | 1.1909E−06 |
| S10 | 9.0118E−03 | −3.6482E−02 | 3.1573E−02 | −1.8372E−02 | 6.9794E−03 | −1.7146E−03 | 2.6262E−04 | −2.2724E−05 | 8.4463E−07 |
| S11 | −1.9176E−02 | −1.0691E−02 | 1.3514E−02 | −6.9135E−03 | 2.0556E−03 | −3.8501E−04 | 4.4761E−05 | −2.9428E−06 | 8.2375E−08 |
| S12 | −9.9583E−03 | −1.0628E−02 | 8.7948E−03 | −3.6522E−03 | 9.4961E−04 | −1.6342E−04 | 1.8155E−05 | −1.1815E−06 | 3.4198E−08 |
| S13 | 1.8143E−03 | −6.9022E−03 | 3.6703E−03 | −1.5261E−03 | 3.8603E−04 | −5.9531E−05 | 5.5168E−06 | −2.8704E−07 | 6.7093E−09 |
| S14 | −1.3810E−02 | −1.6921E−04 | 2.1426E−03 | −1.1337E−03 | 2.9336E−04 | −4.3846E−05 | 3.9145E−06 | −1.9955E−07 | 4.9600E−09 |
| S15 | −1.1481E−02 | −2.6213E−03 | 8.5470E−04 | −1.4124E−04 | 1.0854E−05 | 6.1482E−07 | −2.3512E−07 | 2.4436E−08 | −1.3021E−09 |

TABLE 18-continued

| Surface number | A4 | A6 | A8 | A10 | A12 | A14 | A16 | A18 | A20 |
|---|---|---|---|---|---|---|---|---|---|
| S16 | 9.2856E−03 | −5.7161E−03 | 1.2187E−03 | −1.7109E−04 | 1.6508E−05 | −1.0725E−06 | 4.4510E−08 | −1.0587E−09 | 1.0925E−11 |
| S17 | 7.3931E−04 | −1.1617E−03 | 3.8113E−04 | −5.1670E−05 | 3.5988E−06 | −1.0584E−07 | −2.1088E−08 | 2.8802E−10 | −1.0164E−11 |
| S18 | −1.0832E−02 | 8.2966E−04 | −3.1331E−05 | −2.9438E−07 | 7.7077E−08 | −3.2356E−09 | 6.7104E−11 | −7.1273E−13 | 3.0062E−15 |

Figure 18A:
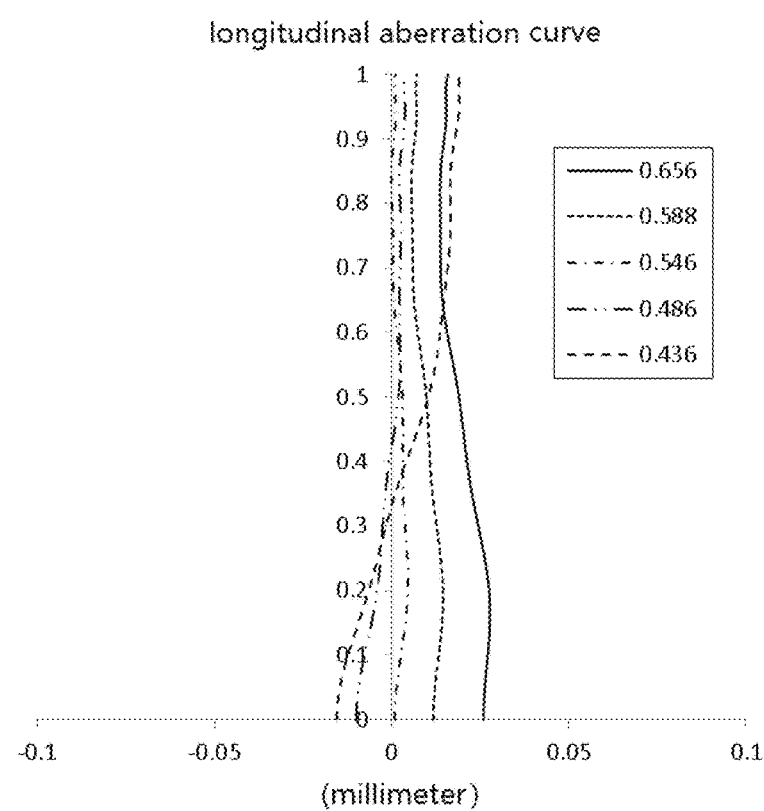
FIG. 18A to FIG. 18D illustrate an on-axis chromatic aberration curve, astigmatism curve, distortion curve and lateral chromatic aberration curve of an optical imaging lens assembly according to embodiment 9 respectively.
Figure 18B:
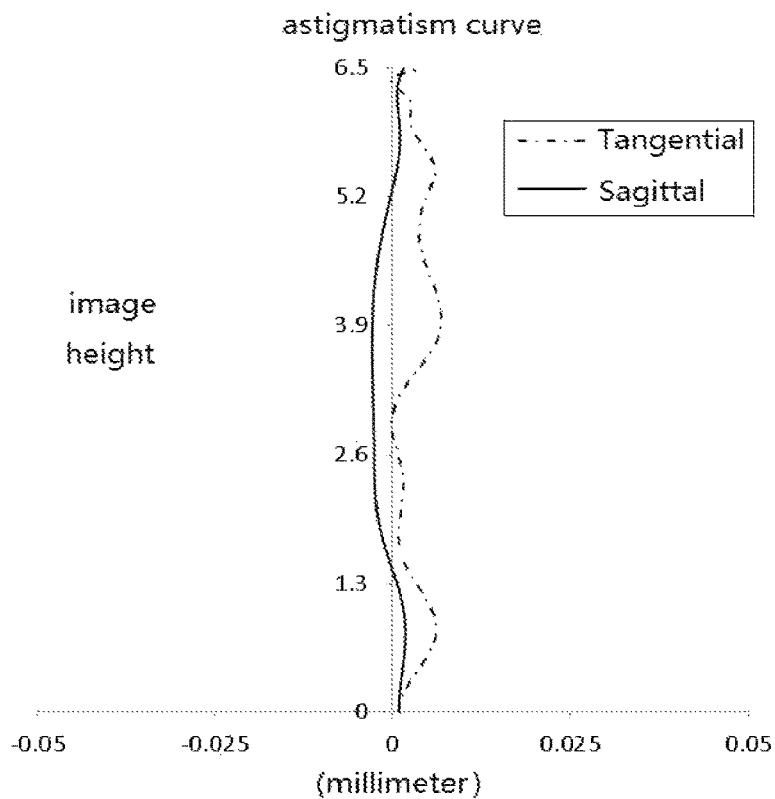
Figure 18C:
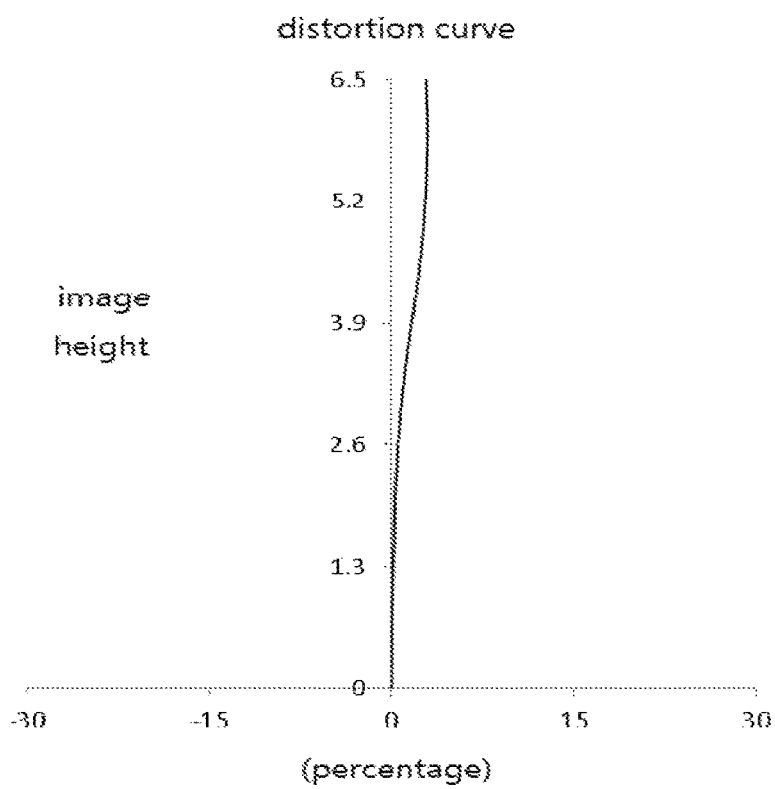
Figure 18D:
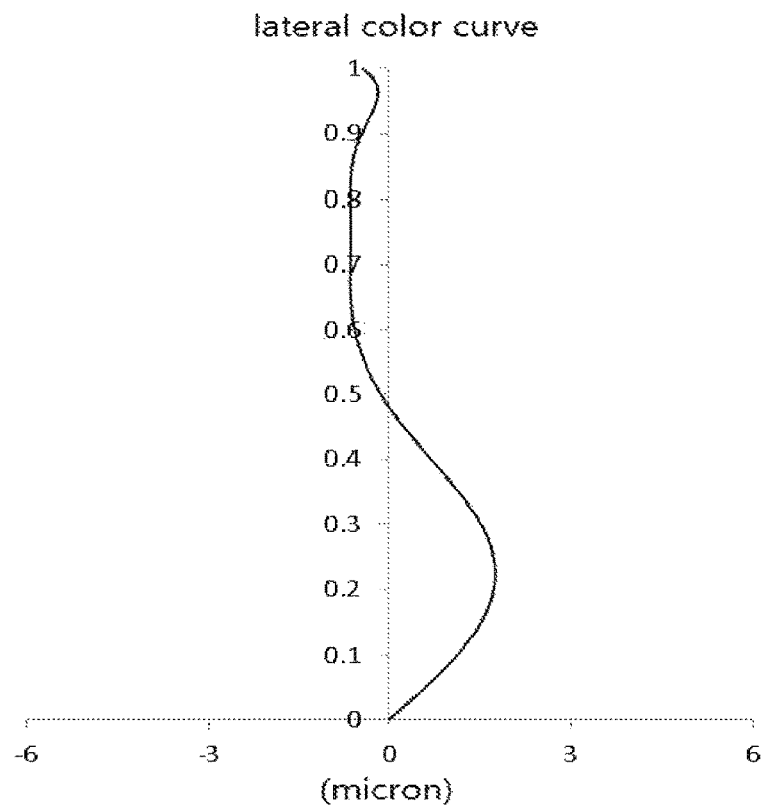

FIG. 18A shows a longitudinal aberration curve of the optical imaging lens assembly according to embodiment 9 to represent deviation of a convergence focal point after light with different wavelengths passes through the lens assembly. FIG. 18B shows an astigmatism curve of the optical imaging lens assembly according to embodiment 9 to represent a tangential image surface curvature and a sagittal image surface curvature. FIG. 18C shows a distortion curve of the optical imaging lens assembly according to embodiment 9 to represent distortion values corresponding to different image heights. FIG. 18D shows a lateral chromatic aberration curve of the optical imaging lens assembly according to embodiment 9 to represent deviation of different image heights on the imaging surface after the light passes through the lens assembly. According to FIG. 18A to FIG. 18D, it can be seen that the optical imaging lens assembly provided in embodiment 9 may achieve high imaging quality.

Embodiment 10

Figure 19:
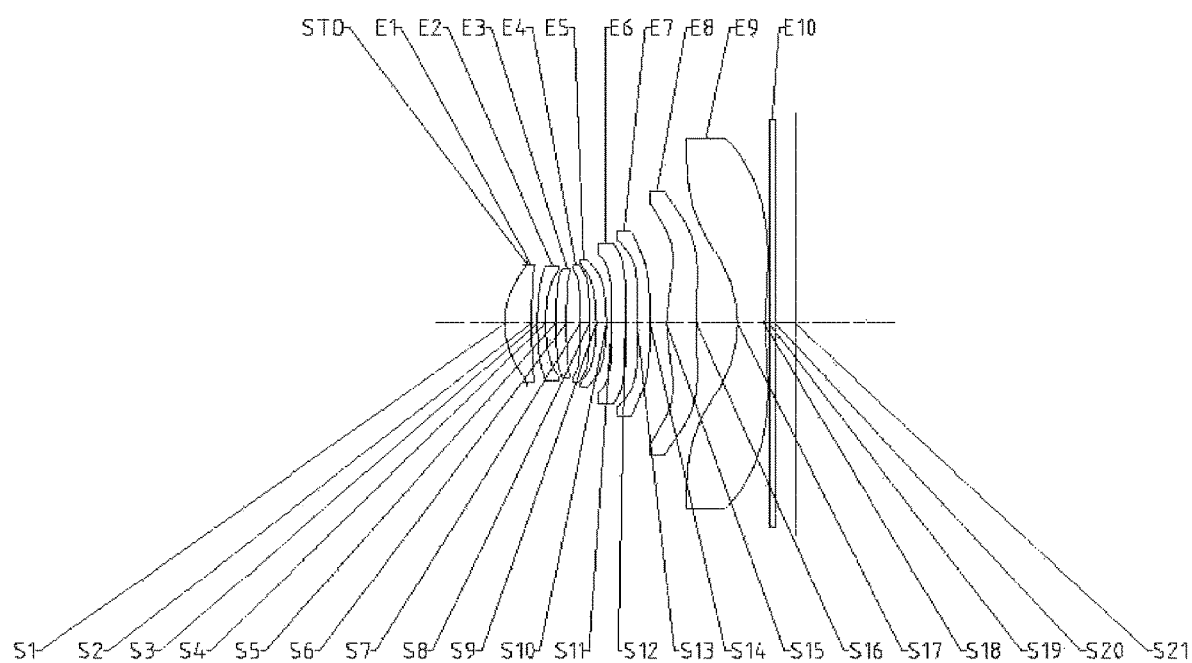
FIG. 19 shows a structure diagram of an optical imaging lens assembly according to embodiment 10 of the disclosure.

An optical imaging lens assembly according to embodiment 10 of the disclosure will be described below with reference to FIG. 19 to FIG. 20D. FIG. 19 shows a structure diagram of an optical imaging lens assembly according to embodiment 10 of the disclosure.

As shown in FIG. 19, the optical imaging lens assembly sequentially includes, from an object side to an image side along an optical axis, a diaphragm STO, a first lens E1, a second lens E2, a third lens E3, a fourth lens E4, a fifth lens E5, a sixth lens E6, a seventh lens E7, an eighth lens E8, a ninth lens E9, an optical filter E10, and an imaging surface S21.

The first lens E1 has a positive refractive power, an object-side surface S1 thereof is a convex surface, while an image-side surface S2 is a concave surface. The second lens E2 has a negative refractive power, an object-side surface S3 thereof is a convex surface, while an image-side surface S4 is a concave surface. The third lens E3 has a positive refractive power, an object-side surface S5 thereof is a convex surface, while an image-side surface S6 is a concave surface. The fourth lens E4 has a positive refractive power, an object-side surface S7 thereof is a convex surface, while an image-side surface S8 is a concave surface. The fifth lens E5 has a negative refractive power, an object-side surface S9 thereof is a concave surface, while an image-side surface S10 is a convex surface. The sixth lens E6 has a negative refractive power, an object-side surface S11 thereof is a convex surface, while an image-side surface S12 is a concave surface. The seventh lens E7 has a negative refractive power, an object-side surface S13 thereof is a convex surface, while an image-side surface S14 is a concave surface. The eighth lens E8 has a positive refractive power, an object-side surface S15 thereof is a convex surface, while an image-side surface S16 is a concave surface. The ninth lens E9 has a negative refractive power, an object-side surface S17 thereof is a concave surface, while an image-side surface S18 is a concave surface. The optical filter E10 has an object-side surface S19 and an image-side surface S20. Light from an object sequentially penetrates through each of the surfaces S1 to S20 and is finally imaged on the imaging surface S21.

In the embodiment, a total effective focal length f of the optical imaging lens assembly is 8.06 mm, TTL is a distance from the object-side surface S1 of the first lens E1 to the imaging surface S21 on the optical axis, TTL is 9.50 mm, ImgH is a half of a diagonal length of an effective pixel region on the imaging surface S21, ImgH is 7.00 mm, Fno is a relative F number (i.e., aperture value) of the optical imaging lens assembly, Fno is 1.98, Semi-FOV is a half of a maximum field of view of the optical imaging lens assembly, and Semi-FOV is 40.2°.

Table 19 is a basic parameter table of the optical imaging lens of embodiment 10, and units of the curvature radius, the thickness/distance and the focal length are all millimeter (mm).

TABLE 19

| Surface number | Surface type | Curvature radius | Thickness/ distance | Material Refractive index | Material Abbe number | Focal length | Conic coefficient |
|---|---|---|---|---|---|---|---|
| OBJ | Spherical | Infinite | Infinite | | | | |
| STO | Spherical | Infinite | −0.7341 | | | | |
| S1 | Aspheric | 3.1104 | 0.8466 | 1.55 | 56.1 | 6.87 | −0.0461 |
| S2 | Aspheric | 16.4025 | 0.2107 | | | | −2.1789 |
| S3 | Aspheric | 10.3532 | 0.2552 | 1.68 | 19.2 | −16.69 | 2.0578 |
| S4 | Aspheric | 5.3586 | 0.3303 | | | | −0.1601 |
| S5 | Aspheric | 10.2799 | 0.3504 | 1.55 | 56.1 | 75.85 | 12.9374 |
| S6 | Aspheric | 13.5051 | 0.4655 | | | | −43.3010 |
| S7 | Aspheric | 47.6680 | 0.3155 | 1.65 | 23.5 | 99.91 | 0.0000 |
| S8 | Aspheric | 181.7652 | 0.2292 | | | | 0.0000 |
| S9 | Aspheric | −10.4433 | 0.3384 | 1.55 | 56.1 | −300.01 | 0.0000 |
| S10 | Aspheric | −11.2815 | 0.1794 | | | | 0.0000 |
| S11 | Aspheric | 38.1752 | 0.4293 | 1.68 | 19.2 | −39.66 | 0.0000 |
| S12 | Aspheric | 15.7254 | 0.3772 | | | | 0.0000 |
| S13 | Aspheric | 44.8275 | 0.4275 | 1.57 | 37.3 | −281.67 | 0.0000 |

TABLE 19-continued

| Surface number | Surface type | Curvature radius | Thickness/ distance | Material Refractive index | Abbe number | Focal length | Conic coefficient |
|---|---|---|---|---|---|---|---|
| S14 | Aspheric | 34.9383 | 0.5358 | | | | 0.0000 |
| S15 | Aspheric | 4.2310 | 0.9800 | 1.55 | 56.1 | 8.64 | 0.0000 |
| S16 | Aspheric | 37.3599 | 1.3444 | | | | 0.0000 |
| S17 | Aspheric | −4.4963 | 0.8819 | 1.55 | 56.1 | −5.58 | −1.0000 |
| S18 | Aspheric | 10.1336 | 0.1502 | | | | 0.0000 |
| S19 | Spherical | Infinite | 0.2100 | 1.52 | 64.2 | | |
| S20 | Spherical | Infinite | 0.6424 | | | | |
| S21 | Spherical | Infinite | | | | | |

In embodiment 10, both the object-side surface and image-side surface of any lens in the first lens E1 to the ninth lens E9 are aspheric surfaces. Table 20 shows high-order coefficients $A_4$, $A_6$, $A_8$, $A_{10}$, $A_{12}$, $A_{14}$, $A_{16}$, $A_{18}$ and $A_{20}$ applied to the aspheric mirror surfaces S1-S18 in embodiment 10.

TABLE 20

| Surface number | A4 | A6 | A8 | A10 | A12 | A14 | A16 | A18 | A20 |
|---|---|---|---|---|---|---|---|---|---|
| S1 | −1.8253E−04 | 8.0669E−04 | −1.3657E−03 | 1.2246E−03 | −7.0528E−04 | 2.5396E−04 | −5.6336E−05 | 7.0390E−06 | −3.8437E−07 |
| S2 | −1.2766E−03 | −1.4203E−05 | 7.3731E−04 | −7.4287E−04 | 3.6403E−04 | −9.8304E−05 | 1.3217E−05 | −5.3453E−07 | −3.3800E−08 |
| S3 | −4.5083E−05 | 2.1385E−03 | 2.5115E−05 | −6.1280E−04 | 4.7601E−04 | −1.7859E−04 | 3.5946E−05 | −3.7297E−06 | 1.5711E−07 |
| S4 | 2.8198E−03 | 1.0632E−03 | 1.9555E−03 | −2.5311E−03 | 1.7111E−03 | −6.5580E−04 | 1.4662E−04 | −1.7884E−05 | 8.8674E−07 |
| S5 | −5.7958E−03 | 8.8717E−04 | −1.1878E−03 | 1.6974E−03 | −1.1615E−03 | 5.1580E−04 | −1.2894E−04 | 1.6655E−05 | −8.6451E−07 |
| S6 | −3.0944E−03 | −1.9768E−03 | 3.5406E−03 | −3.7142E−03 | 2.7090E−03 | −1.2330E−03 | 3.5162E−04 | −5.6723E−05 | 3.9610E−06 |
| S7 | −9.9894E−03 | −9.5803E−03 | 1.0204E−02 | −8.5544E−03 | 4.8678E−03 | −1.8628E−03 | 4.4975E−04 | −6.1393E−05 | 3.5361E−06 |
| S8 | −1.6351E−03 | −2.0887E−02 | 1.8986E−02 | −1.3423E−02 | 6.6617E−03 | −2.2182E−03 | 4.6577E−04 | −5.6039E−05 | 2.9828E−06 |
| S9 | 1.9641E−02 | −4.0023E−02 | 2.8671E−02 | −1.6416E−02 | 6.5431E−03 | −1.6265E−03 | 2.2116E−04 | −1.2107E−05 | −3.7573E−08 |
| S10 | 1.6683E−02 | −4.1722E−02 | 3.5089E−02 | −2.1033E−02 | 8.4986E−03 | −2.2599E−03 | 3.7895E−04 | −3.6271E−05 | 1.5088E−06 |
| S11 | −1.4542E−02 | −1.4423E−02 | 1.6502E−02 | −8.7100E−03 | 2.7543E−03 | −5.5410E−04 | 6.9636E−05 | −4.9944E−06 | 1.5460E−07 |
| S12 | −1.6592E−02 | −4.0043E−03 | 5.0896E−03 | −2.2243E−03 | 5.6590E−04 | −9.1513E−05 | 9.3033E−06 | −5.4648E−07 | 1.4247E−08 |
| S13 | −9.4599E−03 | 4.7695E−03 | −2.5352E−03 | 7.0754E−04 | −1.4642E−04 | 2.2399E−05 | −2.2696E−06 | 1.2994E−07 | −3.0494E−09 |
| S14 | −3.2307E−02 | 1.3969E−02 | −4.6412E−03 | 1.0760E−03 | −1.9488E−04 | 2.7658E−05 | −2.8028E−06 | 1.8326E−07 | −6.8347E−09 |
| S15 | −3.1260E−02 | 1.8510E−02 | −1.2351E−02 | 4.8639E−03 | −1.1805E−03 | 1.8420E−04 | −1.8831E−05 | 1.2542E−06 | −5.2420E−08 |
| S16 | 5.3676E−03 | −3.2454E−03 | 6.2170E−04 | −8.5334E−05 | 8.5155E−06 | −5.7523E−07 | 2.4366E−08 | −5.7839E−10 | 5.8425E−12 |
| S17 | −8.3436E−04 | −4.4777E−04 | 7.7022E−05 | 3.8975E−06 | −1.4493E−06 | 1.3220E−07 | −6.5331E−09 | 1.9587E−10 | −3.5615E−12 |
| S18 | −7.5180E−03 | 4.9827E−04 | −3.1176E−05 | 2.2301E−06 | −1.4026E−07 | 5.8055E−09 | −1.4310E−10 | 1.9149E−12 | −1.0739E−14 |

Figure 20A:
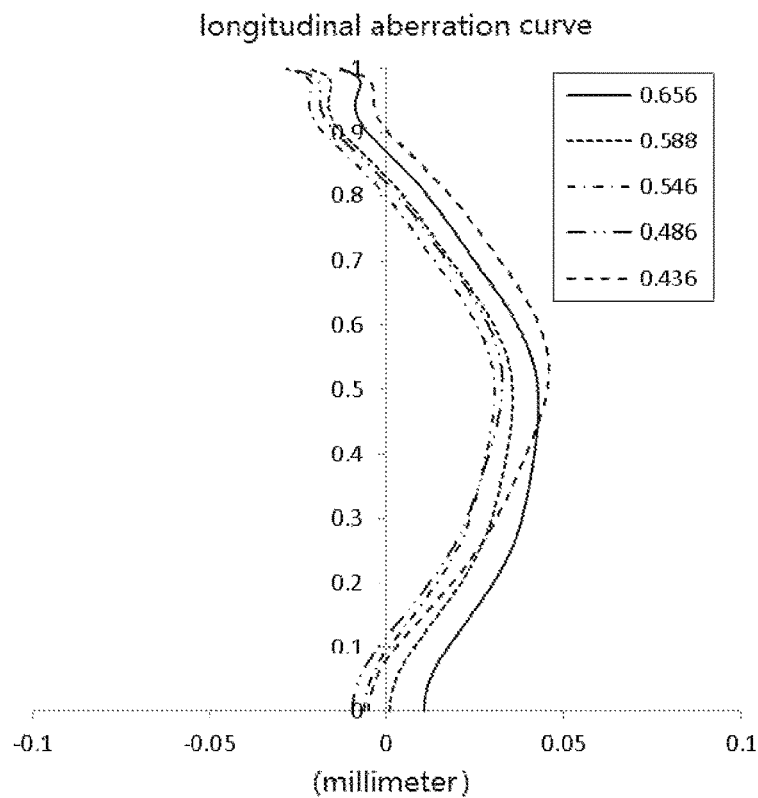
FIG. 20A to FIG. 20D show a longitudinal aberration curve, an astigmatism curve, a distortion curve, and a lateral color curve of an optical imaging lens assembly according to embodiment 10 respectively.
Figure 20B:
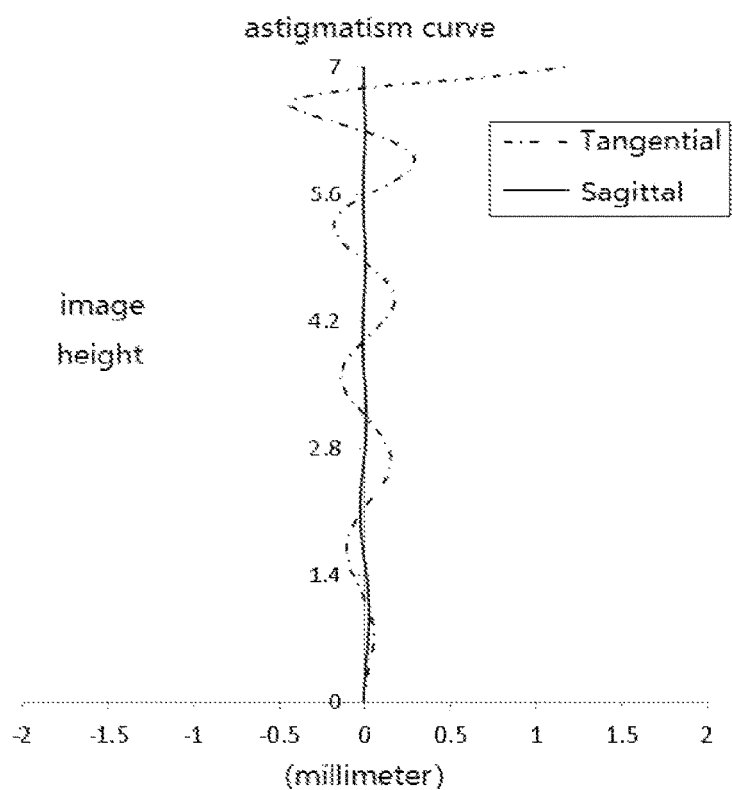
Figure 20C:
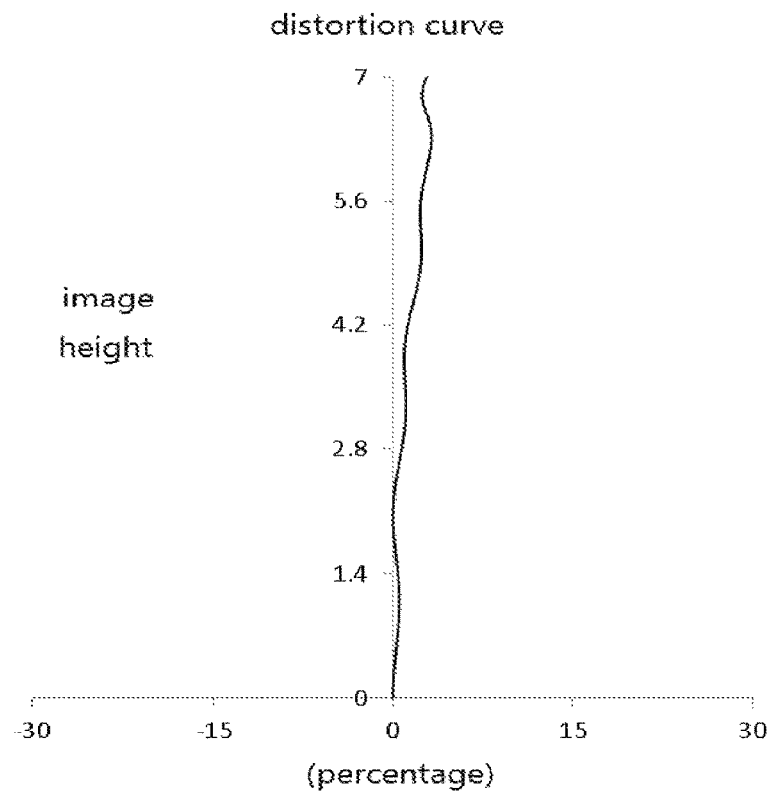
Figure 20D:
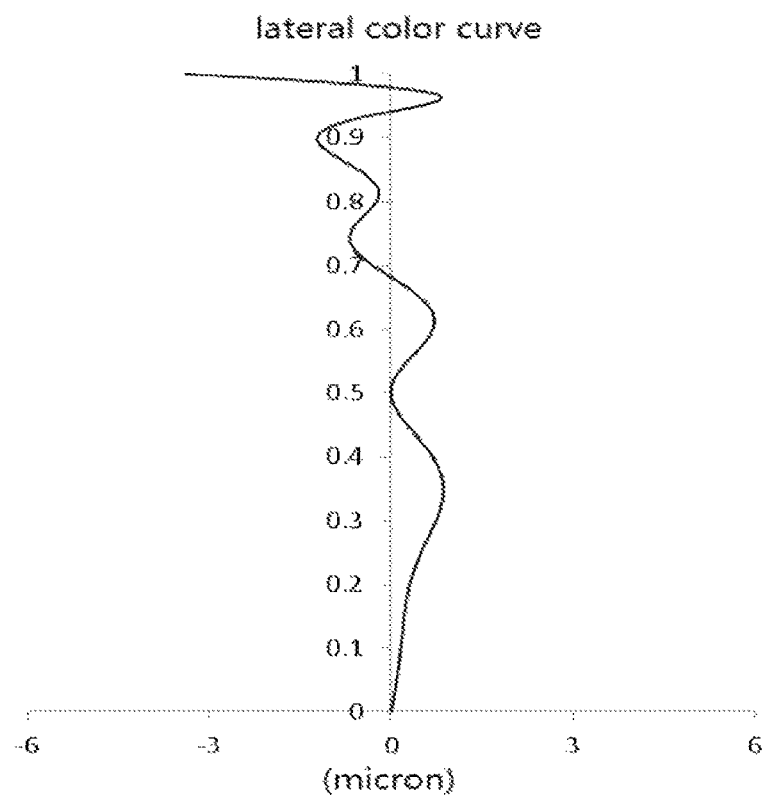

FIG. 20A shows a longitudinal aberration curve of the optical imaging lens assembly according to embodiment 10 to represent deviation of a convergence focal point after light with different wavelengths passes through the lens assembly. FIG. 20B shows an astigmatism curve of the optical imaging lens assembly according to embodiment 10 to represent a tangential image surface curvature and a sagittal image surface curvature. FIG. 20C shows a distortion curve of the optical imaging lens assembly according to embodiment 10 to represent distortion values corresponding to different image heights. FIG. 20D illustrates a lateral chromatic aberration curve of the optical imaging lens assembly according to embodiment 10 to represent deviation of different image heights on the imaging surface after the light passes through the lens assembly. According to FIG. 20A to FIG. 20D, it can be seen that the optical imaging lens assembly provided in embodiment 10 may achieve high imaging quality.

From the above, embodiment 1 to embodiment 10 meet a relationship shown in Table 21 respectively.

TABLE 21

| Conditional expression/ embodiment | 1 | 2 | 3 | 4 | 5 | 6 | 7 | 8 | 9 | 10 |
|---|---|---|---|---|---|---|---|---|---|---|
| f8/f1 | 1.51 | 1.55 | 1.56 | 1.68 | 1.85 | 1.67 | 1.85 | 1.48 | 1.92 | 1.26 |
| f2/f9 | 3.61 | 3.46 | 3.59 | 3.71 | 3.87 | 3.87 | 3.87 | 2.72 | 2.30 | 2.99 |
| f3/(R5 + R6) | 3.10 | 3.31 | 2.95 | 2.88 | 2.10 | 2.38 | 2.10 | 4.23 | 4.37 | 3.19 |
| R2/R3 | 1.47 | 1.44 | 1.45 | 1.45 | 1.38 | 1.41 | 1.38 | 1.68 | 1.82 | 1.58 |
| R4/R1 | 1.59 | 1.65 | 1.59 | 1.57 | 1.53 | 1.56 | 1.53 | 1.75 | 1.72 | 1.72 |
| R12/R10 | −2.00 | −2.04 | −2.09 | −2.13 | −1.86 | −1.72 | −1.86 | −1.29 | −0.80 | −1.39 |
| R9/R15 | −1.98 | −1.91 | −1.95 | −1.82 | −2.27 | −3.13 | −2.27 | −2.51 | −2.13 | −2.47 |
| R18/R17 | −2.68 | −2.41 | −2.78 | −3.09 | −3.22 | −3.21 | −3.22 | −2.52 | −1.40 | −2.25 |
| CT7/CT6 | 0.98 | 1.01 | 0.99 | 0.97 | 1.00 | 0.92 | 1.00 | 1.05 | 1.05 | 1.13 |

TABLE 21-continued

| Conditional expression/ embodiment | 1 | 2 | 3 | 4 | 5 | 6 | 7 | 8 | 9 | 10 |
|---|---|---|---|---|---|---|---|---|---|---|
| T34/T45 | 1.65 | 1.66 | 1.66 | 1.80 | 3.13 | 2.85 | 3.13 | 2.20 | 2.92 | 2.03 |
| (CT8 + CT9)/T89 | 1.32 | 1.40 | 1.32 | 1.25 | 1.07 | 1.22 | 1.07 | 1.27 | 1.33 | 1.38 |
| T78/CT7 | 1.60 | 1.47 | 1.55 | 1.68 | 1.64 | 1.76 | 1.64 | 1.29 | 1.86 | 1.25 |
| T67/T56 | 2.82 | 2.29 | 2.79 | 3.65 | 3.42 | 3.58 | 3.42 | 1.37 | 2.47 | 2.10 |

The disclosure also provides an imaging device, of which an electronic photosensitive element may be a Charge Coupled Device (CCD) or a Complementary Metal Oxide Semiconductor (CMOS). The imaging device may be an independent imaging device such as a digital camera, or may be an imaging module integrated into a mobile electronic device such as a mobile phone. The imaging device is provided with the abovementioned optical imaging lens group.

The above description is only description about the preferred embodiments of the disclosure and adopted technical principles. It is understood by those skilled in the art that the scope of invention involved in the disclosure is not limited to the technical solutions formed by specifically combining the technical characteristics and should also cover other technical solutions formed by freely combining the technical characteristics or equivalent characteristics thereof without departing from the inventive concept, for example, technical solutions formed by mutually replacing the characteristics and (but not limited to) the technical characteristics with similar functions disclosed in the disclosure.

What is claimed is:

1. An optical imaging lens assembly, sequentially comprising, from an object side to an image side along an optical axis:
   a first lens with a positive refractive power;
   a second lens with a negative refractive power;
   a third lens with a positive refractive power, an object-side surface thereof being a convex surface;
   a fourth lens with a positive refractive power;
   a fifth lens with a refractive power, an object-side surface thereof being a concave surface, while an image-side surface thereof being a convex surface;
   a sixth lens with a refractive power;
   a seventh lens with a refractive power;
   an eighth lens with a positive refractive power; and
   a ninth lens with a negative refractive power,
   wherein there is an air space between every two adjacent lenses in the first lens to the ninth lens; and
   ImgH is a half of a diagonal length of an effective pixel region on an imaging surface of the optical imaging lens assembly, and ImgH meets:

6.5 mm≤$ImgH$≤7.5 mm;

a curvature radius R10 of the image-side surface of the fifth lens and a curvature radius R12 of an image-side surface of the sixth lens meet:

$-2.0 < R12/R10 < -0.5$.

2. The optical imaging lens assembly according to claim 1, wherein an effective focal length f1 of the first lens and an effective focal length f8 of the eighth lens meet:

$1.0 < f8/f1 < 2.0$.

3. The optical imaging lens assembly according to claim 1, wherein an Abbe number V2 of the second lens meets:

$V2 \leq 20$.

4. The optical imaging lens assembly according to claim 1, wherein an effective focal length f2 of the second lens and an effective focal length f9 of the ninth lens meet:

$2.0 < f2/f9 < 4.0$.

5. The optical imaging lens assembly according to claim 1, wherein an effective focal length f3 of the third lens, a curvature radius R5 of the object-side surface of the third lens and a curvature radius R6 of an image-side surface of the third lens meet:

$2.0 < f3/(R5+R6) < 4.5$.

6. The optical imaging lens assembly according to claim 1, wherein a curvature radius R2 of an image-side surface of the first lens and a curvature radius R3 of an object-side surface of the second lens meet:

$1.0 < R2/R3 < 2.0$.

7. The optical imaging lens assembly according to claim 1, wherein a curvature radius R1 of an object-side surface of the first lens and a curvature radius R4 of an image-side surface of the second lens meet:

$1.5 < R4/R1 < 2.0$.

8. The optical imaging lens assembly according to claim 1, wherein a curvature radius R9 of the object-side surface of the fifth lens and a curvature radius R15 of an object-side surface of the eighth lens meet:

$-3.5 < R9/R15 < -1.5$.

9. The optical imaging lens assembly according to claim 1, wherein a curvature radius R17 of an object-side surface of the ninth lens and a curvature radius R18 of an image-side surface of the ninth lens meet $-3.5 < R18/R17 < -1.0$.

10. The optical imaging lens assembly according to claim 1, wherein a center thickness CT6 of the sixth lens on the optical axis and a center thickness CT7 of the seventh lens on the optical axis meet $0.5 < CT7/CT6 < 1.5$.

11. The optical imaging lens assembly according to claim 1, wherein an air space T34 of the third lens and the fourth lens on the optical axis and an air space T45 of the fourth lens and the fifth lens on the optical axis meet $1.5 < T34/T45 < 3.5$.

12. The optical imaging lens assembly according to claim 1, wherein a center thickness CT8 of the eighth lens on the optical axis, a center thickness CT9 of the ninth lens on the optical axis and an air space T89 of the eighth lens and the ninth lens on the optical axis meet $1.0 < (CT8+CT9)/T89 < 1.5$.

13. The optical imaging lens assembly according to claim 1, wherein a center thickness CT7 of the seventh lens on the optical axis and an air space T78 of the seventh lens and the eighth lens on the optical axis meet $1.0 < T78/CT7 < 2.0$.

14. The optical imaging lens assembly according to claim 1, wherein an air space T56 of the fifth lens and the sixth lens on the optical axis and an air space T67 of the sixth lens and the seventh lens on the optical axis meet $1.0 < T67/T56 < 4.0$.

15. An optical imaging lens assembly, sequentially comprising, from an object side to an image side along an optical axis:
   a first lens with a positive refractive power;
   a second lens with a negative refractive power;
   a third lens with a positive refractive power, an object-side surface thereof being a convex surface;
   a fourth lens with a positive refractive power;
   a fifth lens with a refractive power, an object-side surface thereof being a concave surface, while an image-side surface thereof being a concave surface;
   a sixth lens with a refractive power;
   a seventh lens with a refractive power;
   an eighth lens with a positive refractive power; and
   a ninth lens with a negative refractive power,
   wherein there is an air space between every two adjacent lenses in the first lens to the ninth lens; and
   an effective focal length f2 of the second lens and an effective focal length f9 of the ninth lens meet:

$2.0 < f2/f9 < 4.0$;

a curvature radius R10 of the image-side surface of the fifth lens and a curvature radius R12 of an image-side surface of the sixth lens meet:

$-2.0 < R12/R10 < -0.5$.

16. The optical imaging lens assembly according to claim 15, wherein an effective focal length f1 of the first lens and an effective focal length f8 of the eighth lens meet $1.0 < f8/f1 < 2.0$.

17. The optical imaging lens assembly according to claim 15, wherein an Abbe number V2 of the second lens meets $V2 \leq 20$.

18. The optical imaging lens assembly according to claim 15, wherein ImgH is a half of a diagonal length of an effective pixel region on an imaging surface of the optical imaging lens assembly, and ImgH meets $6.5\ mm \leq ImgH \leq 7.5\ mm$.

19. The optical imaging lens assembly according to claim 15, wherein an effective focal length f3 of the third lens, a curvature radius R5 of the object-side surface of the third lens and a curvature radius R6 of an image-side surface of the third lens meet $2.0 < f3/(R5+R6) < 4.5$.

* * * * *